US012604155B2

(12) United States Patent
Lee et al.

(10) Patent No.: US 12,604,155 B2
(45) Date of Patent: Apr. 14, 2026

(54) ELECTRONIC DEVICE FOR CONTROLLING WIRELESS COMMUNICATION CONNECTION AND OPERATING METHOD THEREOF

(71) Applicant: SAMSUNG ELECTRONICS CO., LTD., Suwon-si (KR)

(72) Inventors: Sangyoun Lee, Suwon-si (KR); Choonghoon Kim, Suwon-si (KR); Youngil Nam, Suwon-si (KR); Sinwoo Park, Suwon-si (KR); Seungjae Lee, Suwon-si (KR); Kyuhui Han, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 463 days.

(21) Appl. No.: 17/990,041

(22) Filed: Nov. 18, 2022

(65) Prior Publication Data

US 2023/0156424 A1      May 18, 2023

Related U.S. Application Data

(63) Continuation of application No. PCT/KR2022/017152, filed on Nov. 3, 2022.

(30) Foreign Application Priority Data

Nov. 18, 2021      (KR) ........................ 10-2021-0159748

(51) Int. Cl.
*H04W 4/02* (2018.01)
*G01S 13/76* (2006.01)
(Continued)

(52) U.S. Cl.
CPC ........... *H04W 4/023* (2013.01); *G01S 13/765* (2013.01); *G01S 13/84* (2013.01); *H04W 4/80* (2018.02)

(58) Field of Classification Search
CPC .............................. G01S 13/765; H04W 4/023
(Continued)

(56) References Cited

U.S. PATENT DOCUMENTS

2017/0236351 A1      8/2017   Menard et al.
2019/0006891 A1      1/2019   Park et al.
(Continued)

FOREIGN PATENT DOCUMENTS

EP           3656147 B1      6/2021
JP        2021081200 A      5/2021
(Continued)

OTHER PUBLICATIONS

Zand et al., "A high-accuracy phase-based ranging solution with Bluetooth Low Energy," IEEE Wireless Communications and Networking Conference; Oct. 31, 2019; 10 pages.
(Continued)

*Primary Examiner* — Fabricio R Murillo Garcia
(74) *Attorney, Agent, or Firm* — CANTOR COLBURN LLP

(57) ABSTRACT

An electronic device configured to establish a first Bluetooth low energy (BLE) connection with an external electronic device, measure a distance between the external electronic device and the electronic device based on a first distance measurement scheme, identify whether the distance is within a set range between a first distance and a second distance. Based on a determination that the distance is within the set range, measure a distance between the external electronic device and the electronic device based on a second distance measurement scheme and establish a second BLE connection with the external electronic device. Based on a determination that the distance measured based on the second distance measurement scheme is shorter than the second distance, measure a distance between the electronic
(Continued)

device and the external electronic device based on an ultra-wide band (UWB) technology.

19 Claims, 21 Drawing Sheets

(51) Int. Cl.
    *G01S 13/84*         (2006.01)
    *H04W 4/80*         (2018.01)

(58) Field of Classification Search
    USPC ...................................................... 455/456.1
    See application file for complete search history.

(56)           References Cited

U.S. PATENT DOCUMENTS

| | | | | |
|---|---|---|---|---|
| 2019/0135229 | A1* | 5/2019 | Ledvina | H04W 12/50 |
| 2020/0062217 | A1 | 2/2020 | Ledvina et al. | |
| 2020/0092893 | A1* | 3/2020 | Allan | G01S 13/24 |
| 2020/0264297 | A1* | 8/2020 | El Soussi | H04W 12/12 |
| 2020/0363524 | A1 | 11/2020 | Yoon et al. | |
| 2020/0384951 | A1 | 12/2020 | Preradovic et al. | |
| 2021/0082221 | A1 | 3/2021 | Zhang et al. | |
| 2021/0105169 | A1 | 4/2021 | Choi et al. | |
| 2021/0124061 | A1* | 4/2021 | Hiscock | G01S 11/02 |
| 2021/0136556 | A1 | 5/2021 | Lee et al. | |
| 2022/0099818 | A1* | 3/2022 | Werner | G01S 13/46 |
| 2022/0418025 | A1 | 12/2022 | Kim et al. | |
| 2023/0099551 | A1* | 3/2023 | Gupta | H04W 64/003 |
| | | | | 701/36 |

FOREIGN PATENT DOCUMENTS

| | | |
|---|---|---|
| KR | 20190003194 A | 1/2019 |
| KR | 20190067362 A | 6/2019 |
| KR | 20200130920 A | 11/2020 |
| KR | 102232966 B1 | 3/2021 |
| KR | 20210053018 A | 5/2021 |
| KR | 20210111539 A | 9/2021 |

OTHER PUBLICATIONS

International Search Report and Written Opinion for International Application No. PCT/KR2022/017152; International Filing Date Nov. 3, 2022; Date of Mailing Feb. 14, 2023; 10 Pages.

Extended European Search Report Issued in EP Application No. 22895914.4-1009; Mail Date Nov. 4, 2024; 12 Pages.

Korean Office Action Issued In KR Application No. 10-2021-0159748; Mail Date Mar. 10, 2026; 18 Pages.

\* cited by examiner

Measurement taken at 1 meter from ground level,
at 2 meters around the outer perimeter line of the vehicle Front and Rear screen glazing only (where applicable)

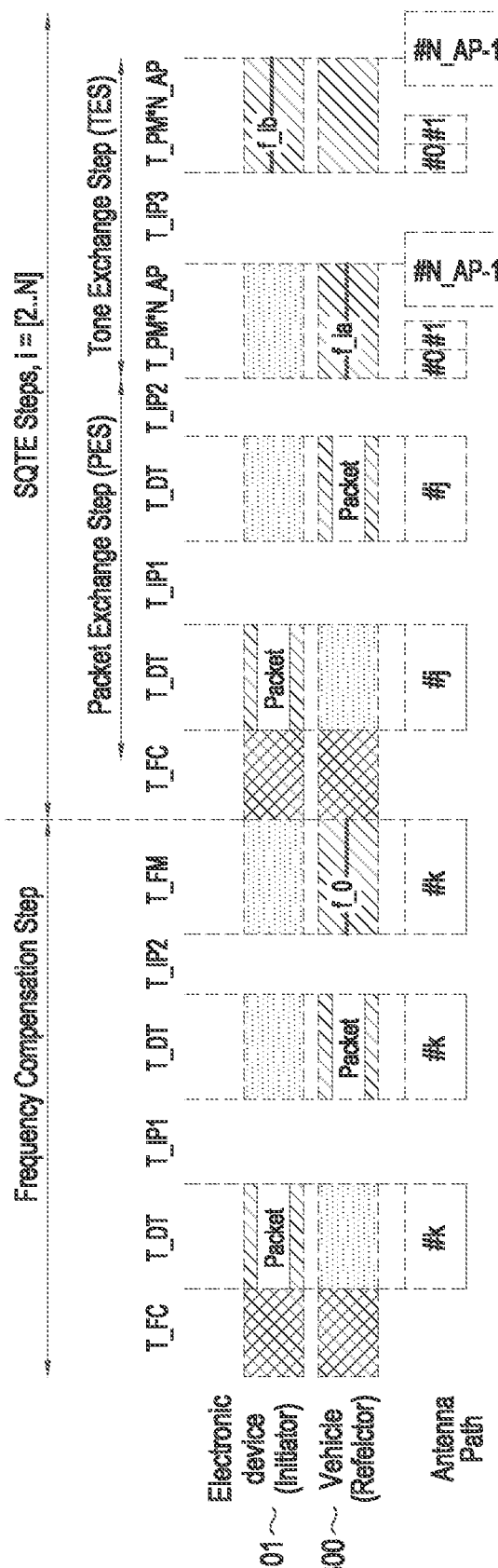
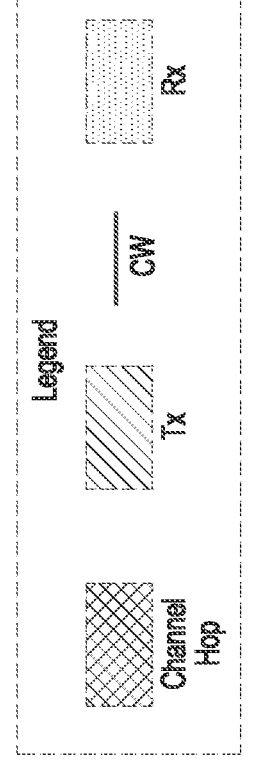
FIG. 15

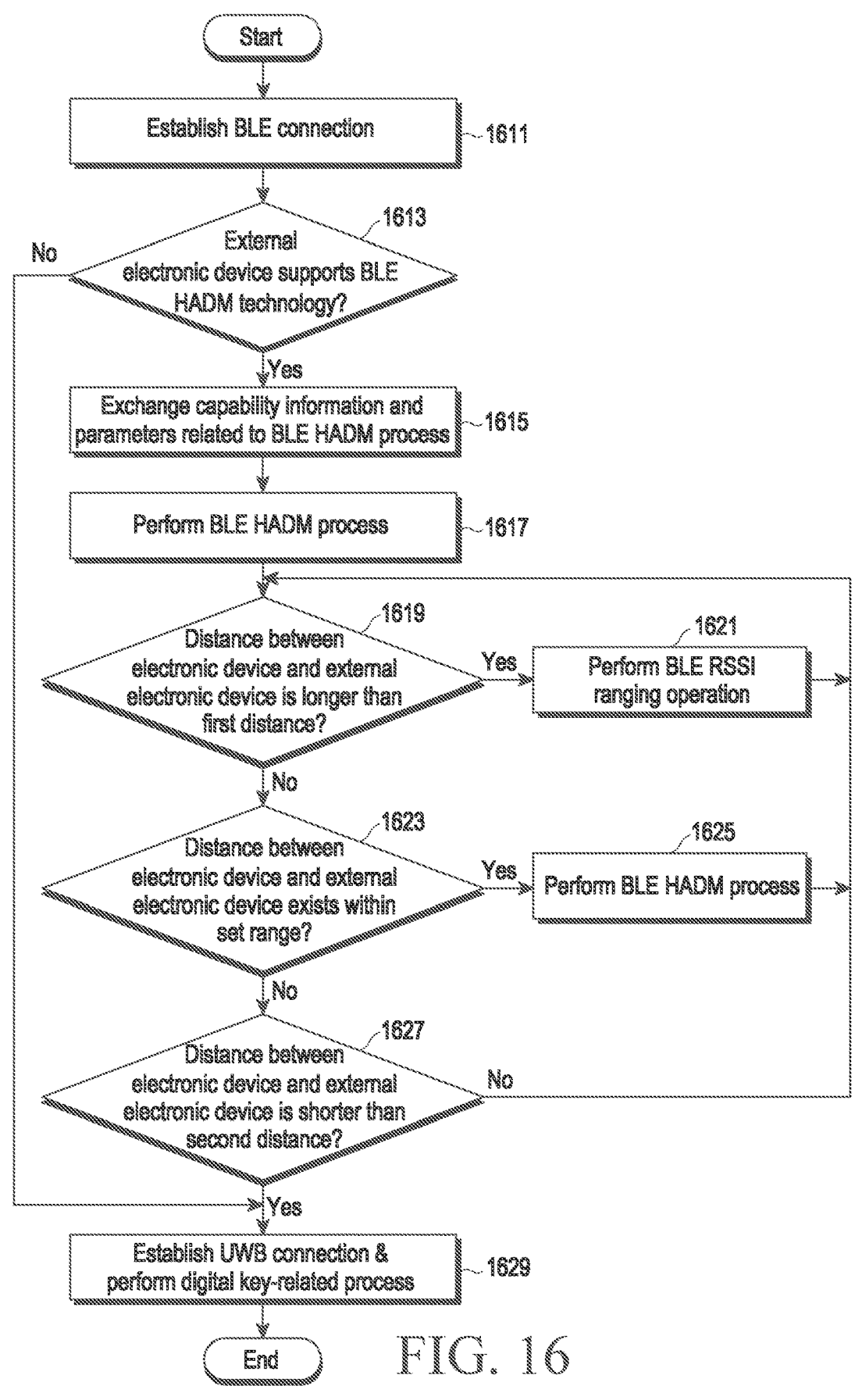

Start

Establish BLE connection ~1611

External electronic device supports BLE HADM technology? ~1613

No →

Yes ↓

Exchange capability information and parameters related to BLE HADM process ~1615

Perform BLE HADM process ~1617

Distance between electronic device and external electronic device is longer than first distance? ~1619

Yes → Perform BLE RSSI ranging operation ~1621

No ↓

Distance between electronic device and external electronic device exists within set range? ~1623

Yes → Perform BLE HADM process ~1625

No ↓

Distance between electronic device and external electronic device is shorter than second distance? ~1627

No →

Yes ↓

Establish UWB connection & perform digital key-related process ~1629

End

FIG. 16

ELECTRONIC DEVICE FOR CONTROLLING WIRELESS COMMUNICATION CONNECTION AND OPERATING METHOD THEREOF

CROSS-REFERENCE TO RELATED APPLICATION(S)

This application is a continuation application, claiming priority under § 365(c), of an International application No. PCT/KR2022/017152, filed on Nov. 3, 2022, which is based on and claims the benefit of a Korean patent application number 10-2021-0159748, filed on Nov. 18, 2021, in the Korean Intellectual Property Office, the disclosure of each of which is incorporated by reference herein in its entirety.

TECHNICAL FIELD

The disclosure relates to an electronic device for controlling a wireless communication connection and an operating method thereof.

BACKGROUND ART

The automobile industry has developed various forms of key technologies, and has provided drivers with convenience using the key technologies.

First, a turn-key starter technology has been developed that uses a mechanical key to open a vehicle door and start a vehicle, and then a button-type wireless key (a remote keyless entry (RKE)) which may open and close the vehicle door and start the vehicle without using the mechanical key has been developed. This RKE technology is combined with an immobilizer technology, and as the immobilizer technology is used, the vehicle may be started only if the unique cipher of the key matches and the unique cipher of the vehicle. In addition, a passive start and entry has been developed, and a key to which a PASE technology is applied is a smart key.

Unlike a conventional RKE technology in which a driver needs to press a button on a key after taking the key out of a bag, in a smart key technology, the driver may open the vehicle door without taking the key out of the bag, and the driver may press a button on the vehicle instead of turning the key to start the vehicle, thereby the vehicle may be immediately started. The smart key technology is a key technology which may prevent vehicle theft because the vehicle does not start and a steering wheel does not move if there is no authorized key near the driver's seat, and the smart key technology has been evolved in various forms.

Meanwhile, a key has been developed to be integrated into an electronic device (e.g., a smartphone) using a wireless communication technology such as a near field communication (NFC) technology. That is, a digital key, which is a digitized virtual key, is inserted into the smartphone, and as the digital key is inserted into the smartphone in this way, a driver does not need to carry the key.

In addition, the digital key is currently being used in a 'carsharing' service for sharing a vehicle. A user using a carsharing service receives and stores a virtual key from a carsharing company through a smartphone application. Then, the user using the carsharing service may use a reserved vehicle using the received virtual key.

As such, a key technology has been developed from the mechanical key to the remote control key, from the remote control key to the smart key, and from the smart key to the digital key. For example, standardization of a digital key technology has progressed by various consortia such as a car connectivity consortium and a fine ranging (FiRa) consortium, and a digital key standard provides a digital key technology with enhanced portability and security using a Bluetooth low energy (BLE) technology and an ultra wide band (UWB) technology as well as the NFC technology as the wireless communication technology.

The BLE technology is a low energy wireless communication technology, and the UWB technology is a wireless communication technology which enables accurate location estimation based on an ultra wide band. However, because the UWB technology consumes a relatively large current compared to operating time, CCC uses the BLE technology as a control channel of the UWB technology. In particular, the BLE technology always operates in the electronic device and the vehicle, and if the electronic device and the vehicle are close to each other, the electronic device and the vehicle are interconnected, and the UWB technology is operated based on a set condition, thereby enabling the accurate location estimation through the UWB technology.

However, a digital key standard currently provided by the CCC does not provide a specific scheme for a condition for the BLE technology to operate the UWB technology.

DETAILED DESCRIPTION OF THE INVENTION

Technical Solution

According to an embodiment, an electronic device may comprise a communication module, and at least one processor operatively connected with the communication module.

According to an embodiment, the at least one processor may be configured to establish, via the communication module, a first Bluetooth low energy (BLE) connection with an external electronic device.

According to an embodiment, the at least one processor may be further configured to measure, via the communication module, a distance between the external electronic device and the electronic device based on a first distance measurement scheme which is based on a BLE technology in the first BLE connection.

According to an embodiment, the at least one processor may be further configured to identify whether the distance between the external electronic device and the electronic device measured based on the first distance measurement scheme is within a set range which is shorter than or equal to a first distance and longer than or equal to a second distance.

According to an embodiment, the at least one processor may be further configured to, based on a determination that the distance between the external electronic device and the electronic device measured based on the first distance measurement scheme is within the set range, measure, via the communication module, a distance between the external electronic device and the electronic device based on a second distance measurement scheme which is based on the BLE technology in the first BLE connection.

According to an embodiment, the at least one processor may be further configured to establish a second BLE connection with the external electronic device.

According to an embodiment, the at least one processor may be further configured to, based on a determination that the distance between the external electronic device and the electronic device measured based on the second distance measurement scheme is shorter than the second distance, measure, via the communication module, a distance between the electronic device and the external electronic device based on a ultra wide band (UWB) technology.

According to an embodiment, an electronic device may comprise a communication module, and at least one processor operatively connected with the communication module.

According to an embodiment, the at least one processor may be configured to establish, via the communication module, a Bluetooth low energy (BLE) connection with an external electronic device.

According to an embodiment, the at least one processor may be further configured to identify an input for requesting to perform a location-based service-related action for the external electronic device.

According to an embodiment, the at least one processor may be further configured to measure, via the communication module, a distance between the external electronic device and the electronic device based on a high accuracy distance measurement (HADM) scheme which is based on a BLE technology in the BLE connection.

According to an embodiment, the at least one processor may be further configured to identify whether the measured distance between the external electronic device and the electronic device is longer than a set distance for the location-based service-related action.

According to an embodiment, the at least one processor may be further configured to, based on a determination that the measured distance between the external electronic device and the electronic device is shorter than or equal to the set distance, perform, via the communication module, the location-based service-related action with the external electronic device in the BLE connection.

According to an embodiment, an operating method of an electronic device may comprise establishing a first Bluetooth low energy (BLE) connection with an external electronic device.

According to an embodiment, the operating method may further comprise measuring a distance between the external electronic device and the electronic device based on a first distance measurement scheme which is based on a BLE technology in the first BLE connection.

According to an embodiment, the operating method may further comprise identifying whether the distance between the external electronic device and the electronic device measured based on the first distance measurement scheme is within a set range which is shorter than or equal to a first distance and longer than or equal to a second distance.

According to an embodiment, the operating method may further comprise, based on a determination that the distance between the external electronic device and the electronic device measured based on the first distance measurement scheme is within the set range, measuring a distance between the external electronic device and the electronic device based on a second distance measurement scheme which is based on the BLE technology in the first BLE connection. According to an embodiment, the operating method may further comprise establishing a second BLE connection with the external electronic device.

According to an embodiment, the operating method may further comprise, based on a determination that the distance between the external electronic device and the electronic device measured based on the second distance measurement scheme is shorter than the second distance, measuring a distance between the electronic device and the external electronic device based on a ultra-wide band (UWB) technology.

According to an embodiment, an operating method of an electronic device may comprise establishing a Bluetooth low energy (BLE) connection with an external electronic device.

According to an embodiment, the operating method may further comprise identifying an input for requesting to perform a location-based service-related action for the external electronic device.

According to an embodiment, the operating method may further comprise measuring a distance between the external electronic device and the electronic device based on a high accuracy distance measurement (HADM) scheme which is based on a BLE technology in the BLE connection.

According to an embodiment, the operating method may further comprise identifying whether the measured distance between the external electronic device and the electronic device is longer than a set distance for the location-based service-related action.

According to an embodiment, the operating method may further comprise, based on a determination that the measured distance between the external electronic device and the electronic device is shorter than or equal to the set distance, performing the location-based service-related action with the external electronic device in the BLE connection.

According to an embodiment, a non-transitory computer readable storage medium may include one or more programs, the one or more programs comprising instructions configured to, when executed by at least one processor of an electronic device, cause the electronic device to establish a first Bluetooth low energy (BLE) connection with an external electronic device.

According to an embodiment, the instructions may be configured to cause the electronic device to measure a distance between the external electronic device and the electronic device based on a first distance measurement scheme which is based on a BLE technology in the first BLE connection.

According to an embodiment, the instructions may be further configured to cause the electronic device to identify whether the distance between the external electronic device and the electronic device measured based on the first distance measurement scheme is within a set range which is shorter than or equal to a first distance and longer than or equal to a second distance.

According to an embodiment, the instructions may be further configured to cause the electronic device to, based on a determination that the distance between the external electronic device and the electronic device measured based on the first distance measurement scheme is within the set range, measure a distance between the external electronic device and the electronic device based on a second distance measurement scheme which is based on the BLE technology in the first BLE connection.

According to an embodiment, the instructions may be further configured to cause the electronic device to establish a second BLE connection with the external electronic device.

According to an embodiment, the instructions may be further configured to cause the electronic device to, based on a determination that the distance between the external electronic device and the electronic device measured based on the second distance measurement scheme is shorter than the second distance, measure a distance between the electronic device and the external electronic device based on a ultra wide band (UWB) technology.

According to an embodiment, a non-transitory computer readable storage medium may include one or more programs, the one or more programs comprising instructions configured to, when executed by at least one processor of an electronic device, cause the electronic device to establish a Bluetooth low energy (BLE) connection with an external electronic device.

According to an embodiment, the instructions may be further configured to cause the electronic device to identify an input for requesting to perform a location-based service-related action for the external electronic device.

According to an embodiment, the instructions may be further configured to cause the electronic device to measure a distance between the external electronic device and the electronic device based on a high accuracy distance measurement (HADM) scheme which is based on a BLE technology in the BLE connection.

According to an embodiment, the instructions may be further configured to cause the electronic device to identify whether the measured distance between the external electronic device and the electronic device is longer than a set distance for the location-based service-related action.

According to an embodiment, the instructions may be further configured to cause the electronic device to perform the location-based service-related action with the external electronic device in the BLE connection based on a determination that the measured distance between the external electronic device and the electronic device is shorter than or equal to the set distance.

DESCRIPTION OF THE DRAWINGS

FIG. 15 is a diagram schematically illustrating an example of a secure quick tone exchange (SQTE) procedure in a digital key system according to an embodiment.

FIG. 16 is a flowchart schematically illustrating an example of an operating process of an electronic device in a digital key system according to an embodiment.

MODE FOR INVENTION

Figure 1:
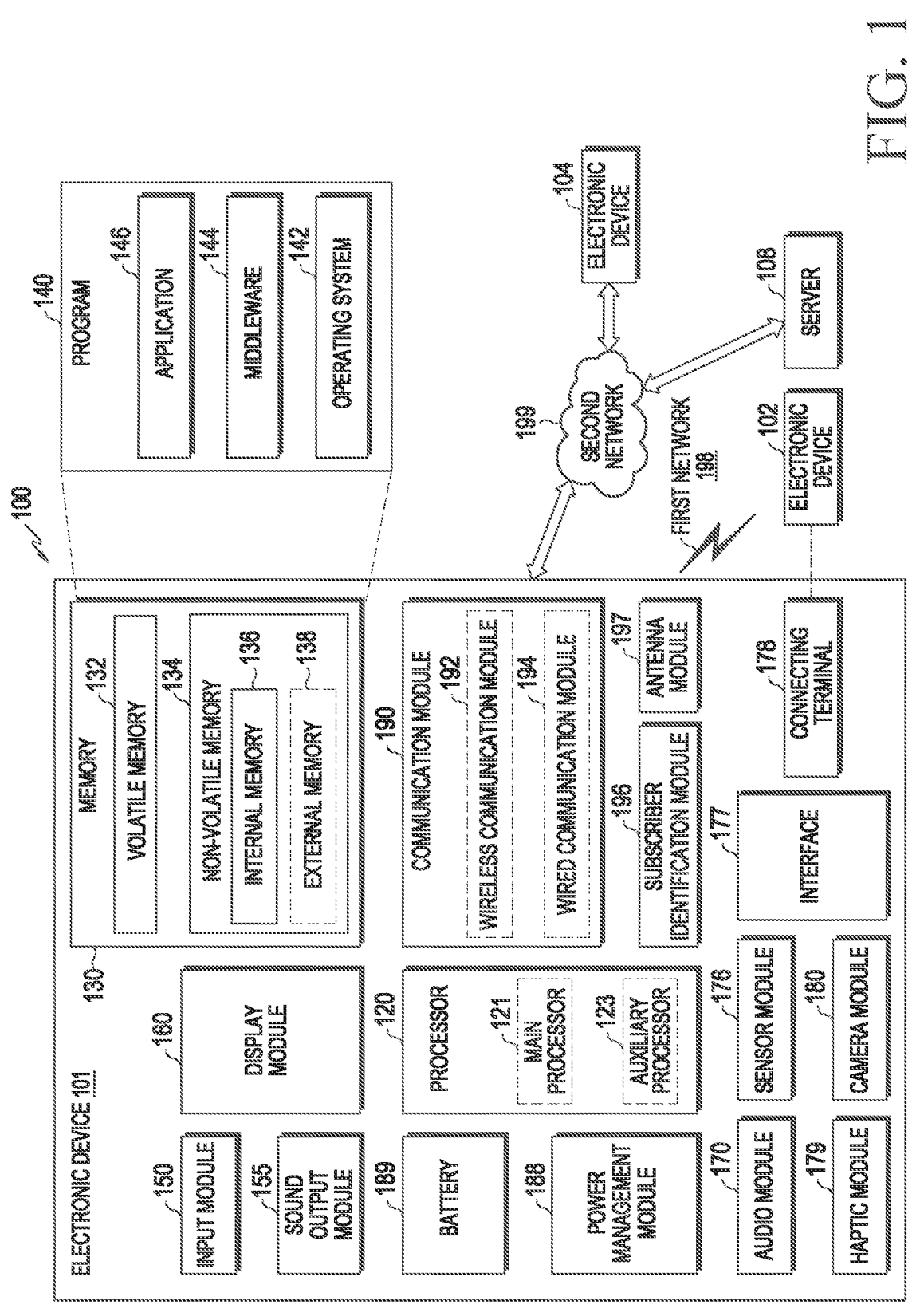
FIG. 1 is a block diagram illustrating an electronic device in a network environment according to an embodiment.

Hereinafter, an embodiment of the disclosure will be described in detail with reference to the accompanying drawings. In the following description of an embodiment of the disclosure, a detailed description of relevant known functions or configurations incorporated herein will be omitted when it is determined that the description may make the subject matter of an embodiment of the disclosure unnecessarily unclear. The terms which will be described below are terms defined in consideration of the functions in the disclosure, and may be different according to users, intentions of the users, or customs, and/or the like. Therefore, the definitions of the terms should be made based on the contents throughout the specification.

It should be noted that the technical terms used herein are only used to describe specific embodiments, and are not intended to limit the disclosure. Alternatively, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Alternatively, when the technical terms used herein are wrong technical terms that cannot correctly represent the idea of the disclosure, it should be appreciated that they are replaced by technical terms correctly understood by those skilled in the art. Alternatively, the general terms used herein should be interpreted as defined in dictionaries or interpreted in the context of the relevant part, and should not be interpreted to have excessively restricted meanings.

Alternatively, a singular expression used herein may include a plural expression unless they are definitely different in the context. As used herein, such an expression as "comprises" or "include", and/or the like should not be interpreted to necessarily include all elements or all operations described in the specification, and should be interpreted to be allowed to exclude some of them or further include additional elements or operations.

Alternatively, the terms including an ordinal number, such as expressions "a first", "a second", and/or the like may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, an embodiment of the disclosure will be described in detail with reference to the accompanying drawings. Regardless of drawing signs, the same or like elements are provided with the same reference numeral, and a repeated description thereof will be omitted. Alternatively, in describing an embodiment of the disclosure, a detailed description of relevant known technologies will be omitted when it is determined that the description may make the subject matter of the disclosure unclear. Alternatively, it should be noted that the accompanying drawings are presented merely to help easy understanding of the technical idea of the disclosure, and should not be construed to limit the technical idea of the disclosure. The technical idea of the disclosure should be construed to cover all changes, equivalents, and alternatives, in addition to the drawings.

In a detailed description of an embodiment of the disclosure, a digital key standard specified by Car Connectivity Consortium, a standard specified by Bluetooth special interest group (SIG), a ultra-wide band (UWB) standard which may be specified by Institute of Electrical and Electronics Engineers (IEEE) 802.15.4/4z, or a FiRa standard which may be specified by FiRa (FiRa Consortium) which is a consortium based on a ultra-wide band (UWB) standard are referred to, but the main subject of the disclosure can be somewhat modified and applied to another communication system having a similar technical background and using other standards without departing from the scope of the disclosure, and the modifications can be made on the basis of determination of those skilled in the art.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134.

According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel.

The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
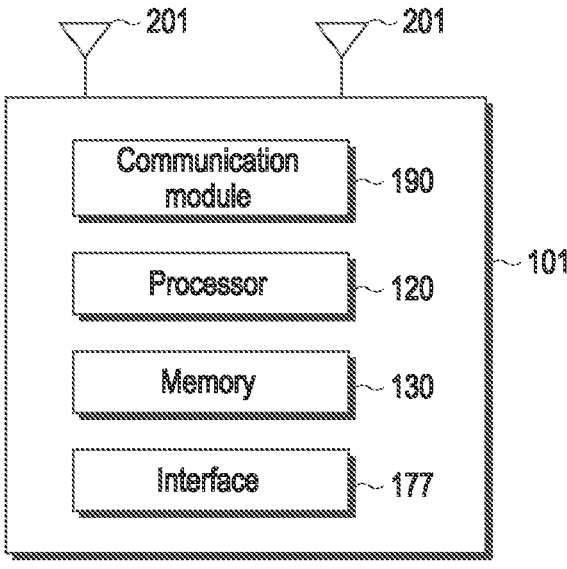
FIG. 2 is an example of a block diagram illustrating an electronic device according to an embodiment.

FIG. 2 is an example of a block diagram illustrating an electronic device according to an embodiment.

Referring to FIG. 2, an electronic device 101 (e.g., an electronic device 101 in FIG. 1) may be a device which implements an NFC technology, a BLE technology, a UWB technology, and/or a digital key technology according to a digital key standard. The electronic device 101 may include a communication module 190 (e.g., a communication module 190 in FIG. 1) for transmitting and receiving signals with an external electronic device (e.g., an electronic device 102 or 104 in FIG. 1), a server (e.g., a server 108 in FIG. 1), a vehicle, or a friend electronic device using one or more antennas 201. In an embodiment, the friend electronic device may be an electronic device which shares a digital key for the vehicle with the electronic device 101. In an embodiment, the one or more antennas 201 may be implemented as a part of an antenna module 198 in FIG. 1.

According to an embodiment, the communication module 190 may include a plurality of communication circuits, and the plurality of communication circuits may include a communication circuit which is based on each of the NFC technology, the BLE technology, the UWB technology, and/or a Wi-Fi technology. According to an embodiment, the electronic device 101 does not include a separate communication circuit which is based on each of the NFC technology, the BLE technology, the UWB technology, and/or the Wi-Fi technology, and may include a communication circuit which is based on at least two of the NFC technology, the BLE technology, the UWB technology, or the Wi-Fi technology, or which is based on all of the NFC technology, the BLE technology, the UWB technology, and the Wi-Fi technology. According to an embodiment, the communication circuit which is based on the at least two of the NFC technology, the BLE technology, the UWB technology, and the Wi-Fi technology, or which is based on all of the NFC technology, the BLE technology, the UWB technology, and the Wi-Fi technology may be the communication module 190.

The electronic device 101 may include an interface 177 (e.g., an interface 177 in FIG. 1) which provides a wired and/or wireless interface for communicating with components outside a network. In an embodiment, at least a portion of the one or more antennas 201, the communication module 190, or the interface 177 may be implemented as at least a portion of the communication module 190 and the antenna module 198 in FIG. 1.

The electronic device 101 may include a processor 120 (e.g., a processor 120 in FIG. 1) which may be implemented with one or more single-core processors or one or more multi-core processors, and a memory 130 (e.g., a memory 130 in FIG. 1) which stores instructions for an operation of the electronic device 101.

Figure 3:
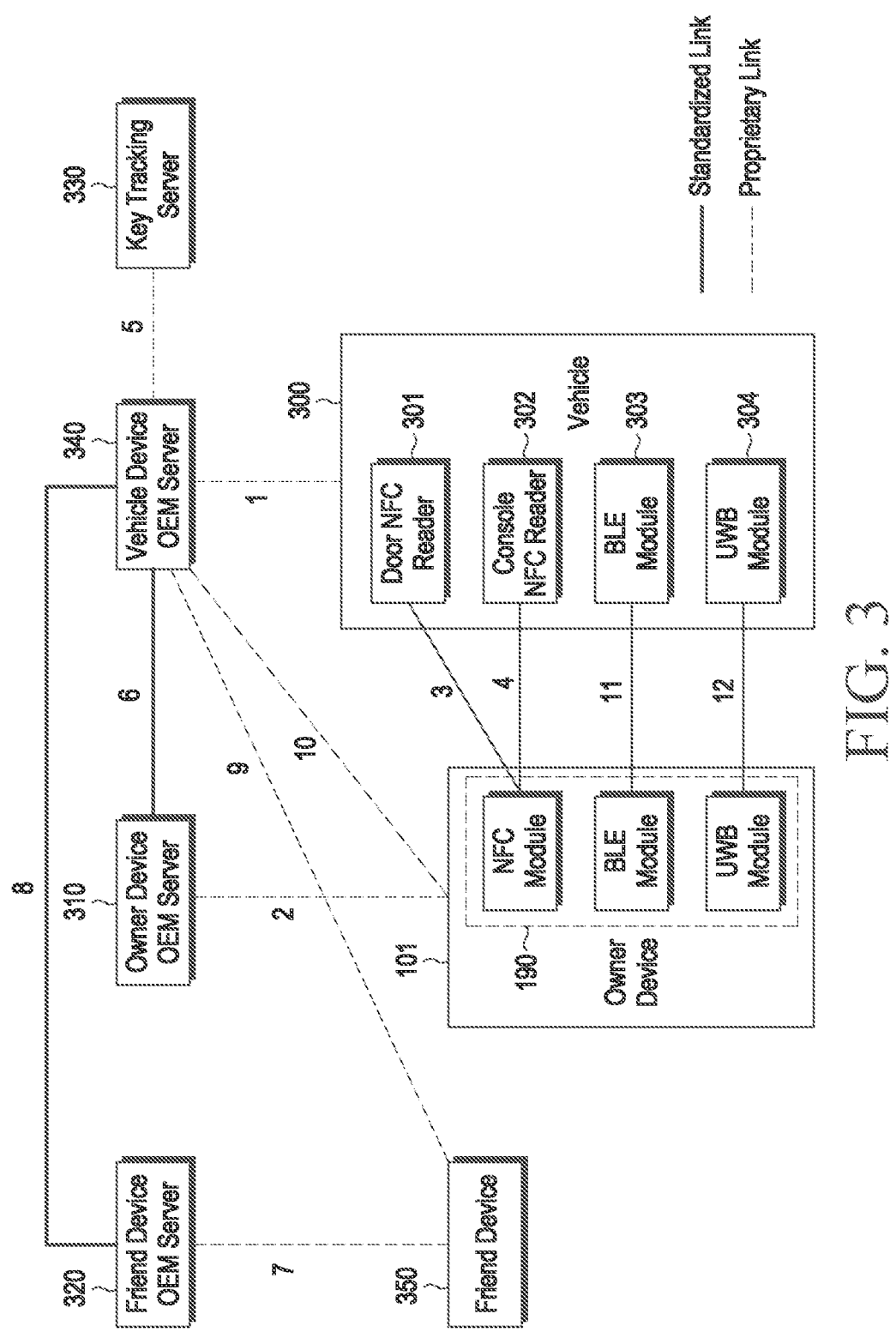
FIG. 3 is a block diagram schematically illustrating a digital key architecture in a digital key system according to an embodiment.

FIG. 3 is a block diagram schematically illustrating a digital key architecture in a digital key system according to an embodiment.

Referring to FIG. 3, a digital key system may be a system implementing a digital key standard, and a vehicle 300 may be linked with a fourth server 340 (e.g., a server 108 in FIG. 1) for each telematics link (1). In an embodiment, the fourth server 340 may be a vehicle original equipment manufacturer (OEM) server. In an embodiment, a telematics link may provide a secure communication channel, and may be controlled by a vehicle OEM.

The vehicle 300 may include NFC readers 301 and 302, a BLE module 303, and a UWB module 304. The NFC readers 301 and 302 may include a door NFC reader 301 and a console NFC reader 302. The NFC readers 301 and 302, the BLE module 303, and the UWB module 304 may communicate with an electronic device 101 (e.g., an owner device) for an owner pairing operation, a vehicle lock/unlock operation, and/or an engine start operation. In a case of NFC connectivity, the vehicle 300 may communicate with the electronic device 101 via the NFC readers 301 and 302 (3 and 4), in a case of BLE connectivity, the vehicle 300 may communicate with the electronic device 101 via the BLE module 303 (11), and in a case of UWB connectivity, the vehicle 300 may communicate with the electronic device 101 via the UWB module 304 (12).

The electronic device 101 may include a communication module 190 (e.g., a communication module 190 in FIG. 1 or FIG. 2), and the communication module 190 may include an NFC module, a BLE module, and a UWB module. The NFC module, the BLE module, and the UWB module included in the communication module 190 may communicate with the vehicle 300 for the owner pairing operation, the vehicle locking/unlocking operation, and/or the engine start operation. In the case of NFC connectivity, the electronic device 101 may communicate with the vehicle 300 through the NFC module in the communication module 190 (3 and 4), in the case of BLE connectivity, the electronic device 101 may communicate with the vehicle 300 through the BLE module in the communication module 190 (11), and in the case of UWB connectivity, the electronic device 101 may communicate with the vehicle 300 through the UWB module in the communication module 190 (12).

The electronic device 101 may communicate with a first server 310 (e.g., an owner device OEM server) using a proprietary method (2). The electronic device 101 may communicate directly with a third server 330 using a proprietary vehicle OEM app interface (10). Similarly, a friend electronic device 350 (e.g., an electronic device 102 in FIG. 1) may communicate directly with the fourth server 340 using the proprietary vehicle OEM app interface (9).

The first server 310 and a second server 320 (e.g., a friend electronic device OEM server) may manage a life cycle of a digital key applet, and update a necessary certificate in the electronic device 101 and the friend electronic device 350 through a link between the electronic device 101 and the first server 310 and a link between the friend electronic device 350 and the second server 320. If the electronic device 101 and the friend electronic device 350 are lost or stolen, the first server 310 and the second server 320 may provide services to suspend, restore, and/or wipe digital keys.

The fourth server 340 may manage identification and verification (ID&V) of user accounts and/or user identities. The fourth server 340 may connect with a third server 330 (e.g., a key tracking server) (5) to register all issued digital keys for the vehicle 300 in a way that privacy of stored information is protected.

The first server 310 may not be directly connected to other servers (e.g., the second server 320 and the third server 330).

The electronic device 101 may share a digital key with the friend electronic device 350, and may terminate the shared digital key when digital key sharing is no longer required. The friend electronic device 350 may use a digital key shared by an owner, but may not share the same digital key with any other device.

A connection between the friend electronic device 350 and the second server 320 may support essential certificate services as in a connection between the electronic device 101 and the first server 310.

An embodiment of the disclosure may provide an electronic device for controlling a wireless communication connection and an operating method thereof.

An embodiment of the disclosure may provide an electronic device for changing a wireless communication connection based on a distance between a vehicle and the electronic device and an operating method thereof in a digital key system.

Figure 7:
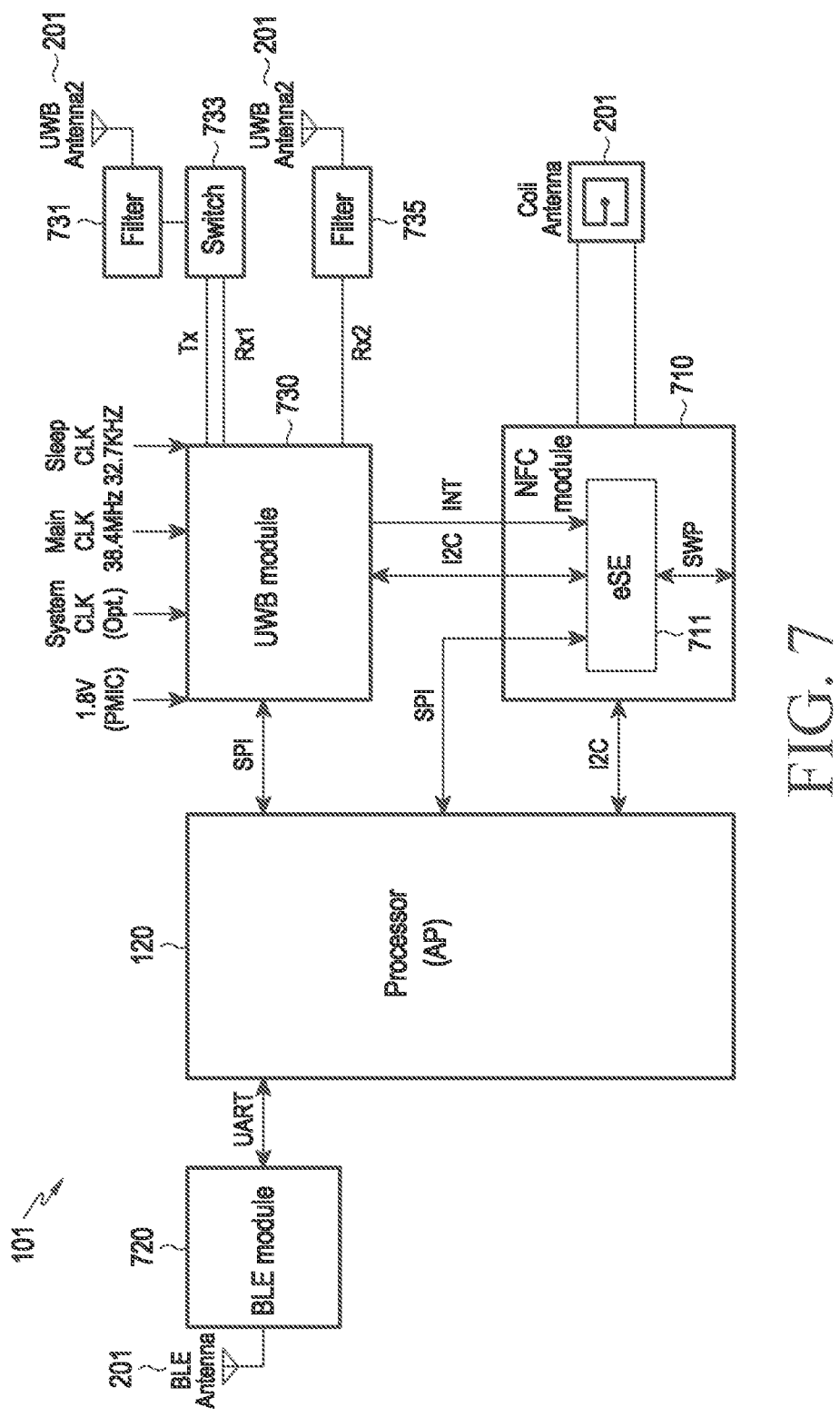
FIG. 7 is another example of a block diagram illustrating an electronic device according to an embodiment.

According to an embodiment, an electronic device (e.g., an electronic device in FIG. 1, FIG. 2, or FIG. 7) may comprise a communication module (e.g., a communication module 190 in FIG. 1 or FIG. 2, or a communication module in FIG. 7) and at least one processor (e.g., a processor 120 in FIG. 1, FIG. 2, or FIG. 7) operatively connected with the communication module (e.g., the communication module 190 in FIG. 1 or FIG. 2, or the communication module in FIG. 7).

Figure 19:
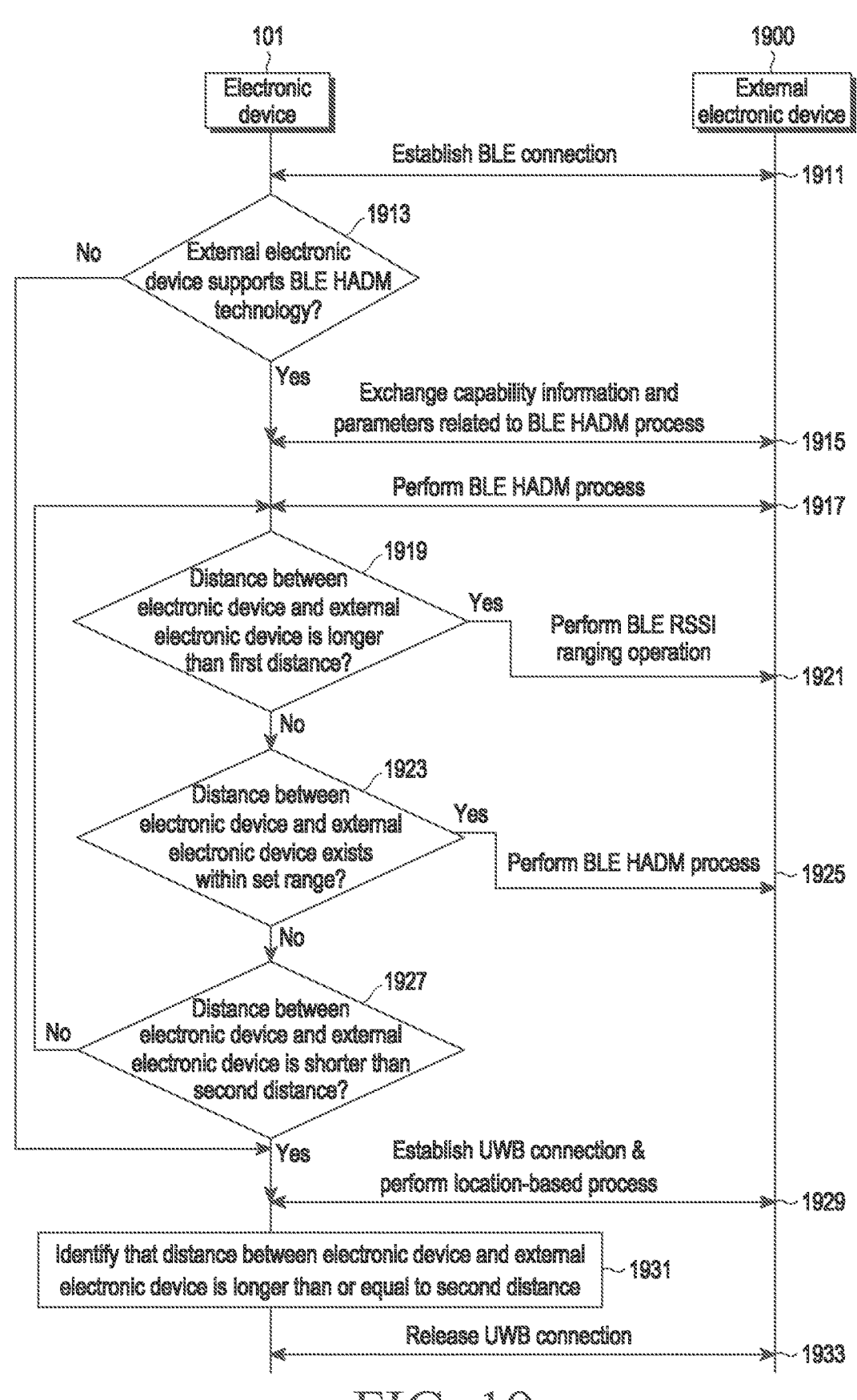
FIG. 19 is a signal flow diagram schematically illustrating an example of a procedure for establishing a UWB connection between an electronic device and an external electronic device in a wireless communication system according to an embodiment.

According to an embodiment, the at least one processor (e.g., the processor 120 in FIG. 1, FIG. 2, or FIG. 7) may be configured to establish, via the communication module (e.g., the communication module 190 in FIG. 1 or FIG. 2, or the communication module in FIG. 7), a first Bluetooth low energy (BLE) connection with an external electronic device (e.g., a vehicle 300 in FIG. 3 or an external electronic device 1900 in FIG. 19).

According to an embodiment, the at least one processor (e.g., the processor 120 in FIG. 1, FIG. 2, or FIG. 7) may be further configured to measure, via the communication module (e.g., the communication module 190 in FIG. 1 or FIG. 2, or the communication module in FIG. 7), a distance between the external electronic device (e.g., the vehicle 300 in FIG. 3 or the external electronic device 1900 in FIG. 19) and the electronic device (e.g., the electronic device in FIG. 1, FIG. 2, or FIG. 7) based on a first distance measurement scheme which is based on a BLE technology in the first BLE connection.

According to an embodiment, the at least one processor (e.g., the processor 120 in FIG. 1, FIG. 2, or FIG. 7) may be further configured to identify whether the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the first distance measurement scheme is within a set range which is shorter than or equal to a first distance and longer than or equal to a second distance.

According to an embodiment, the at least one processor (e.g., the processor 120 in FIG. 1, FIG. 2, or FIG. 7) may be further configured to, if the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the first distance measurement scheme is within the set range, measure, via the communication module (e.g., the communication module 190 in FIG. 1 or FIG. 2, or the communication module in FIG. 7), a distance between the external electronic device (e.g., the vehicle 300 in FIG. 3 or the external electronic device 1900 in FIG. 19) and the electronic device (e.g., the electronic device in FIG. 1, FIG. 2, or FIG. 7) based on a second distance measurement scheme which is based on the BLE technology in the first BLE connection.

According to an embodiment, the at least one processor (e.g., the processor 120 in FIG. 1, FIG. 2, or FIG. 7) may be further configured to establish a second BLE connection with the external electronic device (e.g., the vehicle 300 in FIG. 3 or the external electronic device 1900 in FIG. 19).

According to an embodiment, the at least one processor (e.g., the processor 120 in FIG. 1, FIG. 2, or FIG. 7) may be further configured to, if the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the second distance measurement scheme is shorter than the second distance, measure, via the communication module (e.g., the communication module 190 in FIG. 1 or FIG. 2, or the communication module in FIG. 7), a distance between the electronic device (e.g., the electronic device in FIG. 1, FIG. 2, or FIG. 7) and the external electronic device (e.g., the vehicle 300 in FIG. 3 or the external electronic device 1900 in FIG. 19) based on a ultra-wide band (UWB) technology.

According to an embodiment, the first distance may be a distance at which the establishment of the second BLE connection between the electronic device (e.g., the electronic device in FIG. 1, FIG. 2, or FIG. 7) and the external electronic device (e.g., the vehicle 300 in FIG. 3 or the external electronic device 1900 in FIG. 19) is triggered.

According to an embodiment, the second distance may be a distance at which establishment of a UWB connection between the electronic device (e.g., the electronic device in FIG. 1, FIG. 2, or FIG. 7) and the external electronic device (e.g., the vehicle 300 in FIG. 3 or the external electronic device 1900 in FIG. 19) is triggered. According to an embodiment, the at least one processor (e.g., the processor 120 in FIG. 1, FIG. 2, or FIG. 7) may be further configured to exchange, with the external electronic device (e.g., the vehicle 300 in FIG. 3 or the external electronic device 1900 in FIG. 19) via the communication module (e.g., the communication module 190 in FIG. 1 or FIG. 2, or the communication module in FIG. 7), capability information or at least one parameter related to at least one of the first distance measurement scheme or the second distance measurement scheme.

According to an embodiment, the first distance measurement scheme may be a high accuracy distance measurement (HADM) scheme which is based on round trip time (RTT) measurement between the electronic device (e.g., the electronic device in FIG. 1, FIG. 2, or FIG. 7) and the external electronic device (e.g., the vehicle 300 in FIG. 3 or the external electronic device 1900 in FIG. 19), and the second distance measurement scheme may be an HADM scheme which is based on phase measurement between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the at least one processor (e.g., the processor 120 in FIG. 1, FIG. 2, or FIG. 7) may be further configured to, if the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the second distance measurement scheme is shorter than the second distance, establish a UWB connection via the communication module (e.g., the communication module 190 in FIG. 1 or FIG. 2, or the communication module in FIG. 7).

According to an embodiment, the distance between the external electronic device (e.g., the vehicle 300 in FIG. 3 or the external electronic device 1900 in FIG. 19) and the electronic device (e.g., the electronic device in FIG. 1, FIG. 2, or FIG. 7) may be measured based on the UWB technology in the set UWB connection.

According to an embodiment, the at least one processor (e.g., the processor 120 in FIG. 1, FIG. 2, or FIG. 7) may be further configured to perform, via the communication module (e.g., the communication module 190 in FIG. 1 or FIG. 2, or the communication module in FIG. 7), a location-based service-related process with the external electronic device (e.g., the vehicle 300 in FIG. 3 or the external electronic device 1900 in FIG. 19) in the UWB connection.

According to an embodiment, the location-based service-related process may be a process related to the distance between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the at least one processor (e.g., the processor 120 in FIG. 1, FIG. 2, or FIG. 7) may be further configured to, upon identifying that a set condition is satisfied while the UWB connection is being established, release the UWB connection with the external electronic device (e.g., the vehicle 300 in FIG. 3 or the external electronic device 1900 in FIG. 19).

According to an embodiment, the at least one processor (e.g., the processor 120 in FIG. 1, FIG. 2, or FIG. 7) may be further configured to, while the UWB connection is being established, if the distance between the electronic device (e.g., the electronic device in FIG. 1, FIG. 2, or FIG. 7) and the external electronic device (e.g., the vehicle 300 in FIG. 3 or the external electronic device 1900 in FIG. 19) measured based on the second distance measurement scheme is longer than or equal to the second distance, release, via the communication module (e.g., the communication module 190 in FIG. 1 or FIG. 2, or the communication module in FIG. 7), the UWB connection with the external electronic device (e.g., the vehicle 300 in FIG. 3 or the external electronic device 1900 in FIG. 19).

According to an embodiment, the at least one processor (e.g., the processor 120 in FIG. 1, FIG. 2, or FIG. 7) may be further configured to, upon identifying that a set condition is satisfied while the distance between the electronic device (e.g., the electronic device in FIG. 1, FIG. 2, or FIG. 7) and the external electronic device (e.g., the vehicle 300 in FIG. 3 or the external electronic device 1900 in FIG. 19) is being measured based on the UWB technology, measure the distance between the electronic device (e.g., the electronic device in FIG. 1, FIG. 2, or FIG. 7) and the external electronic device (e.g., the vehicle 300 in FIG. 3 or the external electronic device 1900 in FIG. 19) based on the first distance measurement scheme or the second distance measurement scheme.

According to an embodiment, the at least one processor (e.g., the processor 120 in FIG. 1, FIG. 2, or FIG. 7) may be further configured to, if the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the second distance measurement scheme is longer than or equal to the second distance while the distance between the electronic device (e.g., the electronic device in FIG. 1, FIG. 2, or FIG. 7) and the external electronic device (e.g., the vehicle 300 in FIG. 3 or the external electronic device 1900 in FIG. 19) is being measured based on the UWB technology, measure the distance between the electronic device (e.g., the electronic device in FIG. 1, FIG. 2, or FIG. 7) and the external electronic device (e.g., the vehicle 300 in FIG. 3 or the external electronic device 1900 in FIG. 19) based on the first distance measurement scheme or the second distance measurement scheme.

According to an embodiment, the first BLE connection may be a BLE link layer (LL) connection, and the second BLE connection may be a BLE logical link control and adaptation protocol (L2CAP) connection-oriented channel (CoC) connection.

According to an embodiment, an electronic device (e.g., an electronic device in FIG. 1, FIG. 2, or FIG. 7) may comprise a communication module (e.g., a communication module 190 in FIG. 1 or FIG. 2, or a communication module in FIG. 7) and at least one processor (e.g., a processor 120 in FIG. 1, FIG. 2, or FIG. 7) operatively connected with the communication module (e.g., the communication module 190 in FIG. 1 or FIG. 2, or the communication module in FIG. 7).

According to an embodiment, the at least one processor (e.g., the processor 120 in FIG. 1, FIG. 2, or FIG. 7) may be configured to establish, via the communication module (e.g., the communication module 190 in FIG. 1 or FIG. 2, or the communication module in FIG. 7), a Bluetooth low energy (BLE) connection with an external electronic device (e.g., a vehicle 300 in FIG. 3 or an external electronic device 1900 in FIG. 19).

According to an embodiment, the at least one processor (e.g., the processor 120 in FIG. 1, FIG. 2, or FIG. 7) may be further configured to identify an input for requesting to perform a location-based service-related action for the external electronic device (e.g., the vehicle 300 in FIG. 3 or the external electronic device 1900 in FIG. 19).

According to an embodiment, the at least one processor (e.g., the processor 120 in FIG. 1, FIG. 2, or FIG. 7) may be further configured to measure, via the communication module (e.g., the communication module 190 in FIG. 1 or FIG. 2, or the communication module in FIG. 7), a distance between the external electronic device (e.g., the vehicle 300 in FIG. 3 or the external electronic device 1900 in FIG. 19) and the electronic device (e.g., the electronic device in FIG. 1, FIG. 2, or FIG. 7) based on a high accuracy distance measurement (HADM) scheme which is based on a BLE technology in the BLE connection.

According to an embodiment, the at least one processor (e.g., the processor 120 in FIG. 1, FIG. 2, or FIG. 7) may be further configured to identify whether the measured distance between the external electronic device (e.g., the vehicle 300 in FIG. 3 or the external electronic device 1900 in FIG. 19) and the electronic device (e.g., the electronic device in FIG. 1, FIG. 2, or FIG. 7) is longer than a set distance for the location-based service-related action.

According to an embodiment, the at least one processor (e.g., the processor 120 in FIG. 1, FIG. 2, or FIG. 7) may be further configured to, if the measured distance between the external electronic device (e.g., the vehicle 300 in FIG. 3 or the external electronic device 1900 in FIG. 19) and the electronic device (e.g., the electronic device in FIG. 1, FIG. 2, or FIG. 7) is the set distance, perform, via the communication module (e.g., the communication module 190 in FIG. 1 or FIG. 2, or the communication module in FIG. 7), the location-based service-related action with the external electronic device (e.g., the vehicle 300 in FIG. 3 or the external electronic device 1900 in FIG. 19) in the BLE connection.

According to an embodiment, the at least one processor (e.g., the processor 120 in FIG. 1, FIG. 2, or FIG. 7) may be further configured to, if the measured distance between the external electronic device (e.g., the vehicle 300 in FIG. 3 or the external electronic device 1900 in FIG. 19) and the electronic device (e.g., the electronic device in FIG. 1, FIG. 2, or FIG. 7) is longer than the set distance, display a warning message via a display module of the electronic device (e.g., the electronic device in FIG. 1, FIG. 2, or FIG. 7).

According to an embodiment, the location-based service-related action may be a digital key-related action.

According to an embodiment, the digital key-related action may be a button-type wireless key (remote keyless entry (RKE)) action related to a digital key shared between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the at least one processor (e.g., the processor 120 in FIG. 1, FIG. 2, or FIG. 7) may be further configured to exchange, with the external electronic device (e.g., the vehicle 300 in FIG. 3 or the external electronic device 1900 in FIG. 19) via the communication module (e.g., the communication module 190 in FIG. 1 or FIG. 2, or the communication module in FIG. 7), at least one of capability information or at least one parameter related to the HADM scheme.

According to an embodiment, the HADM scheme may be based on at least one of round trip time (RTT) measurement between the electronic device (e.g., the electronic device in FIG. 1, FIG. 2, or FIG. 7) and the external electronic device (e.g., the vehicle 300 in FIG. 3 or the external electronic device 1900 in FIG. 19) or phase measurement between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the BLE connection may be at least one of a BLE link layer (LL) connection or a BLE logical link control and adaptation protocol (L2CAP) connection-oriented channel (CoC) connection.

Figure 4:
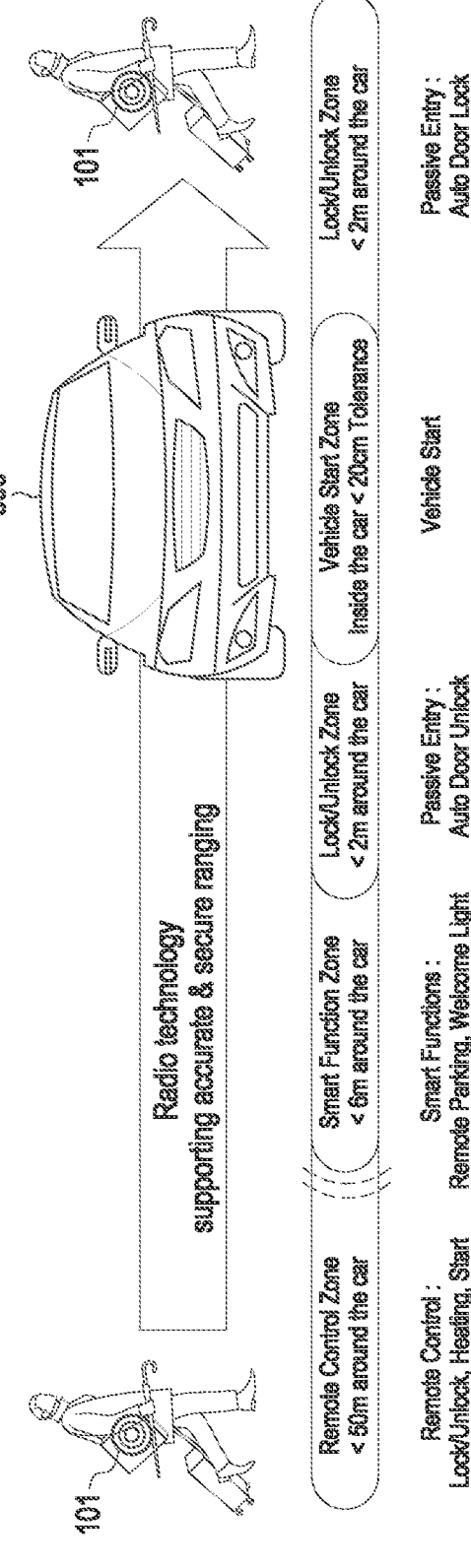
FIG. 4 is a diagram illustrating an example of zones according to a distance between a vehicle and an electronic device supported in a digital key system according to an embodiment.

FIG. 4 is a diagram illustrating an example of zones according to a distance between a vehicle and an electronic device supported in a digital key system according to an embodiment.

Referring to FIG. 4, a digital key standard standardized by CCC provides a digital key technology with enhanced portability and security using a BLE technology and a UWB technology as well as an NFC technology as a wireless communication technology.

The BLE technology is a low-energy wireless communication technology, and the UWB technology is a wireless communication technology which enables accurate location estimation based on a ultra wideband. Because the UWB technology consumes relatively large current compared to operating time, the CCC uses the BLE technology as a control channel of the UWB technology. In an embodiment, if a BLE function is activated in the electronic device 101 and the vehicle 300, the electronic device 101 and the vehicle 300 are connected to each other and the UWB technology is operated based on a set condition if the electronic device 101 and the vehicle 300 are close, so accurate location estimation through the UWB technology may be possible. The set condition for operating the UWB technology in the BLE technology may be based on various factors. For example, the most important factor among the various factors may be a distance between the electronic device 101 and the vehicle 300.

As illustrated in FIG. 4, a zone in which a distance between the electronic device 101 and the vehicle 300 is less than a first distance (e.g., 50 m) and greater than or equal to a second distance (e.g., 6 m) may be a remote control zone, a zone in which the distance between the electronic device 101 and the vehicle 300 is less than the second distance (e.g., 6 m) and greater than or equal to a third distance (e.g., 2 m) may be a smart function zone, a zone in which the distance between the electronic device 101 and the vehicle 300 is less than the third distance (e.g., 2 m) and greater than or equal to a fifth distance (e.g., 20 cm) may be a lock/unlock zone, and a zone in which the distance between the electronic device 101 and the vehicle 300 is less than the fifth distance (e.g., 20 cm) may be a vehicle start zone.

In the remote control zone, the electronic device 101 may control a lock/unlock operation, a heating operation, and/or a start operation for the vehicle 300. In an embodiment, if the electronic device 101 enters the remote control zone, a BLE connection may be established between the electronic device 101 and the vehicle 300, and if the BLE connection is established between the electronic device 101 and the vehicle 300, the electronic device 101 and the vehicle 300 may measure a distance between the electronic device 101 and the vehicle 300 based on a UWB scheme. In a current digital key standard, a separate condition for changing the BLE connection to a UWB connection after the BLE connection between the electronic device 101 and the vehicle 300 is established is not specified, so the UWB connection may be established regardless of a distance between the electronic device 101 and the vehicle 300 if the BLE connection between the electronic device 101 and the vehicle 300 is established. So, a requirement of distance required in the digital key standard has no choice but to depend on the UWB technology. In conclusion, in the current digital key standard, the distance between the electronic device 101 and the vehicle 300 may not be identified using only the BLE technology, and an accurate location of each of the electronic device 101 and the vehicle 300 may be estimated only after the UWB connection between the electronic device 101 and the vehicle 300 is established, so the distance between the electronic device 101 and the vehicle 300 may be identified.

However, it is known that the UWB technology consumes relatively large current compared to the BLE technology, and battery consumption may be an important factor in the electronic device 101, unlike the vehicle 300 equipped with a battery having a very large capacity. So, the disclosure may provide a scheme for adaptively adjusting a time point at which a connection between the electronic device 101 and the vehicle 300 is changed from the BLE connection to the UWB connection based on a BLE high accuracy distance measurement (HADM) scheme instead of immediately establishing the UWB connection even though the BLE connection is established between the electronic device 101 and the vehicle 300 after the electronic device 101 enters the remote control zone. The scheme for adaptively adjusting the time point at which the connection between the electronic device 101 and the vehicle 300 is changed from the BLE connection to the UWB connection based on the BLE HADM scheme after the BLE connection is established between the electronic device 101 and the vehicle 300 will be described in detail below with reference to FIGS. 9 to 19.

In the smart function zone, the electronic device 101 may additionally control a remote parking or welcome light operation for the vehicle 300.

In the lock/unlock zone, a passive entry operation for the vehicle 300 may be controlled by the electronic device 101, and an example of the lock/unlock zone in the digital key system will be described with reference to FIG. 5A.

Figure 5A:
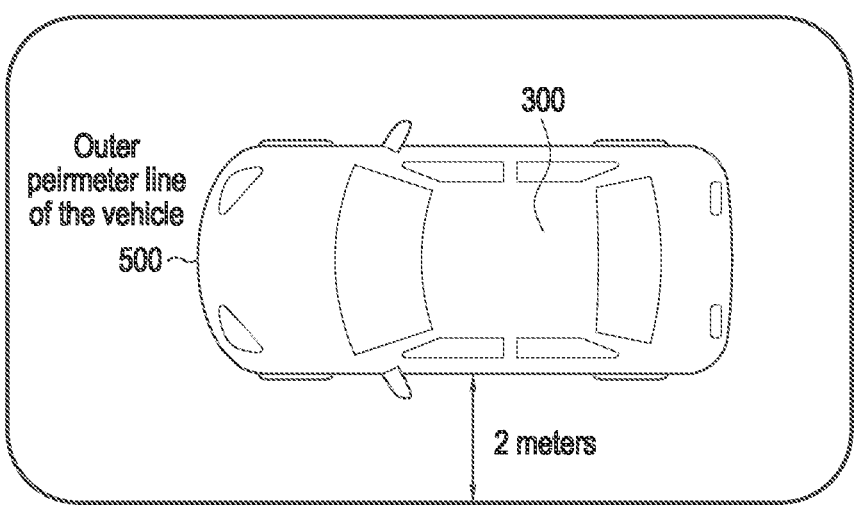
FIG. 5A is a diagram illustrating an example of a lock/unlock zone in a digital key system according to an embodiment.

FIG. 5A is a diagram illustrating an example of a lock/unlock zone in a digital key system according to an embodiment.

Referring to FIG. 5A, a zone within a third distance (e.g., 2 m) from a vehicle 300 may be a lock/unlock zone in which a passive entry operation for the vehicle 300 is possible by an electronic device 101. In an embodiment, in the lock/unlock zone, the electronic device 101 may additionally control an automatic door lock/unlock operation for the vehicle 300. In an embodiment, a distance between the electronic device 101 and the vehicle 300 may be a distance between the electronic device 101 and a front screen glazing of the vehicle 300 or a distance between the electronic device 101 and a rear screen glazing of the vehicle 300 among an outer perimeter line 500 of the electronic device 101 and the vehicle 300. The distance between the electronic device 101 and the vehicle 300 needs to be identified in order for a passive entry operation required in a digital key standard to be performed, and in a current digital key standard, the distance between the electronic device 101 and the vehicle 300 may not be identified with only a BLE technology, an accurate location of each of the electronic device 101 and the vehicle 300 may be estimated only after a UWB connection between the electronic device 101 and the vehicle 300 is established, and accordingly, the distance between the electronic device 101 and the vehicle 300 may be identified.

However, it is known that the UWB technology consumes relatively large current compared to the BLE technology, and battery consumption may be an important factor in the electronic device 101, unlike the vehicle 300 equipped with a battery having a very large capacity. So, the disclosure may provide a scheme for adaptively adjusting a time point at which a connection between the electronic device 101 and the vehicle 300 is changed from the BLE connection to the UWB connection based on an HADM scheme instead of immediately establishing the UWB connection even though the BLE connection is established between the electronic device 101 and the vehicle 300. The scheme for adaptively adjusting the time point at which the connection between the electronic device 101 and the vehicle 300 is changed from the BLE connection to the UWB connection based on the BLE HADM scheme after the BLE connection is established between the electronic device 101 and the vehicle 300 will be described in detail below with reference to FIGS. 9 to 19.

Referring back to FIG. 4, in the vehicle start zone, the electronic device 101 may control the start operation for the vehicle 300, and an example of the vehicle start zone in the digital key system will be described with reference to FIG. 5B.

Figure 5B:
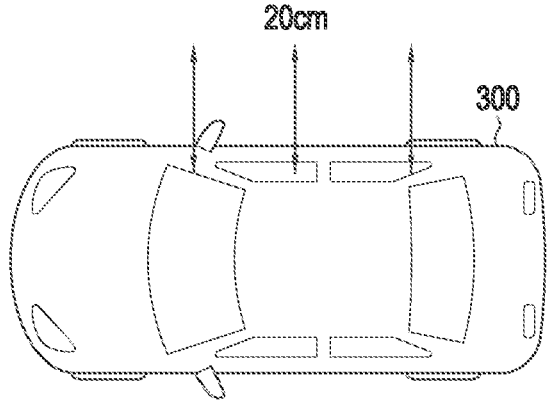
FIG. 5B is a diagram illustrating an example of a vehicle start zone in a digital key system according to an embodiment.

FIG. 5B is a diagram illustrating an example of a vehicle start zone in a digital key system according to an embodiment.

Referring to FIG. 5B, a zone in which a distance between an electronic device 101 and a vehicle 300 is less than a fifth distance (e.g., 20 cm) may be a vehicle start zone. In an embodiment, the vehicle start zone may be considered as the interior of a vehicle, and zones other than the vehicle start zone may be considered as the exterior of the vehicle. In an embodiment, in the vehicle start zone, the electronic device 101 may additionally control a start operation for the vehicle 300.

The distance between the electronic device 101 and the vehicle 300 needs to be identified in order for a vehicle start operation required in a digital key standard to be performed, and in a current digital key standard, the distance between the electronic device 101 and the vehicle 300 may not be identified with only a BLE technology, an accurate location of each of the electronic device 101 and the vehicle 300 may be estimated only after a UWB connection between the electronic device 101 and the vehicle 300 is established, and accordingly, the distance between the electronic device 101 and the vehicle 300 may be identified.

However, it is known that the UWB technology consumes a relatively large current compared to the BLE technology, and battery consumption may be an important factor in the electronic device 101, unlike the vehicle 300 equipped with a battery having a very large capacity. So, the disclosure may provide a scheme for adaptively adjusting a time point at which a connection between the electronic device 101 and the vehicle 300 is changed from the BLE connection to the UWB connection based on an HADM scheme instead of immediately establishing the UWB connection even though the BLE connection is established between the electronic device 101 and the vehicle 300. The scheme for adaptively adjusting the time point at which the connection between the electronic device 101 and the vehicle 300 is changed from the BLE connection to the UWB connection based on the BLE HADM scheme after the BLE connection is established between the electronic device 101 and the vehicle 300 will be described in detail below with reference to FIGS. 9 to 19.

Currently, a digital key standard standardized by CCC does not separately define the distance between the electronic device 101 and the vehicle 300, but specifies a connection performance between devices (e.g., the electronic device 101 and the vehicle 300), and transmitter and receiver requirements. The connection performance between the devices and the transmitter and receiver requirements specified in the digital key standard will be described with reference to FIG. 6.

Figure 6:
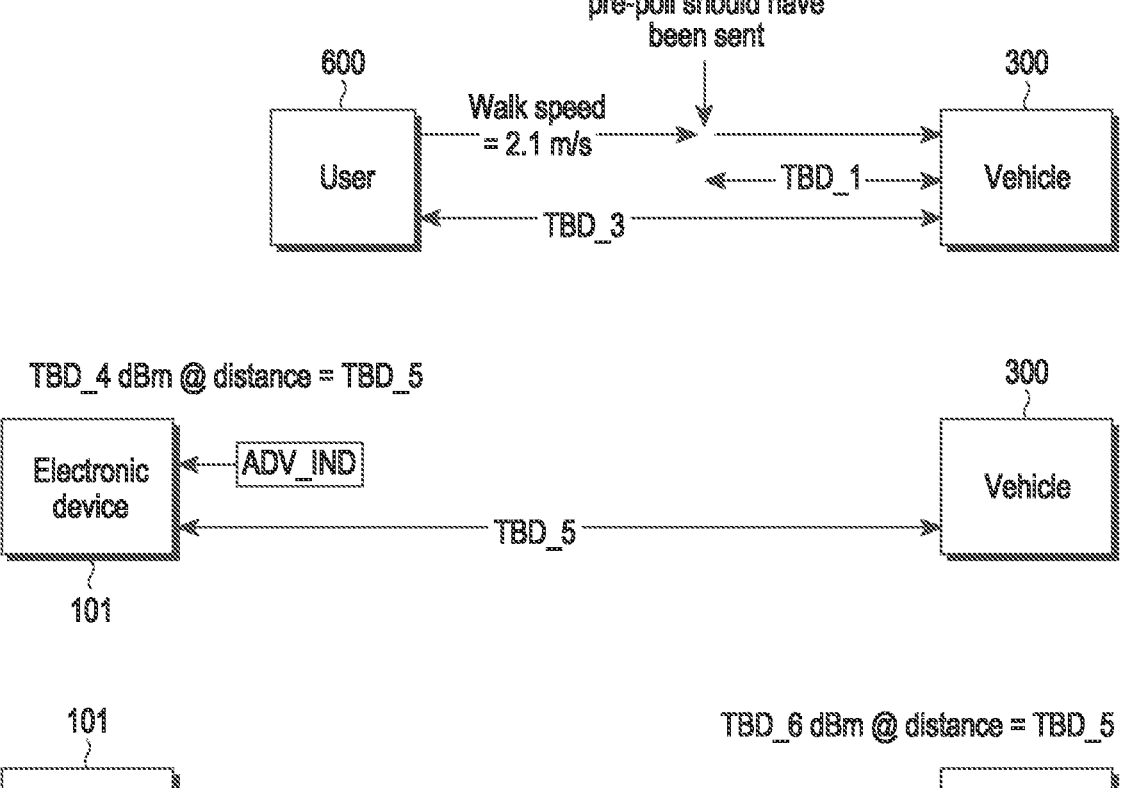
FIG. 6 is a diagram schematically illustrating a connection performance between devices and transmitter and receiver requirements in a digital key system according to an embodiment.

FIG. 6 is a diagram schematically illustrating a connection performance between devices and transmitter and receiver requirements in a digital key system according to an embodiment.

Referring to FIG. 6, it will be assumed that the speed (e.g., a walking speed) at which a user 600 of an electronic device 101 (e.g., an electronic device 101 in FIG. 1 or FIG. 2) approaches a vehicle 300 is 2.1 m/s. The vehicle 300 may be replaced with a vehicle simulator test equipment.

In an embodiment, a BLE connection between the electronic device 101 and the vehicle 300 may need to be established at a point at which a distance between the electronic device 101 and the vehicle 300 is a second distance (e.g., 6 m)(e.g., TBD_3). In an embodiment, the BLE connection which needs to be established at 6 m may be a BLE logical link control and adaptation protocol (L2CAP) connection-oriented channel (CoC) connection. In an embodiment, a last BLE packet immediately before a pre-poll packet in a UWB technology is transmitted needs to be transmitted with a 95% probability at a point at which the distance between the electronic device 101 and the vehicle 300 is a sixth distance (e.g., 3 m)(e.g., TBD_1).

In a case of packet transmission between the electronic device 101 and the vehicle 300, assuming a line of sight (LOS) environment, a BLE advertisement (BLE ADV) packet transmitted from the vehicle 300 (e.g., an ADV indication (ADV_IND) packet) needs to be detected as −80 dBm (e.g., TBD_4) or above at a point at which the distance between the electronic device 101 and the vehicle 300 is a seventh distance (e.g., 10 m)(e.g., TBD_5). The electronic device 101 may detect the strength of the BLE ADV_IND packet transmitted from the vehicle 300 based on the reference test setup. A BLE connect indication (BLE CONNECT_IND) packet of the electronic device 101 may also need to be outputted as −80 dBm or above at a point at which the distance between the electronic device 101 and the vehicle 300 is the seventh distance. The vehicle 300 may detect the strength of the BLE CONNECT_IND packet in the electronic device 101 based on the reference test setup.

According to an embodiment, for automatic door lock/unlock such as passive entry, a BLE connection (e.g., a BLE L2CAP CoC connection) may be required between the electronic device 101 and the vehicle 300 at a point at which the distance between the electronic device 101 and the vehicle 300 is 6 m, and a connection between the electronic device 101 and the vehicle 300 may need to be changed from a BLE connection to a UWB connection at a point at which the distance between the electronic device 101 and the vehicle 300 is 3 m, and for remote control such as a button-type wireless key (e.g., remote keyless entry (RKE)), the BLE connection may need to be established between the electronic device 101 and the vehicle 300 at a point at which the distance between the electronic device 101 and the vehicle 300 is 10 m. In an embodiment, the BLE connection which needs to be established at a point at which the distance between the device 101 and the vehicle 300 is 10 m may be a BLE logical layer (LL) connection.

In an embodiment, the passive entry may be possible only in a lock/unlock zone in which the distance between the electronic device 101 and the vehicle 300 is less than a third distance (e.g., 2 m) as described with reference to FIG. 4.

In the digital key system, the BLE technology is required to perform an operation which is based on the UWB technology, and whether the operation which is based on the BLE technology will be used or the operation which is based on the UWB technology will be used may be determined according to the distance between the electronic device 101 and the vehicle 300. However, the digital key standard currently provided by CCC does not separately specify the distance between the vehicle 300 and the electronic device 101 for using the BLE technology. For example, in the current digital key standard, if the electronic device 101 discovers a BLE_ADV (e.g., advertisement indication (ADV_IND)) packet transmitted from the vehicle 300, the electronic device 101 may immediately establish a BLE connection with the vehicle 300. In this case, considering a connection performance between devices (e.g., the electronic device 101 and the vehicle 300), and transmitter and receiver requirements in a digital key system as described in FIG. 6, the connection between the vehicle 300 and the electronic device 101 may be possible from a point at which the distance between the vehicle 300 and the electronic device 101 is 10 m, which is a point at which it is possible to detect the BLE_ADV packet.

Considering the connection performance between the devices (e.g., the electronic device 101 and the vehicle 300), and the transmitter and receiver requirements in the digital key system as described in FIG. 6, eventually, a requirement for the BLE connection (e.g., the BLE L2CAP CoC connection) at the point at which the distance between the vehicle 300 and the electronic device 101 is 6 m only means a reference distance between the vehicle 300 and the electronic device 101 at which the BLE connection between the electronic device 101 and the vehicle 300 needs to be established, and if the digital key system is implemented, the BLE connection between the electronic device 101 and the vehicle 300 may be established by a power class and output of a BLE module of each of the electronic device 101 and the vehicle 300. So, even though the distance between the vehicle 300 and the electronic device 101 is longer than 6 m, the BLE connection between the electronic device 101 and the vehicle 300 may be established by the power class and the output of the BLE module of each of the electronic device 101 and the vehicle 300.

Generally, if the electronic device 101 performs a BLE authentication operation with a power class 1 and the vehicle 300 also performs the BLE authentication operation with the power class 1, the BLE connection between the vehicle 300 and the electronic device 101 may be established even at a point at which the distance between the vehicle 300 and the electronic device 101 is longer than 6 m. Unnecessary resource waste may occur up to a point at which a digital key service for the vehicle 300 is required due to the BLE connection between the vehicle 300 and the electronic device 101 which is established at a point at which the distance between the vehicle 300 and the electronic device 101 is longer than 6 m which is a point at which the digital key service for the vehicle 300 is required.

Table 1 below may show power classes used in the BLE technology.

TABLE 1

| Power Class | Maximum Output Power ($P_{max}$) | Maximum Output Power[1] |
|---|---|---|
| 1 | 100 mw (+20 dBm) | 10 mw (+10 dBm) |
| 1.5 | 10 mw (+10 dBm) | 0.01 mw (−20 dBm) |
| 2 | 2.5 mw (+4 dBm) | 0.01 mw (−20 dBm) |
| 3 | 1 mw (0 dBm) | 0.01 mw (−20 dBm) |

As described in FIG. 6, for a requirement that a connection change from a BLE connection to a UWB connection is required if the electronic device 101 reaches a point which is 3 m away from the vehicle 300, the current digital key standard specifies that a last BLE packet before receiving a UWB pre-poll packet needs to be transmitted with a 95% probability up to a point at which the distance between the vehicle 300 and the electronic device 101 is 3 m.

However, the requirement that the connection change from the BLE connection to the UWB connection is required if the electronic device 101 reaches the point at which a distance from the vehicle 300 is 3 m also means a reference distance between the vehicle 300 and the electronic device 101 at which the UWB connection needs to be established. So, if the digital key system is implemented and serviced, the UWB connection may be established immediately after the BLE connection between the electronic device 101 and the vehicle 300 is established.

The current digital key standard does not specify a separate condition for changing the BLE connection to the UWB connection after the BLE connection between the electronic device 101 and the vehicle 300 is established, so the UWB connection may be established regardless of the distance between the electronic device 101 and the vehicle 300 if the BLE connection between the electronic device 101 and the vehicle 300 is established. So, a requirement of a distance such as a passive entry operation required in the digital key standard has no choice but to depend on the UWB technology. In conclusion, in the digital key standard, the distance between the electronic device 101 and the vehicle 300 may not be identified using only the BLE technology, and an accurate location of each of the electronic device 101 and the vehicle 300 may be estimated only after the UWB connection between the electronic device 101 and the vehicle 300 is established, so the distance between the electronic device 101 and the vehicle 300 may be identified.

It is known that the UWB technology (e.g., a high rate pulse repetition frequency (HRP) UWB technology) which has been used as a core technology in the digital key standard consumes a relatively large current compared to the BLE technology. A test result has been presented that the current consumption of the HRP UWB technology is several tens of times the current consumption of the BLE technology according to a chipset type. Unlike the vehicle 300 equipped with a battery having a very large capacity, battery consumption may be an important factor in the electronic device 101. The reason why the BLE technology is used for controlling the UWB technology in the digital key standard may be to reduce current consumption. However, in the current digital key standard, the distance between the electronic device 101 and the vehicle 300 may not be identified using only the BLE technology, so the connection between the electronic device 101 and the vehicle 300 may be changed from the BLE connection to the UWB connection immediately after the BLE connection is established between the electronic device 101 and the vehicle 300. In this case, an unnecessary positioning operation based on the UWB technology may be repeatedly performed in the digital key system, and this may increase current consumption in both the vehicle 300 and the electronic device 101.

For example, in a case that an owner pairing process between the electronic device 101 and the vehicle 300 is performed, the owner pairing process may be performed in a situation that the electronic device 101 including an NFC module exists on a dashboard in the vehicle 300. In the owner pairing process, an operation of identifying whether the electronic device 101 exists inside the vehicle 300 may be performed. In the owner pairing process, if there is a relay attack or a malicious and repeated security risk attempt in a form similar to the relay attack, current consumption will increase due to continuous use of the UWB technology, and this may cause damage in terms of battery consumption. Similarly to this, even though the electronic device 101 is located outside the lock/unlock zone in which the passive entry operation is valid, the electronic device 101 and the vehicle 300 may repeatedly identify the distance between the electronic device 101 and the vehicle 300 using the UWB technology, and this may increase current consumption in both the electronic device 101 and the vehicle 300.

In the digital key standard, a time synchronization scheme may be used for reducing current consumption due to the use of the UWB technology. The time synchronization scheme may be a scheme of preventing operation delay and reducing the current consumption by synchronizing a UWB clock of the electronic device 101 and a UWB clock of the vehicle 300. In the time synchronization scheme, the UWB clocks of the electronic device 101 and the vehicle 300 may be synchronized at a time point at which the BLE connection is established between the electronic device 101 and the vehicle 300 and whenever the electronic device 101 is requested from the vehicle 300 requests. The vehicle 300 may predict a clock offset which is a clock difference between the vehicle 300 and the electronic device 101, compensate for the predicted clock offset to minimize the clock offset between the vehicle 300 and the electronic device 101, and then perform an operation corresponding to a digital key event. However, in the current digital key standard, the distance between the electronic device 101 and the vehicle 300 may not be identified with only the BLE technology, so the distance between the electronic device 101 and the vehicle 300 may not be identified with only a timestamp of a time point at which the BLE connection is established between the electronic device 101 and the vehicle 300. It may be also difficult for the time synchronization scheme to solve an issue of current consumption increase which occurs as the connection between the electronic device 101 and the vehicle 300 immediately changes from the BLE connection to the UWB connection after the BLE connection is established between the electronic device 101 and the vehicle 300.

An embodiment of the disclosure may provide a device and method to adaptively adjust a time point for changing a connection between an electronic device and an external electronic device (e.g., a vehicle) from a BLE connection to a UWB connection based on a BLE distance measurement scheme (e.g., a BLE high accuracy distance measurement (HADM) scheme) in a wireless communication system.

An embodiment of the disclosure may provide a device and method to adaptively adjust a time point for establishing a UWB connection between an electronic device and an external electronic device based on a BLE distance measurement scheme in a wireless communication system.

An embodiment of the disclosure may provide a device and method to adaptively adjust a time point for establishing a UWB connection between an electronic device and an external electronic device based on a distance between the electronic device and the external electronic device which is measured based on a BLE distance measurement scheme in a wireless communication system.

In an embodiment of the disclosure, a device and method for adaptively adjusting a time point for establishing a UWB connection between an electronic device and an external electronic device will be described using a digital key system as an example, however, the device and method according to an embodiment of the disclosure may be applied to any wireless communication system which requires to change a connection between an electronic device and an external electronic device from a BLE connection to a UWB connection based on a distance between the electronic device and the external electronic device.

FIG. 7 is another example of a block diagram illustrating an electronic device 101 according to an embodiment.

Referring to FIG. 7, an electronic device 101 may be a device which implements an NFC technology, a BLE technology, a UWB technology, and/or a digital key technology according to a digital key standard.

The electronic device 101 may include a communication module (e.g., a communication module 190 in FIG. 1 or FIG. 2) for transmitting and receiving signals with an external electronic device (e.g., an electronic device 102 or 104 in FIG. 1, or a friend electronic device 350 in FIG. 3), a vehicle (e.g., a vehicle 400 in FIG. 3), or a server (e.g., a server 108 in FIG. 1 or a fourth server 340 in FIG. 3) using one or more antennas 201 (e.g., one or more antennas 201 in FIG. 2). In an embodiment, the one or more antennas 201 may be implemented as a part of an antenna module 198 in FIG. 1.

According to an embodiment, the communication module may include an NFC module 710 which is based on an NFC technology, a BLE module 720 which is based on a BLE technology, and/or a UWB module 730 which is based on a UWB technology.

The NFC module 710 may include an embedded secure element (eSE) 711, and the eSE 711 may be a secure storage device included in the electronic device 101.

The UWB module 730 may filter a received signal via a filter 731 or 735 connected to the one or more antennas 201. The UWB module 730 may switch a transmission path and a reception path via a switch 733.

A case that the electronic device 101 includes the NFC module 710, the BLE module 720, and/or the UWB module 730 has been described in FIG. 7, but at least two of the NFC module 710, the BLE module 720, and/or the UWB module 730 may be combined.

The electronic device 101 may include a processor 120 (e.g., a processor 120 in FIG. 1) (e.g., an AP) which may be implemented with one or more single-core processors or one or more multi-core processors.

According to an embodiment of the disclosure, in a digital key system, an electronic device and a vehicle may perform a BLE HADM process between the electronic device and the vehicle in order to use a UWB connection based on a distance between the electronic device and the vehicle. In an embodiment, the BLE HADM process may be performed if the occurrence of an event in which the distance between the electronic device and the vehicle needs to be measured is identified, or may be performed periodically. In an embodiment, the electronic device and the vehicle may use the UWB connection based on the distance between the electronic device and the vehicle according to a result of the BLE HADM process.

Figure 8:
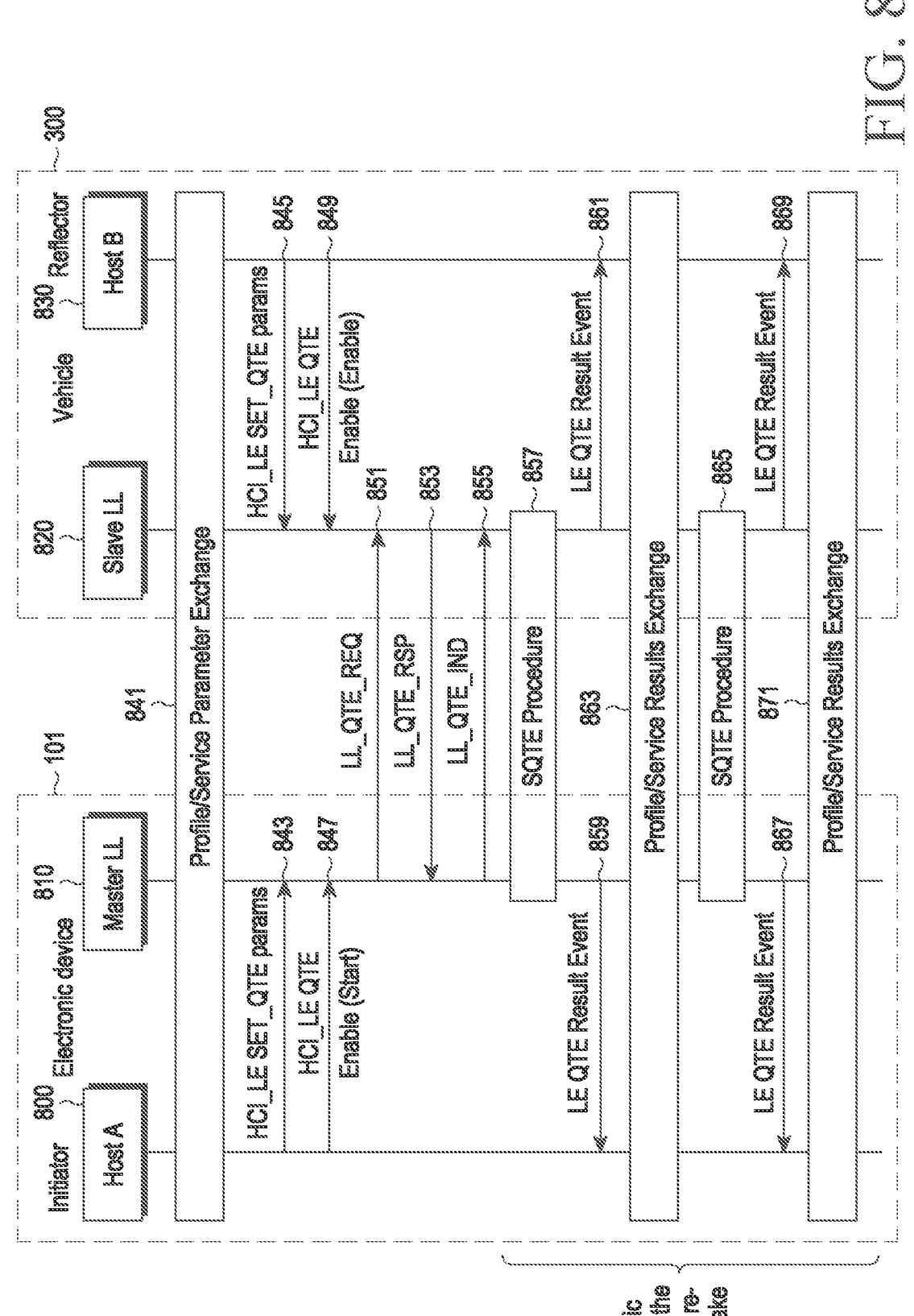
FIG. 8 is a diagram schematically illustrating an example of a periodic Bluetooth low energy (BLE) high accuracy distance measurement (HADM) process in a digital key system according to an embodiment.

FIG. 8 is a diagram schematically illustrating an example of a periodic BLE HADM process in a digital key system according to an embodiment.

Referring to FIG. 8, a periodic BLE HADM process may be performed between an electronic device 101 and a vehicle 300.

According to an embodiment, the electronic device 101 may operate as an initiator and a master. In an embodiment, the initiator may be a device which initiates a BLE HADM process, and may store phase information of a tone transmitted to a reflector and phase information of a tone received from the reflector. In an embodiment, the electronic device 101 may include a host 800 (e.g., a host A) and a master link layer (LL) 810.

In an embodiment, the vehicle 300 may operate as a reflector and a slave. In an embodiment, the vehicle 300 may perform an operation of immediately reflecting a received tone to the electronic device 101 upon receiving the tone from the electronic device 101. The vehicle 300 may store phase information of the tone received from the electronic device 101 and phase information of the tone reflected to the electronic device 101. In an embodiment, the vehicle 300 may include a host 830 (e.g., a host B) and a slave LL 820.

The electronic device 101 and the vehicle 300 may perform a ranging procedure to exchange parameters (e.g., a profile/service parameter) required to perform the BLE HADM process in operation 841. The host A 800 in the electronic device 101 and the host B 830 in the vehicle 300 may set secure quick tone exchange (SQTE) parameters related to an SQTE procedure using an HCI_LE_SET_QTE parameters (e.g., HCI_LE_SET_QTE_params) protocol data unit (PDU) and an HCI_LE_QTE_Enable command PDU in operations 841 to 849.

As the profile/service parameter is exchanged between the electronic device 101 and the vehicle 300, the host A 800 may transfer, to the master LL 810 through an HCI_LE_SET_QTE params command PDU, a profile/service parameter related to the vehicle 300 to cause the master LL 810 to configure parameters for the SQTE procedure in operation 843. As the profile/service parameter is exchanged between the electronic device 101 and the vehicle 300, the host B 830 may transfer, to the slave LL 820 through an HCI_LE_SET_QTE params command PDU, a profile/service parameter related to the electronic device 101 to cause the slave LL 820 to configure parameters for the SQTE procedure in operation 845.

In FIG. 8, it has been assumed that the electronic device 101 operates as the initiator, so the electronic device 101 may want to start the SQTE procedure. In operation 847, the host A 800 may transmit an HCI_LE_QTE_Enable command PDU to the master LL 810, and the HCI_LE_QTE_Enable command PDU transmitted from the host A 800 to the master LL 810 may include start information indicating that the SQTE procedure will be started. In FIG. 8, it has been assumed that the vehicle 300 operates as the reflector, so the host B 830 may transmit an HCI_LE_QTE_Enable command PDU to the slave LL 820 in operation 849, and the HCI_LE_QTE_Enable command PDU transmitted from the host B 830 to the slave LL 820 may include enabling information indicating that the SQTE procedure will be enabled.

Upon receiving the HCI_LE_QTE_Enable command PDU including the start information from the host A 800, the master LL 810 may transmit, to the vehicle 300, an LL_QTE_REQ PDU requesting to start the SQTE procedure in operation 851.

Upon receiving the LL_QTE_REQ PDU from the electronic device 101, the vehicle 300 may transmit, to the electronic device 101, an LL_QTE_RSP PDU which is a response PDU to the LL_QTE_REQ PDU in operation 853. In an embodiment, the LL_QTE_RSP PDU may be a PDU for identifying whether parameters included in the LL_QTE_REQ PDU are allowed. In FIG. 8, it will be assumed that the LL_QTE_RSP PDU indicating that the parameters included in the LL_QTE_REQ PDU are allowed is transmitted.

Upon receiving the LL_QTE_RSP PDU from the vehicle 300, the electronic device 101 may transmit, to the vehicle 300, an LL_QTE_IND PDU indicating a time point at which the SQTE procedure will be started in operation 855. Thereafter, the SQTE procedure may be performed between the electronic device 101 and the vehicle 300 in operation 857. In an embodiment, the SQTE procedure may be a procedure which enables phase measurement and round trip time (RTT) measurement. A case where the SQTE procedure is initiated based on a three-way handshaking scheme has been described in FIG. 8, however, if the SQTE procedure is initiated based on a two-way handshaking scheme, the vehicle 300 transmits an LL_QTE_REQ PDU to the electronic device 101, and the electronic device 101 transmits an LL_QTE_IND PDU as a response PDU to the LL_QTE_REQ PDU, thereby the SQTE procedure may be performed between the electronic device 101 and the vehicle 300.

After the SQTE procedure is terminated between the electronic device 101 and the vehicle 300, the master LL 810 may notify the host A 800 of termination of the SQTE procedure through an LE_QTE_Result_Event PDU in operation 859, and the slave LL 820 may notify the host B 830 of the termination of the SQTE procedure using an LE_QTE_Result_Event PDU in operation 861.

The electronic device 101 and the vehicle 300 may perform a ranging procedure to exchange a result (e.g., a profile/service result) of the BLE HADM process in operation 863. In an embodiment, the result of the BLE HADM process may include a phase measurement result, and a distance between the electronic device 101 and the vehicle 300 may be identified based on the phase measurement result. In an embodiment, the result of the BLE HADM process may include an RTT measurement result, and a distance between the electronic device 101 and the vehicle 300 may be identified based on the RTT measurement result.

Thereafter, an SQTE procedure may be periodically performed between the electronic device 101 and the vehicle 300 as in operation 865. If such a periodic SQTE procedure is performed, an operation of exchanging an LL_QTE_REQ PDU, an LL_QTE_RSP PDU, and an LL_QTE_IND PDU between the electronic device 101 and the vehicle 300 as in operations 851 to 855 may not need to be performed. After the SQTE procedure between the electronic device 101 and the vehicle 300 is terminated, the master LL 810 may notify the host A 800 of termination of the SQTE procedure using an LE_QTE_Result_Event PDU in operation 867, and the slave LL 820 may notify the host B 830 of the termination of the SQTE procedure using a LE_QTE_Result_Event PDU in operation 869. The electronic device 101 and the vehicle 300 may perform a ranging procedure to exchange a result (e.g., a profile/service result) of the BLE HADM process in operation 871.

A case that the periodic BLE HADM process is performed between the electronic device 101 and the vehicle 300 has been illustrated in FIG. 8, however, the electronic device 101 and the vehicle 300 may perform a BLE HADM process as needed (e.g., if an event in which the BLE HADM process needs to be performed occurs).

According to an embodiment of the disclosure, if a BLE HADM process is performed between an electronic device and a vehicle in a digital key system, a distance between the electronic device and the vehicle may be identified. According to an embodiment of the disclosure, a time point for changing a connection between an electronic device and a vehicle from a BLE connection to a UWB connection based on a distance between the electronic device and the vehicle may be adaptively adjusted in a digital key system, and the time point for changing the connection between the electronic device and the vehicle from the BLE connection to the UWB connection may include the following time points.

(1) a time point for identifying whether the electronic device is located inside the vehicle in an owner pairing process (2) a time point for identifying whether the electronic device approaches a point at which a distance from the vehicle is a set distance (e.g., a sixth distance or 3 m) in a passive process (3) a time point for identifying whether a friend's electronic device that is sharing a digital key with the electronic device approaches a point at which a distance from the vehicle is the set distance (e.g., the sixth distance or 3 m) during a friend first approach process (4) a time point for identifying whether a distance between the electronic device and the vehicle matches a distance required in an RKE action during an RKE process (5) a time point for selecting a vehicle to be connected preferentially from among a plurality of vehicles in a situation in which the electronic device approaches the plurality of vehicles during a device preference management process According to an embodiment of the disclosure, in a digital key system, a time point for changing a connection between an electronic device and a vehicle from a UWB connection to a BLE connection may be adaptively adjusted based on the distance between the electronic device and the vehicle, and the time point for changing the connection between the electronic device and the vehicle from the UWB connection to the BLE connection may also include at least one of (1), (2), (3), (4), and/or (5).

Figure 9:
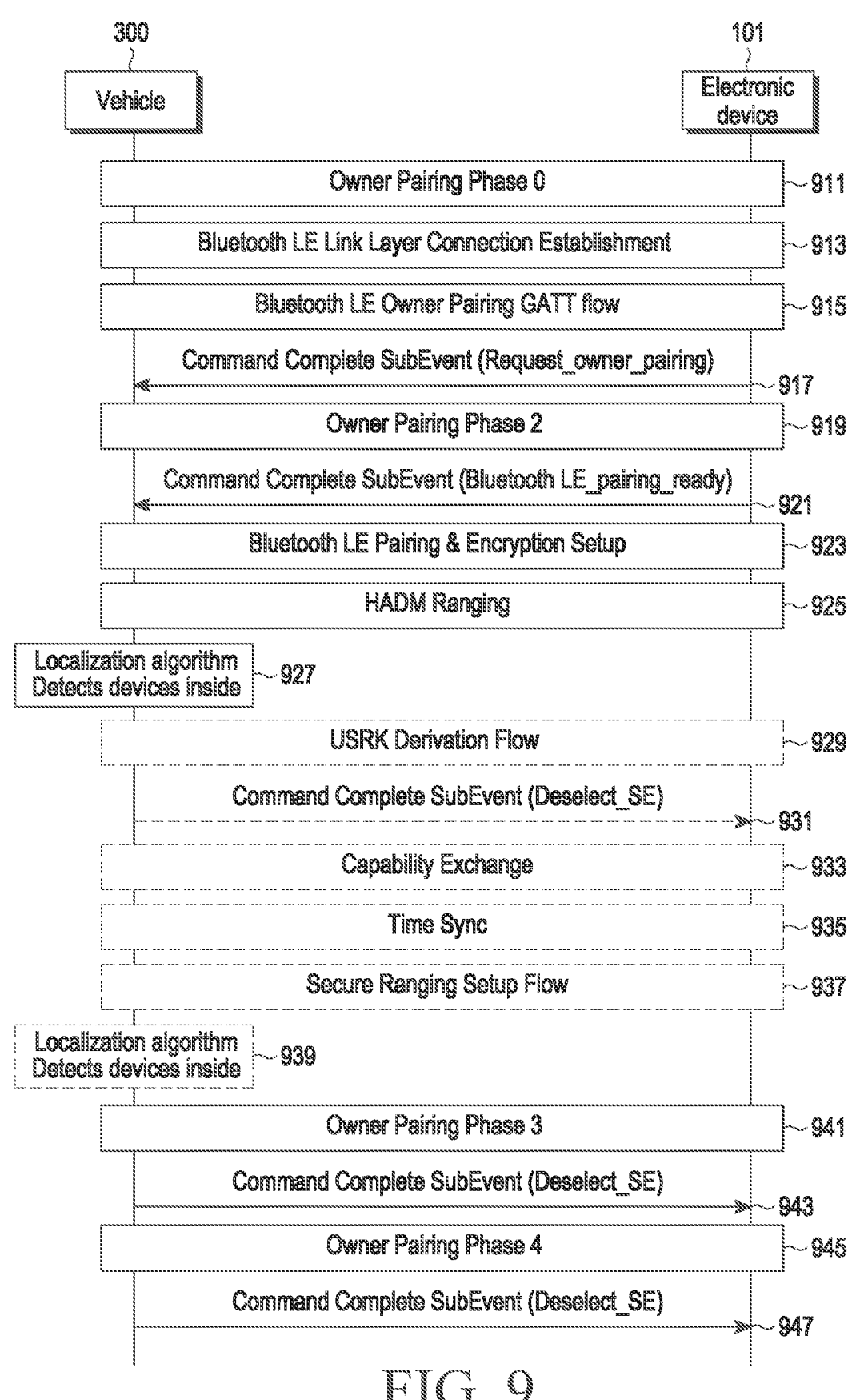
FIG. 9 is a diagram schematically illustrating an example of an owner pairing process in a digital key system according to an embodiment.

FIG. 9 is a diagram schematically illustrating an example of an owner pairing process in a digital key system according to an embodiment.

Referring to FIG. 9, an owner pairing process may be triggered if a vehicle 300 initiates owner pairing connection establishment, or may be triggered if the vehicle 300 enters a vehicle system menu of an electronic device 101 to initiate owner pairing. In an embodiment, owner pairing initiation by the electronic device 101 may be performed through a UI.

In operation 911, an owner pairing phase 0 operation may be performed between the electronic device 101 and the vehicle 300. In an embodiment, the owner pairing phase 0 operation may be a preparation operation to perform the owner pairing process.

In operation 913, a Bluetooth LE link layer connection establishment (BLE LL connection establishment) operation may be performed between the electronic device 101 and the vehicle 300. During the BLE LL connection establishment operation, the electronic device 101 may establish a BLE connection, discover digital key (DK) services and characteristics, and establish a BLE logical link control and adaptation protocol (L2CAP) channel.

In operation 915, a BLE owner pairing generic attribute profile (GATT) flow may be performed between the electronic device 101 and the vehicle 300.

In operation 917, the electronic device 101 may transmit a command complete subevent PDU to the vehicle 300, and the command complete subevent PDU may include an owner pairing request (Request_Owner_Pairing) subevent notification for requesting an owner pairing process.

If the vehicle 300 receives, from the electronic device 101, the command complete subevent PDU including the owner pairing request subevent notification, an owner pairing phase 2 operation may be performed between the electronic device 101 and the vehicle 300. In an embodiment, the owner pairing phase 2 operation may include a simple password authenticated key exchange (SPAKE2+) flow and certificate exchange operation. In an embodiment, the owner pairing phase 2 operation enables SPAKE2+-based secure channel and certificate exchange between electronic device 101 and vehicle 300. In the owner pairing phase 2 operation, both the electronic device 101 and the vehicle 300 may perform an SPAKE2+ flow to derive system keys and derive out-of-band (OOB) BLE keys. In the owner pairing phase 2 operation, both the electronic device 101 and the vehicle 300 may derive (or obtain) UWB solution specific keys, as well as the system keys and the OOB BLE keys. In an embodiment, the UWB solution specific keys may include Kble_oob_master and/or Kble_intro. In an embodiment, Kble_oob_master may be a shared secret key between the electronic device 101 and the vehicle 300 used for deriving Kble_oob for encrypting OOB pairing data during a first approach process. In an embodiment, Kble_intro may be used for encrypting a digital key identifier (DK_Identifier) during the first approach process. According to an embodiment, in the owner pairing phase 2 operation, the vehicle 300 may provide a wireless capability of the vehicle 300. In an embodiment, wireless capability combinations which may be used in the digital key system may include the following:

(1) WCC1: Only an NFC technology may be used.

(2) WCC2: An NFC technology and a BLE technology may be used (NFC+RKE functions may be used).

(3) WCC3: An NFC technology, a BLE technology, and a UWB technology may be used (NFC+RKE functions+passive/location-based functions may be used).

According to an embodiment, in the owner pairing phase 2 operation, the electronic device 101 may store at least one of Kble_oob_master, a Bluetooth random static address of the vehicle 300, or an identity resolving key (IRK) of the vehicle 300.

In operation 921, the vehicle 300 may transmit a command complete subevent PDU to the electronic device 101, and the command complete subevent PDU may include Bluetooth LE pairing ready (Bluetooth LE_pairing_ready) subevent notification indicating that BLE pairing is ready.

If the electronic device 101 receives, from the vehicle 300, the command complete subevent PDU including the Bluetooth LE pairing ready subevent notification, a Bluetooth LE pairing procedure and an encryption setup procedure (Bluetooth LE pairing & encryption setup procedure) may be performed between the electronic device 101 and the vehicle 300 in operation 923. In an embodiment, the BLE pairing procedure and the encryption setup procedure may enable sharing of data between the electronic device 101 and the vehicle 300 to enable BLE secure pairing.

When the BLE pairing procedure and the encryption setup procedure between the electronic device 101 and the vehicle 300 are completed, a BLE HADM ranging procedure (e.g., a BLE HADM process) may be performed between the electronic device 101 and the vehicle 300 in operation 925. For example, the reason why the BLE HADM process is performed after the BLE pairing procedure and the encryption setup procedure are completed may be to establish a UWB connection only if the UWB connection is actually required, such as an owner pairing phase 3 included in an owner pairing process. For example, the BLE HADM process is performed after the BLE pairing procedure and the encryption setup procedure are completed, thereby a distance between the electronic device 101 and the vehicle 300 may be accurately measured, and a UWB connection is established based on the accurate distance between the electronic device 101 and the vehicle 300 only if the UWB connection actually required, thereby reducing current consumption in the electronic device 101. The BLE HADM process may be implemented similarly to a BLE HADM process described in FIG. 8, and a detailed description thereof will be omitted herein. As the BLE HADM ranging procedure between the electronic device 101 and the vehicle 300 is completed, each of the electronic device 101 and the vehicle 300 may identify the distance between the electronic device 101 and the vehicle 300.

In operation 927, the vehicle 300 may identify whether the electronic device 101 exists inside the vehicle 300 based on the distance between the electronic device 101 and the vehicle 300 identified according to the BLE HADM ranging procedure. In an embodiment, the vehicle 300 may identify whether the electronic device 101 exists inside the vehicle 300 based on whether the electronic device 101 exists in a vehicle start zone. In an embodiment, the vehicle start zone may be a zone in which the distance between the electronic device 101 and the vehicle 300 is less than a set distance (e.g., 20 cm). In operation 927, the reason why the vehicle 300 identifies whether the electronic device 101 exists inside the vehicle 300 is that an owner pairing phase 3 operation included in the owner pairing process may be performed only if the electronic device 101 exists inside the vehicle 300.

As an identifying result in operation 927, if the electronic device 101 does not exist inside the vehicle 300, the vehicle 300 may release the BLE connection established with the electronic device 101, and may not perform any further operation related to the owner pairing process. Like this, if the electronic device 101 does not exist inside the vehicle 300, any further operation related to the owner pairing process may not be performed, thereby preventing a situation in which a UWB connection is automatically established as a BLE connection is established between the electronic device 101 and the vehicle 300 and reducing current consumption of both the electronic device 101 and the vehicle 300 according to this.

In FIG. 9, it will be assumed that the electronic device 101 exists inside the vehicle 300, so a UWB ranging secret key (URSK) derivation flow may be performed between the electronic device 101 and the vehicle 300 through the BLE connection in operation 929. In an embodiment, the URSK derivation flow may be derived using a UWB session ID (UWB_Session_Id), and a URSK may be a key required to perform the UWB ranging procedure.

When the URSK derivation flow is completed between the electronic device 101 and the vehicle 300, the vehicle 300 may transmit a command complete subevent PDU to the electronic device 101 in operation 931, and the command complete subevent PDU may include SE deselection (Deselect_SE) subevent notification indicating that a digital key applet is deselected. Upon receiving the command complete subevent PDU including the SE deselection subevent notification from the vehicle 300, the electronic device 101 may deselect the digital key applet.

In operation 933, the electronic device 101 and the vehicle 300 may perform a capability exchange procedure for performing the owner pairing process. In an embodiment, if at least one of the electronic device 101 or the vehicle 300 has, for example, a updated digital key protocol version, a updated UWB configuration ID, and updated pulseshape combinations which are different from a protocol version, a UWB configuration ID, and pulseshape combinations which are supported during a previous capability exchange procedure, the capability exchange procedure may be performed between the electronic device 101 and the vehicle 300 in operation 933.

In an embodiment, the capability exchange procedure performed between the electronic device 101 and the vehicle 300 will be described as follows.

The vehicle 300 may initiate the capability exchange procedure by transmitting a ranging capability request (Ranging_Capability_RQ) PDU to the electronic device 101. The Ranging_Capability_RQ PDU may include at least one of Supported_DK_Protocol_Version_Len as a parameter indicating a length of a supported digital key protocol version, Supported_DK_Protocol_Version as a parameter indicating the supported digital key protocol version, Supported_UWB_Config_Id_Len as a parameter indicating a length of a supported UWB configuration ID, Supported_UWB_Config_Id as a parameter indicating the supported UWB configuration ID, Supported_PulseShape_Comb_Len as a parameter indicating a length of a supported pulse shape combination, or Supported_PulseShape_Comb as a parameter indicating the supported pulse shape combination.

Upon receiving the Ranging_Capability_RQ PDU from the vehicle 300, the electronic device 101 may select a digital key protocol version, a UWB configuration ID, and a pulse shape combination. After selecting the digital key protocol version, the UWB configuration ID, and the pulse shape combination, the electronic device 101 may transmit, to the vehicle 300, a ranging capability response (Ranging_Capability_RS) PDU which is a response PDU to the Ranging_Capability_RQ PDU. The Ranging_Capability_RS PDU may include at least one of Selected_DK_Protocol_Version which is a parameter indicating the selected digital key protocol version, Selected_UWB_Config_Id which is a parameter indicating the selected UWB configuration ID, or Selected_PulseShape_Comb which is a parameter indicating the selected pulse shape combination.

In operation 935, the electronic device 101 and the vehicle 300 may perform a time synchronization (Time Sync) procedure.

In operation 937, the electronic device 101 and the vehicle 300 may perform a secure ranging setup flow. When the capability exchange procedure is performed between the electronic device 101 and the vehicle 300, the vehicle 300 may initiate the secure ranging setup flow. In the secure ranging setup flow, the electronic device 101 and the vehicle 300 may perform exchange operations to determine ranging parameter values required to set up secure ranging. In the secure ranging setup flow, the vehicle 300 may notify the electronic device 101 of which URSK is used by transmitting a ranging session request (Ranging_Session_RQ) PDU. When the secure ranging setup flow is performed between the electronic device 101 and the vehicle 300, a secure ranging session based on a UWB technology may be established between the electronic device 101 and the vehicle 300.

In operation 939, the vehicle 300 may identify whether the electronic device 101 exists inside the vehicle 300 according to an HRP UWB ranging procedure. In an embodiment, the vehicle 300 may identify whether the electronic device 101 exists inside the vehicle 300 based on whether the electronic device 101 exists in the vehicle start zone. In operation 939, the reason why the vehicle 300 identifies whether the electronic device 101 exists inside the vehicle 300 is that the owner pairing phase 3 operation included in the owner pairing process may be performed only if the electronic device 101 exists inside the vehicle 300. As an identifying result in operation 939, if the electronic device 101 does not exist inside the vehicle 300, the vehicle 300 may transmit an appropriate subevent code to the electronic device 101 to abort an owner pairing attempt of the electronic device 101. In an embodiment, as an identifying result in operation 939, if the electronic device 101 does not exist inside the vehicle 300, the vehicle 300 may release the UWB connection established with the electronic device 101 and may not perform any further operation related to the owner pairing process. Like this, if the electronic device 101 does not exist inside the vehicle 300, any further operation related to the owner pairing process may not be performed, thereby preventing current consumption due to a UWB connection between the electronic device 101 and the vehicle 300 and reducing current consumption of both the electronic device 101 and the vehicle 300 according to this.

In FIG. 9, it will be assumed that the electronic device 101 exists inside the vehicle 300, so the owner pairing phase 3 operation may be performed between the electronic device 101 and the vehicle 300 through BLE in operation 941. When the owner pairing phase 3 operation between the electronic device 101 and the vehicle 300 is completed, the vehicle 300 may transmit a command complete subevent PDU to the electronic device 101 in operation 943, and the command complete subevent PDU may include a secure element (SE) deselection (Deselect_SE) subevent notification indicating that the digital key applet is deselected. Upon receiving the command complete subevent PDU including the SE deselection subevent notification from the vehicle 300, the electronic device 101 may deselect the digital key applet. In operation 945, an owner pairing phase 4 operation may be performed between the electronic device 101 and the vehicle 300 through the BLE. When the owner pairing phase 4 operation between the electronic device 101 and the vehicle 300 is completed, the vehicle 300 may transmit a command complete subevent PDU to the electronic device 101 in operation 947, and the command complete subevent PDU may include an SE deselection subevent notification indicating that the digital key applet is deselected. Upon receiving the command complete subevent PDU including the SE deselection subevent notification from the vehicle 300, the electronic device 101 may deselect the digital key applet.

As described in FIG. 9, while performing the owner pairing process in the digital key system, the electronic device 101 and the vehicle 300 establish the UWB connection only if the electronic device 101 exists inside the vehicle 300 based on the BLE HADM process after the BLE connection is established, instead of immediately changing the connection between the electronic device 101 and the vehicle 300 from the BLE connection to the UWB connection after establishing the BLE connection, thereby reducing current consumption of both the electronic device 101 and the vehicle 300 due to unnecessary UWB connection.

Figure 10:
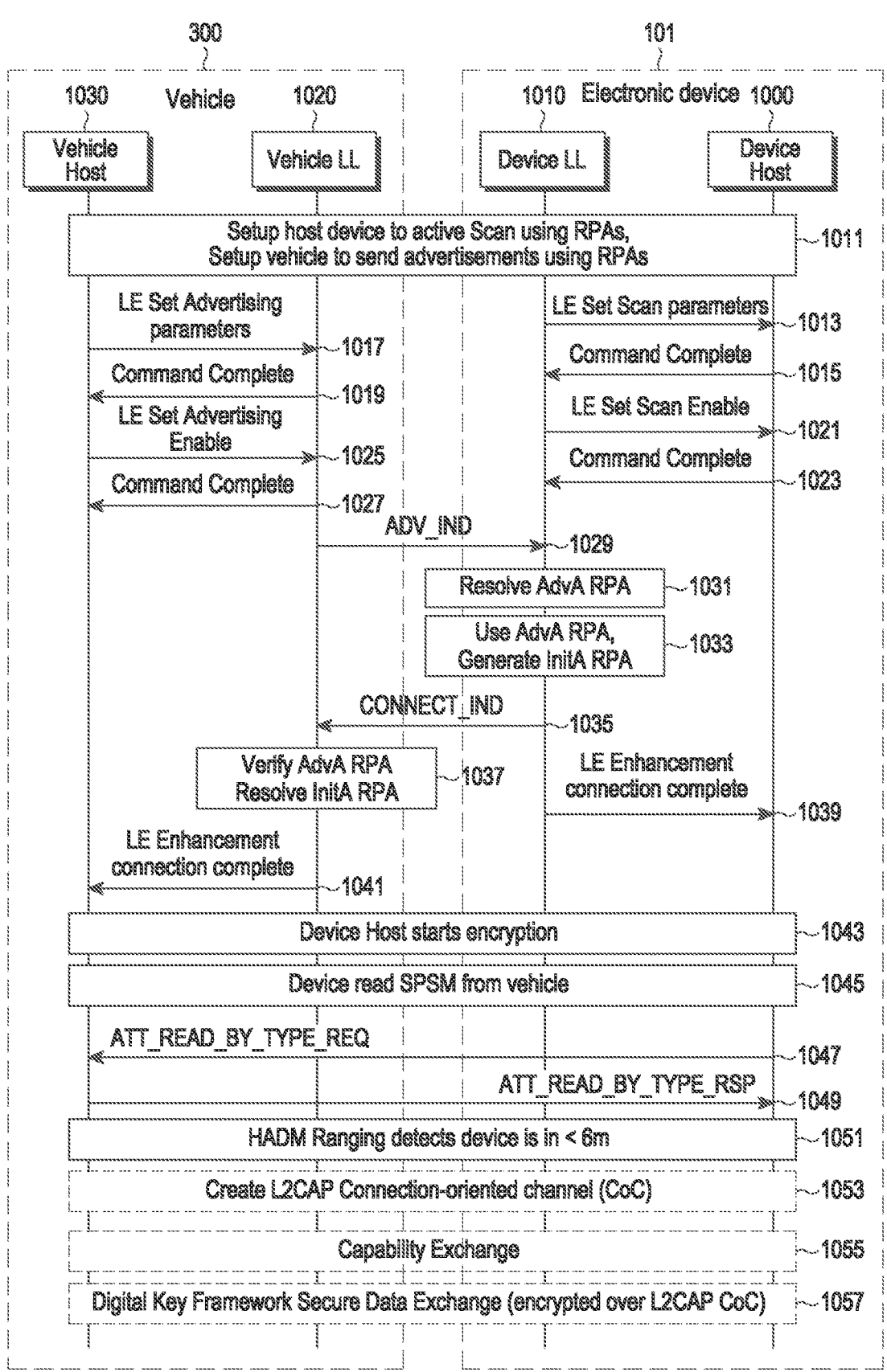
FIG. 10 is a diagram schematically illustrating an example of a passive entry process in a digital key system according to an embodiment.

FIG. 10 is a diagram schematically illustrating an example of a passive entry process in a digital key system according to an embodiment.

Referring to FIG. 10, an electronic device 101 may include an electronic device host 1000 (e.g., a host A 800 in FIG. 8) and an electronic device LL 1010 (e.g., a master LL 810 in FIG. 8), and a vehicle 300 may include a vehicle host 1030 (e.g., a host B 830 in FIG. 8) and a vehicle LL 1020 (e.g., a slave LL 820 in FIG. 8).

When BLE pairing and encryption of BLE setup are completed, a passive entry process may be performed between the electronic device 101 and the vehicle 300. In operation 1011, the electronic device 101 may be activated to perform a scan operation using resolvable private addresses (RPAs), and the vehicle 300 may be set up to transmit a BLE_ADV packet using the RPAs. In an embodiment, an RPA may be generated based on an IRK and a random value. For example, the RPA may be implemented with 48 bits, and may be divided into a first part and a second part. In an embodiment, the first part may be prand which is a 24-bit random part, and the second part may be hash which is a 24-bit hash part. In an embodiment, a least significant octet of the RPA may be a least significant octet of hash, and a most significant octet of the RPA may be a most significant octet of prand.

In operation 1013, the electronic device LL 1010 may transmit, to the electronic device host 1000, an LE scan parameter set command (LE Set Scan parameters command) PDU for commanding to set scan parameters. In an embodiment, the LE scan parameter set command PDU may include at least one of LE_Scan_Type which is a parameter indicating a type of a scan operation to be performed, LE_Scan_Interval which is a parameter indicating an interval at which the scan operation is performed, LE_Scan_Window which is a parameter indicating a window in which the scan operation is performed, Own_Address_Type which is a parameter indicating a type of an address used in scan request packets, or Scanning_Filter_Policy which is a parameter indicating a filter policy to be applied in the scan operation. Upon receiving the LE scan parameter set command PDU from the electronic device LL 1010, the electronic device host 1000 may transfer, to the electronic device LL 1010, a command complete event PDU which is a response PDU to the LE scan parameter set command PDU in operation 1015.

In operation 1017, the vehicle host 1030 may transfer, to the vehicle LL 1020, an LE advertising parameter set command (LE Set Advertising parameters command) PDU for commanding to set advertising parameters. In an embodiment, the LE advertising parameter set command PDU may include at least one of Advertising_Interval_Min which is a parameter indicating a minimum interval at which an advertising operation is performed, Advertising_Interval_Max which is a parameter indicating a maximum interval at which the advertising operation is performed, Advertising_Type which is a parameter used for determining a PDU type used for advertising, Own_Address_Type which is a parameter indicating a type of an address used in a BLE_ADV PDU, Peer_Address_Type which is a parameter indicating a type of an identify address of a peer device, Peer_Address indicating the identify address of the peer device, Advertising_Channel_Map which is a parameter indicating an advertising channel, or Advertising_Filter_Policy which is a parameter indicating a filter policy to be applied in the scan operation. Upon receiving the LE advertising parameter set command PDU from the vehicle host 1030, the vehicle LL 1020 may transfer, to the vehicle host 1030, a command complete event PDU which is a response PDU to the LE advertising parameter set command PDU in operation 1019.

In operation 1021, the electronic device LL 1010 may transfer, to the electronic device host 1000, an LE scan enable set command (LE Set Scan Enable command) PDU for requesting to start a scan operation. Upon receiving the LE scan enable set command PDU from the electronic device LL 1010, the electronic device host 1000 may transfer a command complete event PDU which is a response PDU to the LE scan enable set command PDU in operation 1023.

In operation 1025, the vehicle host 1030 may transfer, to the vehicle LL 1020, an LE advertising enable set command (LE Set Advertising Enable command) PDU for requesting to start an advertising operation. Upon receiving the LE advertising enable set command PDU from the vehicle host 1030, the vehicle LL 1020 may transfer a command complete event PDU which is a response PDU to the LE advertising enable set command PDU in operation 1027.

The vehicle 300 may transmit an advertising indication (ADV_IND) PDU to the electronic device 101 in operation 1029. Upon receiving the ADV_IND PDU from the vehicle 300, the electronic device LL 1010 in the electronic device 101 may interpret an RPA which is an advertisement access (AdvA) included in the ADV_IND PDU in operation 1031. The electronic device LL 1010 interpreting the AdvA RPA may generate an initiator's address (InitA) using the AdvA RPA in operation 1033.

The electronic device 101 may transmit a connect indication (CONNECT_IND) PDU to the vehicle 300 in operation 1035. Upon receiving the CONNECT_IND PDU from the electronic device 101, the vehicle LL 1020 in the vehicle 300 may verify an RPA included in the CONNECT_IND PDU in operation 1037 and interpret an InitA included in the CONNECT_IND PDU.

In operation 1039, the electronic device LL 1010 in the electronic device 101 may transfer, to the electronic device host 1000, an LE enhancement connection complete event (LE_Enhancement_Connection_Complete event) PDU indicating that a new connection is generated. In operation 1041, the vehicle LL 1020 in the vehicle 300 may transfer, to the vehicle host 1030, an LE enhancement connection complete event PDU indicating that a new connection is generated.

As such a new connection is generated, the electronic device host 1000 in the electronic device 101 may start an encryption operation in operation 1043. In operation 1045, the electronic device 101 may receive a simplified protocol/service multiplexer (SPSM) PDU from the vehicle 300 and read the received SPSM PDU.

Upon reading the SPSM PDU received from the vehicle 300, the electronic device 101 may transmit, to the vehicle 300, an ATT_READ_BY_TYPE_REQ PDU to obtain values of an attribute in operation 1047. In an embodiment, the ATT_READ_BY_TYPE_REQ PDU may be transmitted from the electronic device host 1000 to the vehicle host 1030. Upon receiving the ATT_READ_BY_TYPE_REQ PDU from the electronic device 101, the vehicle 300 may transmit an ATT_READ_BY_TYPE_RSP PDU which is a response PDU to the ATT_READ_BY_TYPE_REQ PDU to the electronic device 101 in operation 1049. In an embodiment, the ATT_READ_BY_TYPE_RSP PDU may include values of an attribute requested by the ATT_READ_BY_TYPE_REQ PDU, and may be transmitted from the vehicle host 1030 to the electronic device host 1000.

A CCC standard specifies that a BLE connection needs to be established between the electronic device 101 and the vehicle 300 if a distance between the electronic device 101 and the vehicle 300 is close to a set distance (e.g., a second distance), and the BLE connection in this case may be a BLE L2CAP connection-oriented channel (CoC) connection. For example, the second distance may be 6 m. When the BLE L2CAP CoC connection is established between the electronic device 101 and the vehicle 300, the electronic device 101 and the vehicle 300 may perform a preparation operation for a UWB ranging process together with an SE communication between the electronic device 101 and the vehicle 300.

According to an embodiment of the disclosure, in operation 1051, a BLE HADM ranging procedure (e.g., a BLE HADM process) may be performed between the electronic device 101 and the vehicle 300 such that the BLE L2CAP CoC connection is not established between the electronic device 101 and the vehicle 300 at a point at which the distance between the electronic device 101 and the vehicle 300 is longer than or equal to the second distance. The BLE HADM process may be implemented similarly to a BLE HADM process described in FIG. 8, and a detailed description thereof will be omitted herein.

As the BLE HADM ranging procedure between the electronic device 101 and the vehicle 300 is completed, the distance between the electronic device 101 and the vehicle 300 may be identified. The vehicle 300 may identify whether the electronic device 101 exists within the second distance from the vehicle 300 based on the distance between the electronic device 101 and the vehicle 300 identified according to the BLE HADM ranging procedure. If the electronic device 101 does not exist within the second distance from the vehicle 300, the vehicle 300 may not perform any further operation related to a passive entry process. Like this, if the electronic device 101 does not exist within the second distance from the vehicle 300, any further operation related to the passive entry process is not performed, thereby a BLE L2CAP CoC connection may not be established between the electronic device 101 and the vehicle 300. As the BLE L2CAP CoC connection is not established in this way, current consumption which occurs as the BLE L2CAP CoC connection is changed to a UWB connection after the BLE L2CAP CoC connection is established between the electronic device 101 and the vehicle 300 may be prevented, and this may reduce current consumption of both the electronic device 101 and the vehicle 300.

In FIG. 10, it will be assumed that the distance between the electronic device 101 and the vehicle 300 identified according to the BLE HADM ranging procedure is shorter than the second distance, so the electronic device 101 and the vehicle 300 may generate (establish) a BLE L2CAP CoC connection in operation 1053. After the BLE L2CAP CoC connection is established between the electronic device 101 and the vehicle 300, the electronic device 101 and the vehicle 300 may perform a capability exchange operation in operation 1055. In an embodiment, the capability exchange operation between the electronic device 101 and the vehicle 300 in operation 1055 may be performed if at least one of the electronic device 101 or the vehicle 300 has, for example, a updated digital key protocol version, a updated UWB configuration ID, and updated pulseshape combinations which are different from a protocol version, a UWB configuration ID, and pulseshape combinations which are supported during a previous capability exchange procedure. The capability exchange procedure performed between the electronic device 101 and the vehicle 300 may be implemented similarly to a capability exchange procedure described in operation 933 in FIG. 9, so a detailed description thereof will be omitted.

After the capability exchange operation is performed between the electronic device 101 and the vehicle 300, the electronic device 101 and the vehicle 300 may perform a digital key framework secure data exchange operation in operation 1057.

As described in FIG. 10, in the digital key system, the electronic device 101 and the vehicle 300 may establish the BLE L2CAP CoC connection only if the electronic device 101 exists within the second distance from the vehicle 300 based on the BLE HADM process instead of establishing the BLE L2CAP CoC connection immediately after establishing a new connection while performing the passive entry process. Like this, the BLE L2CAP CoC connection may be established only if the distance between the electronic device 101 and the vehicle 300 is shorter than the second distance, thereby preventing current consumption caused by changing a connection between the electronic device 101 and the vehicle 300 from the BLE L2CAP CoC connection to the UWB connection after the BLE L2CAP CoC connection is established regardless of whether the distance between the electronic device 101 and the vehicle 300 is shorter than the second distance, and this may reduce current consumption of both the electronic device 101 and the vehicle 300.

Figure 11:
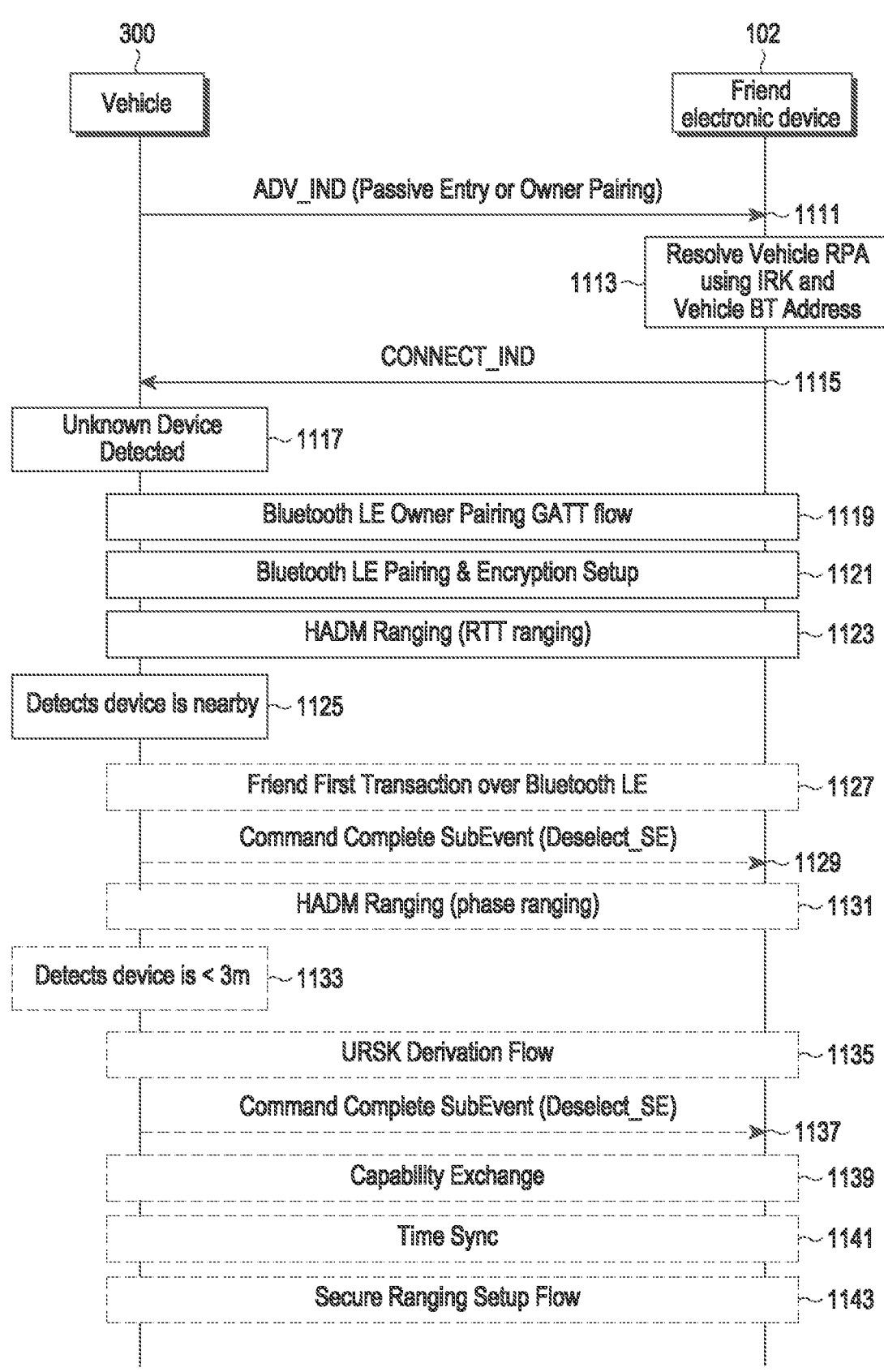
FIG. 11 is a diagram schematically illustrating an example of a friend first approach process in a digital key system according to an embodiment.

FIG. 11 is a diagram schematically illustrating an example of a friend first approach process in a digital key system according to an embodiment.

Referring to FIG. 11, a friend electronic device 102 (e.g., an electronic device 102 in FIG. 1) may be an electronic device capable of supporting an NFC technology, a BLE technology, and a UWB technology which successfully receives a digital key access to an owner's vehicle 300 during a friend first approach process. During the friend first approach process, the friend electronic device 102 may use RKE features authorized using the BLE technology, and may use a passive entry feature without additional manual input or intent. The friend first approach process illustrated in FIG. 11 may be used in at least one of a passive entry process or an owner pairing process.

In operation 1111, the vehicle 300 may transmit an ADV_IND PDU. Upon receiving the ADV_IND PDU transmitted from the vehicle 300, the friend electronic device 102 may interpret an RPA of the vehicle 300 using an IRK and a Bluetooth address of the vehicle 300 in operation 1113. As the RPA of the vehicle 300 is interpreted, the friend electronic device 102 may identify that the received ADV_IND PDU is the ADV_IND PDU transmitted from the vehicle 300, and may transmit a CONNECT_IND PDU to the vehicle 300 in operation 1115.

Upon receiving the CONNECT_IND PDU from the friend electronic device 102, the vehicle 300 may detect that an unknown device exists in operation 1117. In an embodiment, the unknown device may be the friend electronic device 102. The vehicle 300 and the friend electronic device 102 may perform a BLE owner pairing GATT flow in operation 1119. After the BLE owner pairing GATT flow is performed, the vehicle 300 and the friend electronic device 102 may perform a BLE pairing procedure and an encryption setup procedure in operation 1121. In an embodiment, the BLE pairing procedure and the encryption setup procedure may enable sharing of data between the friend electronic device 102 and the vehicle 300 to enable BLE secure pairing.

When the BLE pairing procedure and the encryption setup procedure between the friend electronic device 102 and the vehicle 300 are completed, in operation 1123, a BLE HADM ranging procedure (e.g., a BLE HADM process) may be performed between the friend electronic device 102 and the vehicle 300. The BLE HADM process performed between the friend electronic device 102 and the vehicle 300 in operation 1123 may be a BLE HADM process which is based on RTT ranging. A speed of the BLE HADM process which is based on the RTT ranging may be faster compared to a BLE HADM process which is based on phase ranging, and may prevent a relay attack. For example, the BLE HADM process which is based on the RTT ranging may prevent the relay attack which a malicious user attempts from a distance using a signal amplification device and/or a phase distortion device. As the BLE HADM ranging procedure is completed between the friend electronic device 102 and the vehicle 300, the distance between the friend electronic device 102 and the vehicle 300 may be identified.

The vehicle 300 may identify whether the friend electronic device 102 exists in the vicinity of the vehicle 300 based on the identified distance between the friend electronic device 102 and the vehicle 300 in operation 1125. In an embodiment, if the distance between the vehicle 300 and the friend electronic device 102 is shorter than a first set distance (e.g., the second distance), the vehicle 300 may identify that the friend electronic device 102 exists in the vicinity of the vehicle 300. For example, the second distance may be 6 m. If the friend electronic device 102 does not exist within the second distance from the vehicle 300, the vehicle 300 may not perform any further operation related to a passive entry process or an owner pairing process. Like this, the vehicle 300 does not perform any further operation related to the passive entry process or the owner pairing process if the friend electronic device 102 does not exist within the second distance from the vehicle 300, thereby preventing a case that a connection between the friend electronic device 102 and the vehicle 300 is changed from a BLE connection to a UWB connection regardless of the distance between the friend electronic device 102 and the vehicle 300 after the BLE connection is established, and this may reduce current consumption of both the friend electronic device 102 and the vehicle 300.

In FIG. 11, it will be assumed that the friend electronic device 102 exists in the vicinity of the vehicle 300, so a friend first transaction procedure may be performed between the friend electronic device 102 and the vehicle 300 through the BLE connection in operation 1127. When the friend first transaction procedure is completed between the friend electronic device 102 and the vehicle 300, the vehicle 300 may transmit a command complete subevent PDU to the friend electronic device 102 in operation 1129, and the command complete subevent PDU may include an SE deselection subevent notification indicating that a digital key applet is deselected. Upon receiving the command complete subevent PDU including the SE deselection subevent notification from the vehicle 300, the friend electronic device 102 may deselect the digital key applet.

In operation 1131, a BLE HADM ranging procedure (e.g., a BLE HADM process) may be performed between the friend electronic device 102 and the vehicle 300. The BLE HADM process performed between the friend electronic device 102 and the vehicle 300 in operation 1131 may be a BLE HADM process which is based on phase ranging. In an embodiment, the BLE HADM process which is based on the phase ranging may provide higher accuracy than accuracy of a BLE HADM process which is based on RTT ranging. As the BLE HADM ranging procedure is completed between the friend electronic device 102 and the vehicle 300, a distance between the friend electronic device 102 and the vehicle 300 may be identified. The vehicle 300 may identify whether the distance between the friend electronic device 102 and the vehicle 300 is shorter than a second set distance (e.g., a sixth distance) based on the identified distance between the friend electronic device 102 and the vehicle 300 in operation 1133. For example, the sixth distance may be 3 m. As an identifying result, if the distance between the friend electronic device 102 and the vehicle 300 is not shorter than the sixth distance, the vehicle 300 may not perform any further operation related to a passive entry process or an owner pairing process. Like this, if the friend electronic device 102 does not exist within the sixth distance from the vehicle 300, any further operation related to the passive entry process or the owner pairing process may not be performed, thereby preventing a case that a UWB connection is established as a BLE connection is established between the friend electronic device 102 and the vehicle 300m, and this may reduce current consumption of both the friend electronic device 102 and the vehicle 300.

In FIG. 11, it will be assumed that the distance between the friend electronic device 102 and the vehicle 300 identified in operation 1133 is shorter than the second set distance, so a URSK derivation flow may be performed between the friend electronic device 102 and the vehicle 300 through a BLE connection in operation 1135. In an embodiment, the URSK derivation flow may be derived using a UWB session ID, and a URSK may be a key required to perform a UWB ranging procedure.

When the URSK derivation flow is completed between the friend electronic device 102 and the vehicle 300, the vehicle 300 may transmit a command complete subevent PDU to the friend electronic device 102 in operation 1137, and the command complete subevent PDU may include SE deselection (Deselect_SE) subevent notification indicating that a digital key applet is deselected. Upon receiving the command complete subevent PDU including the SE deselection subevent notification from the vehicle 300, the friend electronic device 102 may deselect the digital key applet.

In operation 1139, the friend electronic device 102 and the vehicle 300 may perform a capability exchange procedure for performing the owner pairing process. In an embodiment, if at least one of the friend electronic device 102 or the vehicle 300 has, for example, a updated digital key protocol version, a updated UWB configuration ID, and updated pulseshape combinations which are different from a protocol version, a UWB configuration ID, and pulseshape combinations which are supported during a previous capability exchange procedure, the capability exchange procedure may be performed between the friend electronic device 102 and the vehicle 300 in operation 1139. The capability exchange procedure performed between the friend electronic device 102 and the vehicle 300 may be implemented similarly to a capability exchange procedure in operation 933 in FIG. 9, and a detailed description thereof will be omitted herein.

In operation 1141, the friend electronic device 102 and the vehicle 300 may perform a time synchronization procedure.

In operation 1143, the friend electronic device 102 and the vehicle 300 may perform a secure ranging setup flow. When the capability exchange procedure is performed between the friend electronic device 102 and the vehicle 300, the vehicle 300 may initiate the secure ranging setup flow. In the secure ranging setup flow, the friend electronic device 102 and the vehicle 300 may perform exchange operations to determine ranging parameter values required to set up secure ranging.

In the secure ranging setup flow, the vehicle 300 may notify the friend electronic device 102 of which URSK is used by transmitting a Ranging_Session_RQ message. When the secure ranging setup flow is performed between the friend electronic device 102 and the vehicle 300, a secure ranging session based on a UWB technology may be established between the friend electronic device 102 and the vehicle 300.

In the digital key system, validity of a digital key possessed by the friend electronic device 102 needs to be verified so that a passive entry operation is performed between the friend electronic device 102 and the vehicle 300 while the passive entry or owner pairing process is performed, this may be performed while the URSK derivation flow is performed, and the URSK derivation flow may be a trigger for changing the BLE connection between the friend electronic device 102 and the vehicle 300 to a UWB connection.

However, in a current CCC standard, the URSK derivation flow is performed immediately when the BLE connection is established between the friend electronic device 102 and the vehicle 300 regardless of the distance between the friend electronic device 102 and the vehicle 300, so a case may occur that the URSK derivation flow is performed in a situation that the passive entry operation may not be performed or a time point at which the UWB ranging procedure is performed is advanced. Therefore, as described in FIG. 11, the URSK derivation flow is performed only when the distance between the friend electronic device 102 and the vehicle 300 is shorter than the sixth distance based on the BLE HADM process, thereby preventing current consumption due to the UWB connection, and this may reduce current consumption of both the friend electronic device 102 and the vehicle 300.

In addition, in the digital key system, in a situation in which the friend electronic device 102 which shares the digital key by another device (e.g., the vehicle 300 or an electronic device 101) approaches the vehicle 300 for the first time, the friend electronic device 102 may need to perform the friend first transaction procedure to verify an immobilizer token which is a confidential data element provided to the vehicle 300 if necessary (e.g., at starting).

However, in a current CCC standard, the friend first transaction procedure is also performed immediately when the BLE connection is established between the friend electronic device 102 and the vehicle 300 regardless of the distance between the friend electronic device 102 and the vehicle 300, so a case may occur that the URSK derivation flow needs to be performed in a situation that the passive entry operation may not be performed or a time point at which the UWB ranging procedure is performed is advanced. In an embodiment of the disclosure, as described in FIG. 11, the friend first transaction procedure is performed only when the distance between the friend electronic device 102 and the vehicle 300 is shorter than the sixth distance based on the BLE HADM process, thereby preventing current consumption due to the UWB connection, and this may reduce current consumption of both the friend electronic device 102 and the vehicle 300.

Figure 12:
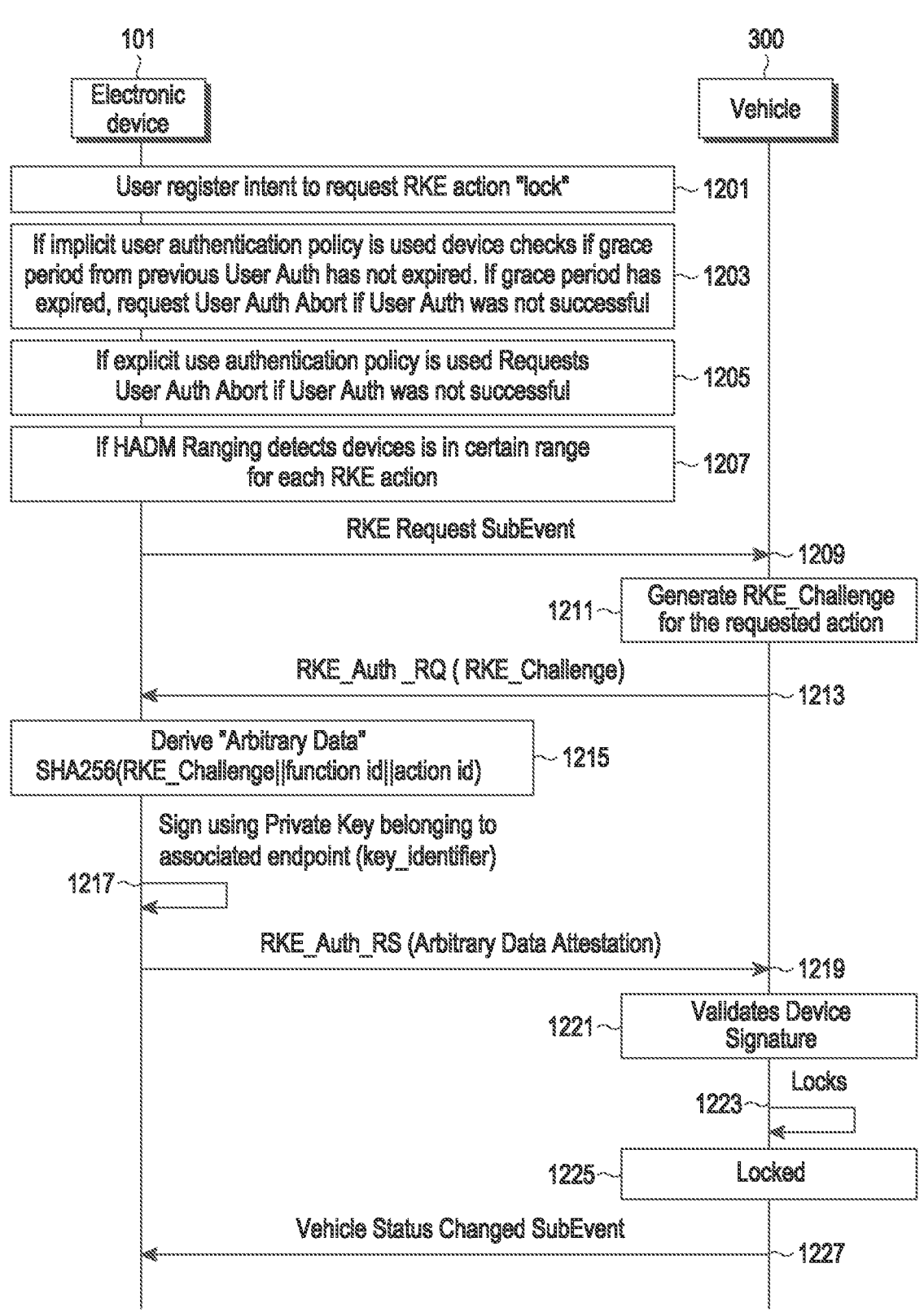
FIG. 12 is a diagram schematically illustrating an example of a remote keyless entry (RKE) process in a digital key system according to an embodiment.

FIG. 12 is a diagram schematically illustrating an example of an RKE process in a digital key system according to an embodiment.

Referring to FIG. 12, in a CCC standard, it is recommended that an RKE process needs to be necessarily performed at a point which is away from 10 m from the vehicle 300, and this may indicate that a BLE connection is required between an electronic device 101 and a vehicle 300 at the point which is away from 10 m from the vehicle 300. In the RKE process, the electronic device 101 may transmit a command to the vehicle 300 through the BLE connection, and may control the vehicle 300 through a relatively simple authentication procedure. However, because a connectable range of each of the electronic device 101 and the vehicle 300 is determined by a power class and actual output power of a BLE module, the BLE connection may be established between the electronic device 101 and the vehicle 300 even if a distance between the electronic device 101 and the vehicle 300 is 10 m or more, so the RKE process may be performed. However, if an action which requires the distance between the electronic device 101 and the vehicle 300 is performed while the RKE process is performed, a case that a UWB connection needs to be used may occur.

According to an embodiment, an RKE request subevent (RKE Request SubEvent) PDU is transmitted only if the distance between the electronic device 101 and the vehicle 300 is shorter than a first set distance (e.g., a seventh distance) based on the BLE HADM process, thereby preventing current consumption due to the UWB connection, and this may reduce current consumption of both the electronic device 101 and the vehicle 300. For example, the seventh distance may be 10 m.

In an embodiment, if the distance between the electronic device 101 and the vehicle 300 is longer than or equal to a second set distance (e.g., a sixth distance) at which the UWB connection needs to be established, an action which requires the distance between the electronic device 101 and the vehicle 300 among actions included in the RKE process is not performed, thereby preventing current consumption due to the UWB connection, and this may reduce current consumption of both the electronic device 101 and the vehicle 300. For example, the sixth distance may be 3 m.

First, in operation 1201, the electronic device 101 may identify an input (e.g., user registration intent) for requesting an RKE action "lock".

In operation 1203, if an implicit user authentication policy is used, the electronic device 101 may identify whether a grace period from previous user authentication has expired. If the grace period from the previous user authentication has expired and user authentication is not successful, the electronic device 101 may request to stop the user authentication.

In operation 1205, if an explicit user authentication policy is used, the electronic device 101 may request to stop user authentication if the user authentication is not successful. In operation 1207, the electronic device 101 may perform a BLE HADM ranging procedure (e.g., a BLE HADM process) with the vehicle 300, and identify whether a distance between the electronic device 101 and the vehicle 300 identified based on the BLE HADM process is shorter than the seventh distance.

In an embodiment, if the distance between the electronic device 101 and the vehicle 300 is not shorter than the seventh distance, the vehicle 300 may not perform any further operation related to the RKE process. In this way, any further operation related to the RKE process is not performed if the electronic device 101 does not exist within the seventh distance from the vehicle 300, thereby preventing a case that a connection between the electronic device 101 and the vehicle 300 is changed from the BLE connection to the UWB connection immediately after the BLE connection is established between the electronic device 101 and the vehicle 300, and this may reduce current consumption of both the electronic device 101 and the vehicle 300.

In an embodiment, a case will be assumed that the electronic device 101 performs the BLE HADM process with the vehicle 300 for the action of transmitting the RKE request subevent PDU during the RKE process, so the electronic device 101 identifies whether the distance between the electronic device 101 and the vehicle 300 is 10 m in operation 1207. So, if the electronic device 101 performs an action which requires the distance between the electronic device 101 and the vehicle 300 among the actions included in the RKE process as well as the action of transmitting the RKE request subevent PDU, whether the corresponding action will be performed may be determined based on the distance which corresponds to the corresponding action.

In FIG. 12, it will be assumed that the distance between the electronic device 101 and the vehicle 300 is shorter than the seventh distance, so the electronic device 101 may transmit an RKE request subevent PDU to the vehicle 300 in operation 1209. In an embodiment, the RKE request subevent PDU may be transmitted for requesting to perform the RKE action "lock" which is user request identified in operation 1201.

Upon receiving the RKE request subevent PDU from the electronic device 101, in operation 1211, the vehicle 300 may identify the requested RKE action "lock" based on the RKE request subevent PDU, and generate RKE_Challenge corresponding to the requested RKE action "lock". The vehicle 300 may transmit an RKE authentication request (RKE_Auth_RQ) PDU including the generated RKE_Challenge in operation 1213.

Upon receiving the RKE_Auth_RQ PDU, the electronic device 101 may derive (or generate) arbitrary data in operation 1215. The electronic device 101 may apply a hash function SHA256 to a concatenation of the RKE_Challenge, and corresponding RKE request subevent function ID and action ID to derive the arbitrary data (e.g., SHA256 (RKE_Challenge||function id||action id)). In an embodiment, the arbitrary data may be a key identifier (key_Identifier).

After deriving the arbitrary data, the electronic device 101 may perform a sign operation using a private key belonging to an associated endpoint in operation 1217. In an embodiment, the endpoint may be a digital key object included in a key applet.

Upon performing the sign operation, the electronic device 101 may transmit, to the vehicle 300, an RKE authentication response (RKE_Auth_RS) PDU which is a response PDU to the RKE_Auth_RQ PDU in operation 1219. In an embodiment, the RKE_Auth_RS PDU may include arbitrary data attestation.

Upon receiving the RKE_Auth_RS PDU, the vehicle 300 may perform a signature verification operation based on the arbitrary data attestation included in the RKE_Auth_RS PDU in operation 1221. As a result of performing the signature verification operation, if signature verification is successful, the vehicle 300 may perform a lock operation corresponding to the RKE action "lock" identified through the RKE request subevent PDU in operation 1223. As the lock operation is performed, the vehicle 300 may be in locked status in operation 1225. The vehicle 300 may transmit, to the electronic device 101, a vehicle status changed subevent (Vehicle Status Changed SubEvent) PDU indicating that status of the vehicle 300 is changed in operation 1227.

Figure 13A:
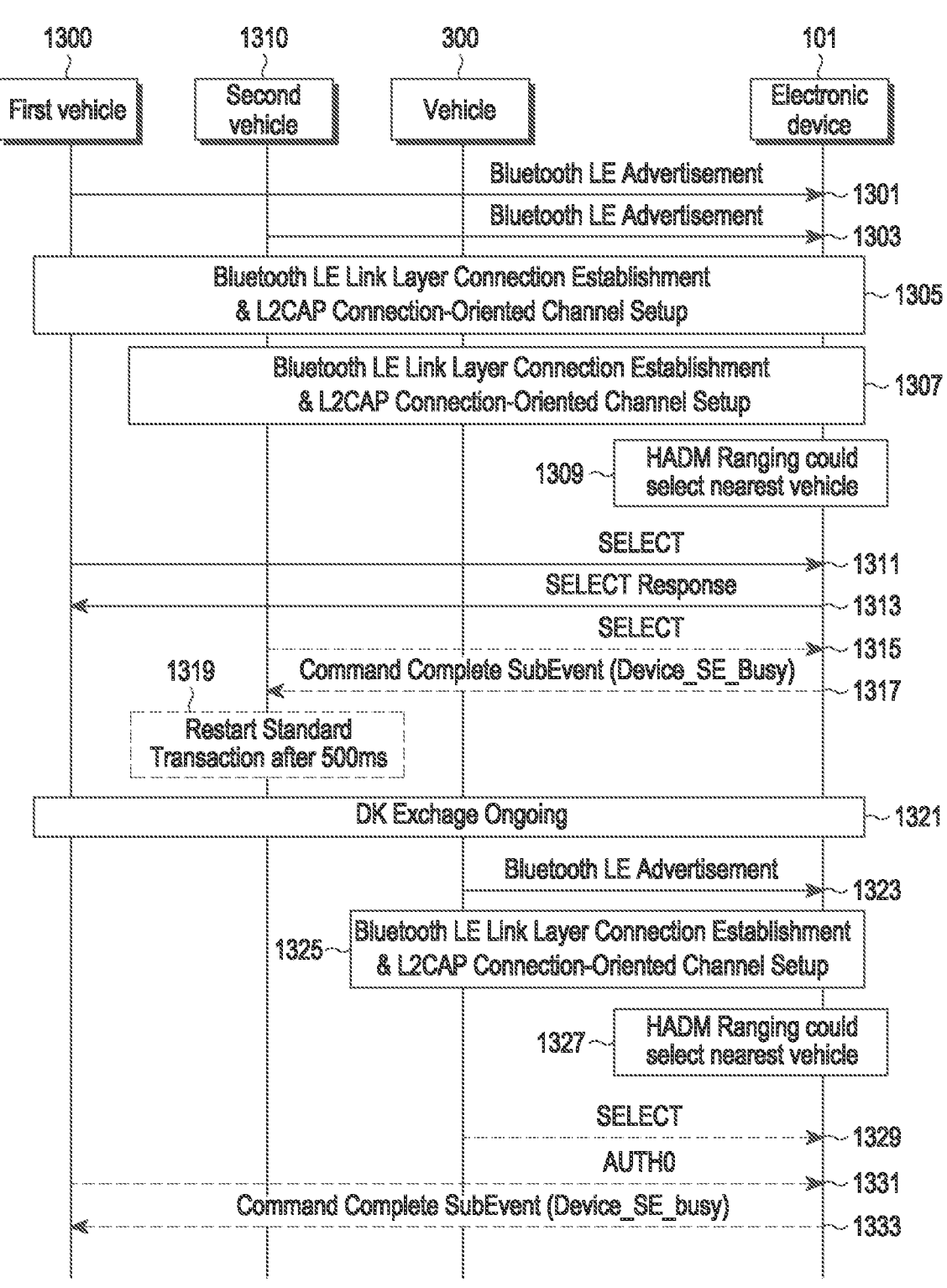
FIGS. 13A and 13B are diagrams schematically illustrating an example of a device preference management process in a digital key system according to an embodiment.
Figure 13B:
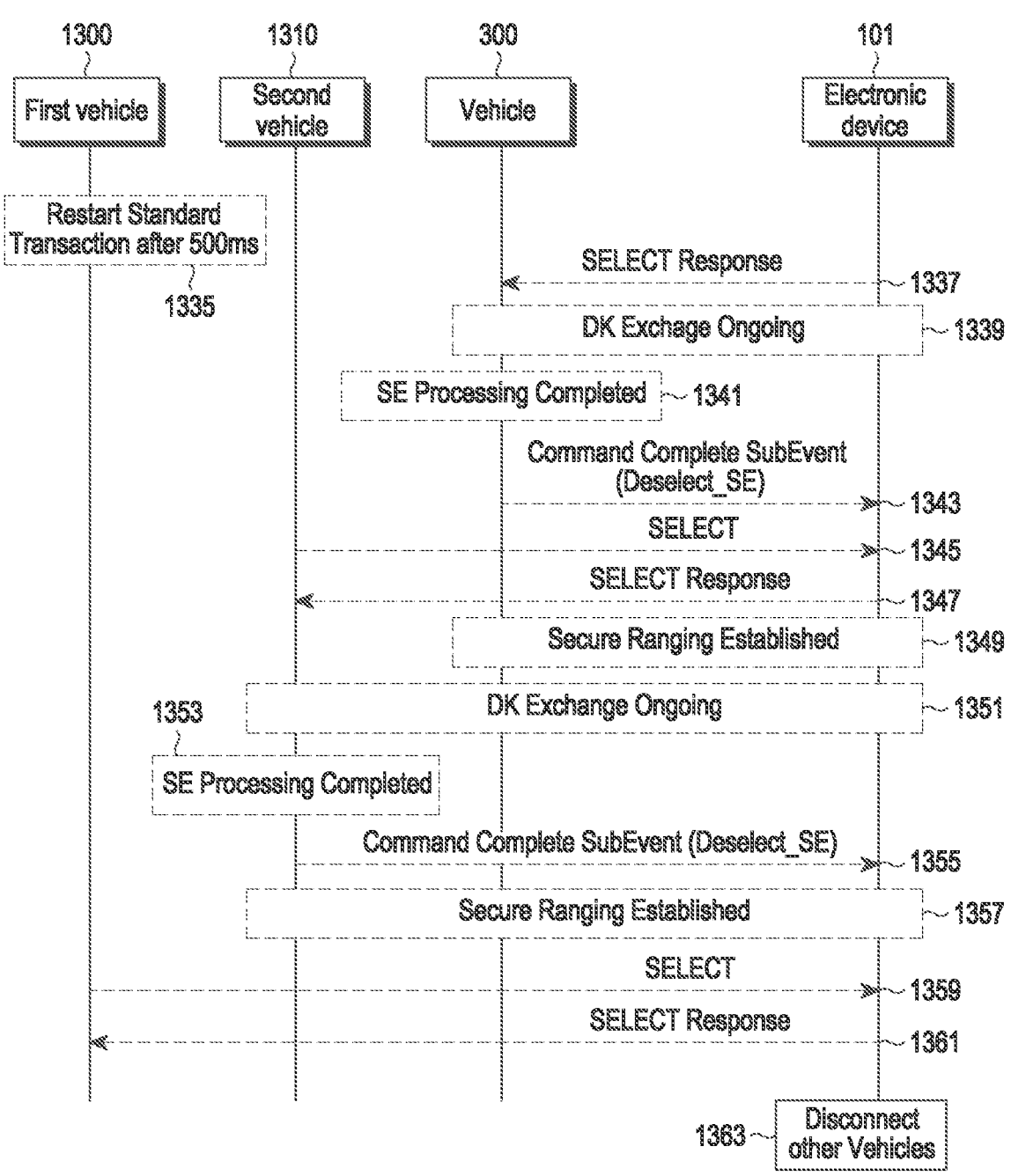

FIGS. 13A and 13B are diagrams schematically illustrating an example of a device preference management process in a digital key system according to an embodiment.

Referring to FIGS. 13A and 13B, in a CCC standard, a device preference management process may be a process which is performed if an electronic device 101 approaches a plurality of vehicles (e.g., a vehicle 300, a first vehicle 1300, and a second vehicle 1310) in a situation in which the electronic device 101 owns a plurality of digital keys.

According to an embodiment, a vehicle to be connected to the electronic device 101 among the vehicle 300, the first vehicle 1300, and the second vehicle 1310 may be determined by the electronic device 101. The electronic device 101 may identify a digital key by establishing a BLE connection with each of the vehicle 300, the first vehicle 1300, and the second vehicle 1310 to perform an authentication operation for each of the vehicle 300, the first vehicle 1300, and the second vehicle 1310, and establish a UWB connection with each of the vehicle 300, the first vehicle 1300, and the second vehicle 1310 to measure a distance between the electronic device 101 and the vehicle 300, a distance between the electronic device 101 and the first vehicle 1300, and a distance between the electronic device 101 and the second vehicle 1310. The electronic device 101 may select a vehicle closest to the electronic device 101 among the vehicle 300, the first vehicle 1300, and the second vehicle 1310 as the vehicle to be connected to the electronic device 101 based on the distance between the electronic device 101 and the vehicle 300, the distance between the electronic device 101 and the first vehicle 1300, and the distance between the electronic device 101 and the second vehicle 1310.

A current CCC standard does not provide separate priorities for BLE connections between a plurality of vehicles and the electronic device 101 in a case that the electronic device 101 owns a plurality of keys, and approaches the plurality of vehicles. So, the electronic device 101 may start establishing a BLE connection with a vehicle discovered first among the plurality of vehicles.

In an embodiment of the disclosure, the electronic device 101 may perform a BLE HADM process with the plurality of vehicles to establish a BLE connection with a vehicle which exists at the closest distance to the electronic device 101 among the plurality of vehicles instead of establishing a BLE connection with a vehicle which is discovered first among the plurality of vehicles, thereby a vehicle to be connected to the electronic device 101 may be selected from among the plurality of vehicles only through the BLE HADM process.

First, in operation 1301, the first vehicle 1300 may transmit a BLE_ADV PDU. In operation 1303, the second vehicle 1310 may transmit a BLE_ADV PDU.

Upon receiving the BLE_ADV PDU from the first vehicle 1300, the electronic device 101 may establish a BLE link layer connection with the first vehicle 1300 and set up a BLE L2CAP CoC channel in operation 1305. Upon receiving the BLE_ADV PDU from the second vehicle 1310, the electronic device 101 may establish a BLE LL connection with the second vehicle 1310 and set up a BLE L2CAP CoC channel in operation 1307.

In operation 1309, the electronic device 101 may perform a BLE HADM process to measure a distance between each of the first vehicle 1300 and the second vehicle 1310 and the electronic device 101. Based on the measured distance between each of the first vehicle 1300 and the second vehicle 1310 and the electronic device 101, a vehicle located closer to the electronic device 101 may be selected from among the first vehicle 1300 and the second vehicle 1310. In FIGS. 13A and 13B, it will be assumed that the first vehicle 1300 is closer to the electronic device 101 than the second vehicle 1310.

The first vehicle 1300 may transmit a select command PDU to the electronic device 101 in operation 1311. In an embodiment, the select command PDU may be a PDU used for selecting a digital key applet instance. Upon receiving the select command PDU from the first vehicle 1300, the electronic device 101 may transmit, to the first vehicle 1300, a select response command PDU which is a response PDU to the select command PDU.

The second vehicle 1310 may transmit a select command PDU to the electronic device 101 in operation 1315. Upon receiving the select command PDU from the second vehicle 1310, the electronic device 101 may transmit a command complete subevent PDU to the second vehicle 1310 in operation 1317, and the command complete subevent PDU may include device SE busy (Device_SE_Busy) subevent notification indicating that an SE is temporarily unavailable. Upon receiving the command complete subevent PDU including the device SE busy subevent notification from the electronic device 101, the second vehicle 1310 may restart a standard transaction again after a set time (e.g., 500 ms) in operation 1319.

Upon receiving the select response command PDU from the electronic device 101, the first vehicle 1300 may proceed with a digital key exchange procedure with the electronic device 101 in operation 1321.

In this way, according to an embodiment of the disclosure, upon approaching a plurality of vehicles, the electronic device 101 may proceed with the digital key exchange procedure with a vehicle having a minimum distance between the electronic device 101 and the vehicle rather than a vehicle which first establishes a BLE connection with the electronic device 101, and accordingly, select a vehicle to be connected to the electronic device 101 from among the plurality of vehicles only through the BLE HADM process.

Thereafter, the vehicle 300 may transmit a BLE_ADV PDU in operation 1323. Upon receiving the BLE_ADV PDU from the vehicle 300, the electronic device 101 may establish a BLE LL connection with the vehicle 300 and set up a BLE L2CAP CoC channel in operation 1325.

In operation 1327, the electronic device 101 may measure a distance between the vehicle 300 and the electronic device 101 by performing the BLE HADM process. In addition, based on the distance between the vehicle 300 and the electronic device 101, a vehicle located closer to the electronic device 101 may be selected from among the first vehicle 1300 and the vehicle 300. In FIGS. 13A and 13B, it will be assumed that the vehicle 300 exists closer to the electronic device 101 than the first vehicle 1300.

The vehicle 300 may transmit a select command PDU to the electronic device 101 in operation 1329. Also, the first vehicle 1300 which proceeds with digital key exchange procedure with the electronic device 101 may transmit an authentication 0 (AUTH0) command PDU in operation 1331. In an embodiment, the AUTH0 command PDU may be a PDU which allows a vehicle to initiate an authentication procedure. Upon receiving the AUTH0 command PDU from the first vehicle 1300, the electronic device 101 may transmit a command complete subevent PDU to the first vehicle 1300 in operation 1333 because the vehicle 300 is located closer to the electronic device 101 than the first vehicle 1300, and the command complete subevent PDU may include device SE busy subevent notification indicating that an SE is temporarily unavailable. Upon receiving the command complete subevent PDU including the device SE busy subevent notification from the electronic device 101, the first vehicle 1300 may restart the standard transaction after set time (e.g., 500 ms) in operation 1335.

The electronic device 101 may transmit, to the vehicle 300, a select response command PDU which is a response PDU to the select command PDU in operation 1337. Upon receiving the select response command PDU from the electronic device 101, the vehicle 300 may proceed with a digital key exchange procedure with the electronic device 101 in operation 1339. As such, according to an embodiment of the disclosure, upon approaching a plurality of vehicles, the electronic device 101 may proceed with a digital key exchange procedure with a vehicle having a minimum distance from the electronic device 101, not a vehicle which first establishes a BLE connection with the electronic device 101, and accordingly, select a vehicle to be connected to the electronic device 101 from among the plurality of vehicles only through the BLE HADM process.

The vehicle 300 may complete SE processing in operation 1341. In operation 1343, the vehicle 300 may transmit a command complete subevent PDU to the electronic device 101, and the command complete subevent PDU may include an SE deselection subevent notification. Upon receiving the command complete subevent PDU including the SE deselection subevent notification from the vehicle 300, the electronic device 101 may deselect the digital key applet.

Also, as the set time elapses, the second vehicle 1310 may transmit a select command PDU to the electronic device 101 in operation 1345. Upon receiving the select command PDU from the second vehicle 1310, the electronic device 101 may transmit a select response command PDU which is a response PDU to the select command PDU to the second vehicle 1310 in operation 1347.

The electronic device 101 and the vehicle 300 may establish secure ranging in operation 1349.

Upon receiving the select response command PDU from the electronic device 101, the second vehicle 1310 may proceed with a digital key exchange procedure with the electronic device 101 in operation 1351. The second vehicle 1310 may complete SE processing with the electronic device 101 in operation 1353, and may transmit a command complete subevent PDU to the electronic device 101 in operation 1355, and the command complete subevent PDU may include SE deselection subevent notification. Upon receiving the command complete subevent PDU including the SE deselection subevent notification from the second vehicle 1310, the electronic device 101 may deselect the digital key applet.

The electronic device 101 and the second vehicle 1310 may establish secure ranging in operation 1357.

Also, as the set time elapses, the first vehicle 1300 may transmit a select command PDU to the electronic device 101 in operation 1359. Upon receiving the select command PDU from the first vehicle 1300, the electronic device 101 may transmit a select response command PDU which is a response PDU to the select command PDU to the first vehicle 1300 in operation 1361. Then, the electronic device 101 may disconnect the connection with other vehicles (e.g., the first vehicle 1300 and the second vehicle 1310) in operation 1363.

Figure 14A:
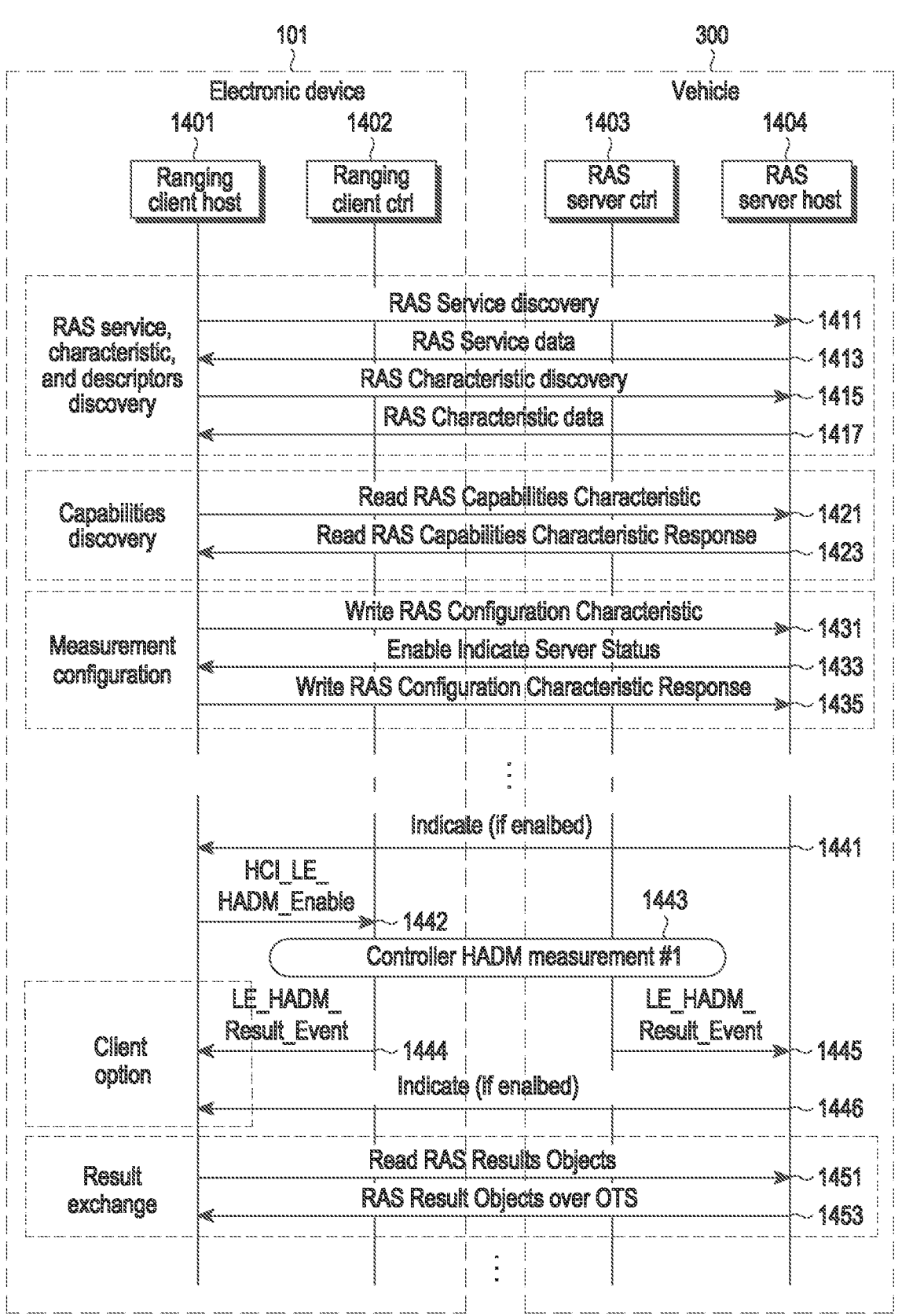
FIGS. 14A and 14B are diagrams schematically illustrating an example of a ranging service (RAS) in a digital key system according to an embodiment.
Figure 14B:
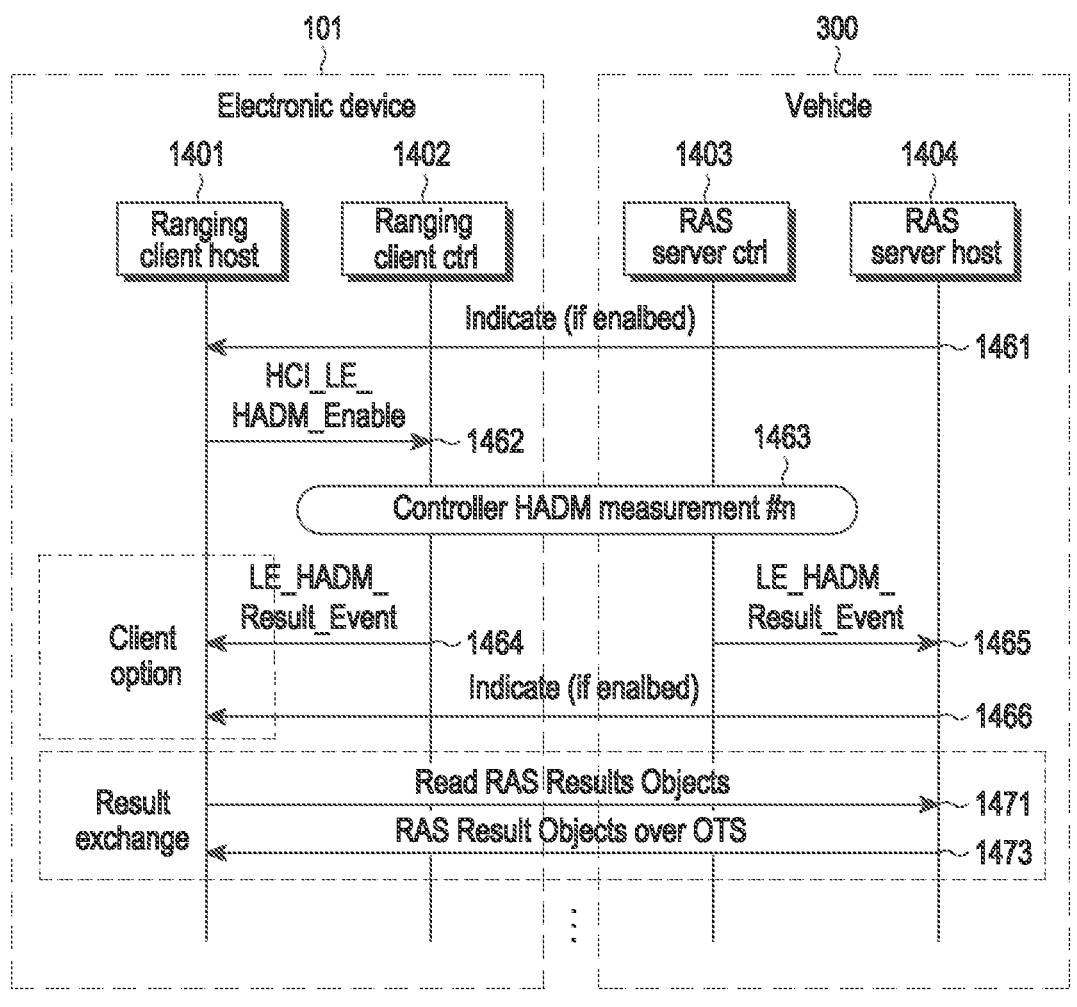

FIGS. 14A to 14B are diagrams schematically illustrating an example of a ranging service (RAS) in a digital key system according to an embodiment.

Referring to FIGS. 14A and 14B, in an RAS, a vehicle 300 may operate as a RAS server, and an electronic device 101 may operate as a ranging client.

In an embodiment, the electronic device 101 may include a ranging client host 1401 and a ranging client controller (ranging client ctrl) 1402, and the vehicle 300 may include an RAS server controller (RAS server ctrl) 1403 and an RAS server host 1404.

The electronic device 101 may transmit an RAS service discovery PDU in operation 1411. Upon receiving the RAS service discovery PDU transmitted from the electronic device 101, the vehicle 300 may transmit an RAS service data PDU to the electronic device 101 in operation 1413. Upon receiving the RAS service data PDU from the vehicle 300, the electronic device 101 may transmit an RAS characteristic discovery PDU to the vehicle 300 in operation 1415. Upon receiving the RAS characteristic discovery PDU transmitted from the electronic device 101, the vehicle 300 may transmit an RAS characteristic data PDU to the electronic device 101 in operation 1417.

After an RAS service discovery and RAS characteristic discovery operation is performed in this way, the electronic device 101 may transmit a read RAS capabilities characteristic PDU to the vehicle 300 in operation 1421. Upon receiving the read RAS capabilities characteristic PDU from the electronic device 101, the vehicle 300 may transmit a read RAS capabilities characteristic response PDU which is a response PDU to the read RAS capabilities characteristic PDU in operation 1423. The electronic device 101 and the vehicle 300 may exchange capabilities with each other through exchange of the read RAS capabilities characteristic PDU and the read RAS capabilities characteristic response PDU.

Upon exchanging the capabilities with the vehicle 300 each other, the electronic device 101 may transmit a write RAS configuration characteristic PDU in operation 1431. In an embodiment, the write RAS configuration characteristic PDU may include parameters to be used when the electronic device 101 performs an HADM process. Upon receiving the write RAS configuration characteristic PDU from the electronic device 101, the vehicle 300 may transmit an enable indicate server status PDU to the electronic device 101 in operation 1433. Upon receiving the enable indicate server status PDU from the vehicle 300, the electronic device 101 may transmit, to the vehicle 300, a write RAS configuration characteristic response PDU which is a response PDU to the write RAS configuration characteristic PDU in operation 1435.

Thereafter, the vehicle 300 may transmit an indicate PDU when the electronic device 101 desires to initiate a BLE HADM process in operation 1441. After receiving the indicate PDU from the vehicle 300, the ranging client host 1401 in the electronic device 101 may transfer, to the ranging client controller 1402, a host controller interface (HCI) LE HADM enable (HCI_LE_HADM_Enable) PDU to enable the BLE HADM process in operation 1442.

According to this, in operation 1443, the BLE HADM process may be performed between the electronic device 101 and the vehicle 300. In an embodiment, the BLE HADM process performed between the electronic device 101 and the vehicle 300 may be a controller HADM measurement process, so the controller HADM measurement process may be performed between the ranging client controller 1402 and the RAS server controller 1403. In FIGS. 14A and 14B, an n-th controller HADM measurement process which is performed between the vehicle 1300 and the electronic device 101 is illustrated as a controller HADM measurement process #n.

As a controller HADM measurement process #1 between the ranging client controller 1042 and the RAS server controller 1403 is completed in operation 1443, in operation 1444, the ranging client controller 1402 may transfer, to the ranging client host 1401, an LE HADM result event (LE_HADM_result_event) PDU including a result of the controller HADM measurement process #1. As the controller HADM measurement process #1 between the ranging client controller 1402 and the RAS server controller 1403 is completed in operation 1443, the RAS server controller 1403 may transfer, to the RAS server host 1404, an LE HADM result event PDU including a result of the controller HADM measurement process #1 in operation 1445. The vehicle 300 may transmit an indicate PDU to the electronic device 101 in operation 1446.

Thereafter, the electronic device 101 may transmit, to the vehicle 300, a read RAS results objects PDU for requesting a result for a BLE HADM process in operation 1451. Upon receiving the read RAS results objects PDU from the electronic device 101, the vehicle 300 may transmit, to the electronic device 101, an RAS results objects PDU including the result of the controller HADM measurement process #1 through an object transfer service (OTS) in operation 1453.

In this way, the electronic device 101 and the vehicle 300 may perform a plurality of (e.g., N) BLE HADM processes as needed, and operations (e.g., operation 1461 to operation 1466, operation 1471, and operation 1473) between the electronic device 101 and the vehicle 300 related to the controller HADM measurement process #n may be implemented similarly to operations (e.g., operation 1441 to operation 1446, operation 1451, and operation 1453) between the electronic device 101 and the vehicle 300 related to the controller HADM measurement process #1, so a detailed description thereof will be omitted.

FIG. 15 is a diagram schematically illustrating an example of an SQTE procedure in a digital key system according to an embodiment.

Referring to FIG. 15, an electronic device 101 may operate as an initiator, and a vehicle 300 may operate as a reflector. The electronic device 101 and the vehicle 300 may exchange RAS capability and RAS configuration with each other through an RAS.

In an embodiment, a BLE HADM process may be initiated by any one of the electronic device 101 and the vehicle 300, and in FIG. 15, an initiator of a BLE HADM process may be the electronic device 101.

As illustrated in FIG. 15, the BLE HADM process (e.g., an SQTE procedure) may be initiated by an LL_QTE_REQ PDU, and the SQTE procedure may be a procedure in which an HADM ranging operation is performed. RTT measurement and phase measurement may be performed during the SQTE procedure.

In an embodiment, the SQTE procedure may include a frequency compensation step and an SQTE step. According to an embodiment, during the frequency compensation step, each of the electronic device 101 and the vehicle 300 may measure an initial frequency and a frequency offset, and during the SQTE step, the electronic device 101 and the vehicle 300 may perform an RTT measurement and phase measurement operation.

In an embodiment, during the SQTE step in the SQTE procedure, the electronic device 101 and the vehicle 300 may perform the RTT measurement and phase measurement operation while changing roles thereof. For example, the electronic device 101 may operate as a reflector during the SQTE step, and the vehicle 300 may also operate as an initiator during the SQTE step. In an embodiment, during the SQTE step, the electronic device 101 and the vehicle 300 may perform the RTT measurement and phase measurement operation while changing a channel. In this way, during the SQTE step, the electronic device 101 and the vehicle 300 may perform the RTT measurement and phase measurement operation multiple times while changing the role and channel, and an RTT measurement result value and a phase measurement result value may be obtained based on results of the RTT measurement and phase measurement operation which is performed multiple times.

In an embodiment, as the BLE HADM process is completed between the electronic device 101 and the vehicle 300, each of the electronic device 101 and the vehicle 300 may calculate a distance between the electronic device 101 and the vehicle 300 based on a BLE HADM result value obtained by itself and a BLE HADM result value obtained by the other party. In an embodiment, each of the electronic device 101 and the vehicle 300 may obtain the BLE HADM result value obtained by the other party through an OTS, and a corresponding operation may be implemented similarly to an operation of obtaining a BLE HADM result value through an OTS described in FIGS. 14A and 14B, so a detailed description thereof will be omitted.

According to an embodiment, each of the electronic device 101 and the vehicle 300 may calculate the distance between the electronic device 101 and the vehicle 300 based on Equation 1 and Equation 2 below.

$$\Delta_\phi = \phi_{2W}(f_1, r) - \phi_{2W}(f_0, r) = 4\pi\Delta_f r/c_0 \bmod 2\pi \qquad \text{<Equation 1>}$$

In Equation 1, $\Delta\phi$ denotes a phase difference, f denotes a frequency, r denotes a distance, $\Delta f$ denotes a frequency difference, and $c_0$ denotes a speed of light.

$$r = \frac{c_0}{4\pi\Delta_f}\Delta_\phi \bmod \frac{c_0}{2\Delta_f} \qquad \text{<Equation 2>}$$

In the BLE HADM process, the distance between the electronic device 101 and the vehicle 300 calculated based on Equation 1 and Equation 2 may be used in various processes (e.g., an owner pairing process, a passive entry process, a friend first approach process, an RKE process, and a device preference management process) of a digital key system. In an embodiment, the digital key system may reduce (e.g., minimize) the use of a UWB technology based on the distance between the electronic device 101 and the vehicle 300 measured according to the BLE HADM process, and reduction in the use of the UWB technology may reduce current consumption of all of the electronic device 101 and the vehicle 300.

FIG. 16 is a flowchart schematically illustrating an example of an operating process of an electronic device in a digital key system according to an embodiment.

Referring to FIG. 16, in operation 1611, a processor (e.g., a processor 120 in FIG. 1, FIG. 2, or FIG. 7) of an electronic device (e.g., an electronic device 101 in FIG. 1, FIG. 2, or FIG. 7) may establish a BLE connection with an external electronic device (e.g., a vehicle 300 in FIG. 3) through a communication module (e.g., a communication module 190 in FIG. 1 or FIG. 2, or a communication module in FIG. 7). In an embodiment, the BLE connection established between the electronic device and the external electronic device in operation 1611 may be a BLE LL connection.

In operation 1613, the processor may identify whether the external electronic device supports a BLE HADM technology. In an embodiment, the processor may identify whether the external electronic device supports the BLE HADM technology based on various schemes. For example, the processor may identify whether the external electronic device supports the BLE HADM technology based on capability information of the external electronic device received from the external electronic device.

As an identifying result, if the external electronic device does not support the BLE HADM technology, the processor may establish a UWB connection with the external electronic device via the communication module and perform a digital key-related process in operation 1629. In an embodiment, the digital key-related process may include at least one of an owner pairing process, a passive entry process, or a friend first approach process.

As an identifying result in operation 1613, if the external electronic device supports the BLE HADM technology, the processor may exchange capability information and parameters related to a BLE HADM process with the external electronic device through the communication module in operation 1615. An operation in which the electronic device exchanges capabilities and parameters related to the BLE HADM process with the external electronic device may be implemented similarly to that described in FIGS. 14A and 14B, and a detailed description thereof will be omitted.

In operation 1617, the processor may perform the BLE HADM process with the external electronic device via the communication module. In an embodiment, the BLE HADM process performed in operation 1617 may be a BLE HADM process which is based on RTT ranging.

When the BLE HADM process is completed, in operation 1619, the processor may identify whether a distance between the electronic device and the external electronic device is longer than a first distance (e.g., 6 m) based on a result of the BLE HADM process. In an embodiment, the first distance may be a distance between the electronic device and the external electronic device at which a BLE L2CAP CoC connection needs to be established between the electronic device and the external electronic device in a digital key system. For example, the first distance may be a distance which is a reference for performing the passive entry process, and thus may be a distance which is a reference for establishing a BLE L2CAP CoC connection for the passive entry process.

If the distance between the electronic device and the external electronic device is longer than the first distance as an identifying result in operation 1619, the processor may perform a BLE received signal strength indicator (RSSI) ranging operation in operation 1621.

If the distance between the electronic device and the external electronic device is not longer than the first distance as an identifying result in operation 1619, in operation 1623, the processor may identify whether the distance between the electronic device and the external electronic device exists in a set range which is longer than or equal to a second distance (e.g., 3 m) and is not longer than the first distance. In an embodiment, the second distance may be a distance between the electronic device and the external electronic device at which a UWB connection needs be established between the electronic device and the external electronic device in the digital key system.

If the distance between the electronic device and the external electronic device exists within the set range as an identifying result in operation 1623, the processor may perform a BLE HADM process with the external electronic device via the communication module in operation 1625. In an embodiment, the BLE HADM process performed in operation 1625 may be a BLE HADM process which is based on phase ranging. In an embodiment, if the BLE HADM process is completed in operation 1625, the processor may establish a BLE L2CAP CoC connection between the electronic device and the external electronic device, and thus the BLE LL connection established between the electronic device and the external electronic device may be changed to the BLE L2CAP CoC connection.

If the distance between the electronic device and the external electronic device does not exist within the set range as the identifying result in operation 1623, the processor may identify whether the distance between the electronic device and the external electronic device is shorter than the second distance in operation 1627. For example, the processor may identify whether the distance between the electronic device and the external electronic device is shorter than the second distance based on a result of performing the BLE HADM process with the external electronic device. If the distance between the electronic device and the external electronic device is shorter than the second distance, the processor may perform a digital key-related process after establishing a UWB connection between the electronic device and the external electronic device in operation 1629. As the UWB connection is established between the electronic device and the external electronic device in this way, the connection between the electronic device and the external electronic device may be changed from the BLE L2CAP CoC connection to the UWB connection. In FIG. 16, a case (e.g., operation 1629) has been described that the processor performs the digital key-related process after establishing the UWB connection between the electronic device and the external electronic device if the distance between the electronic device and the external electronic device is shorter than the second distance, and contrary to this, the processor may measure a distance between the electronic device and the external electronic device based on the UWB technology without separately establishing the UWB connection between the electronic device and the external electronic device if the distance between the electronic device and the external electronic device is shorter than the second distance, and perform the digital key-related process based on the distance between the electronic device and the external electronic device which is measured based on the UWB technology.

As described in FIG. 16, in an embodiment of the disclosure, the distance between the electronic device and the external electronic device is measured based on the BLE HADM process, and the UWB connection is established only at a point at which the UWB connection needs to be established based on the measured distance between the electronic device and the external electronic device in the digital key system, thereby reducing current consumption of both the electronic device and the external electronic device due to use of the UWB technology.

Figure 17:
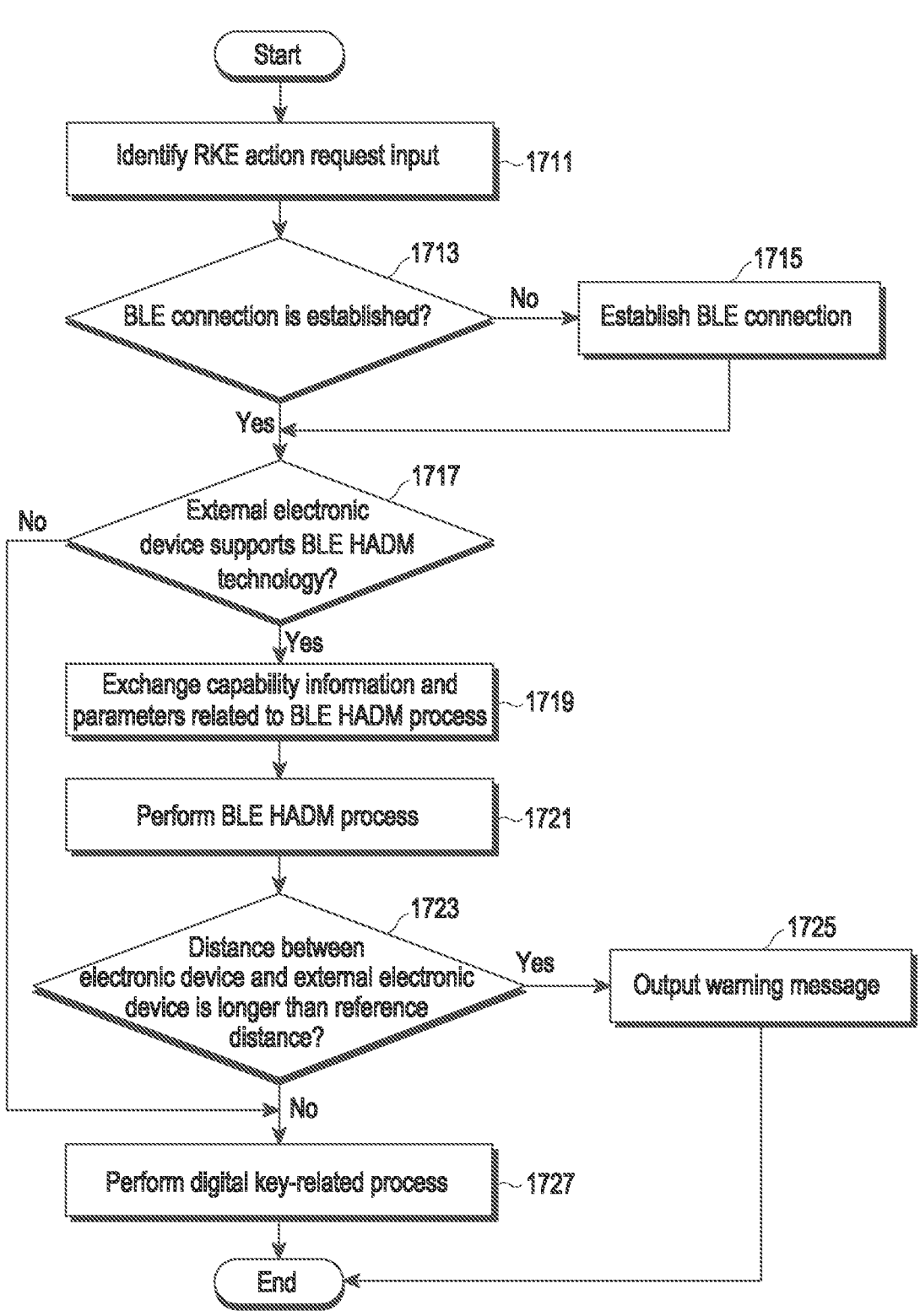
FIG. 17 is a flowchart schematically illustrating another example of an operating process of an electronic device in a digital key system according to an embodiment.

FIG. 17 is a flowchart schematically illustrating another example of an operating process of an electronic device in a digital key system according to an embodiment.

Referring to FIG. 17, in operation 1711, a processor (e.g., a processor 120 in FIG. 1, FIG. 2A, or FIG. 7) of an electronic device (e.g., an electronic device 101 in FIG. 1, FIG. 2A, or FIG. 7) may identify an input (e.g., user registration intention) for requesting an RKE action via an input module (e.g., an input module 150 in FIG. 1). In operation 1713, the processor may identify whether a BLE connection is established with an external electronic device (e.g., a vehicle 300 in FIG. 3). In an embodiment, in operation 1713, the processor may identify whether a BLE LL connection is established between the electronic device and the external electronic device.

If the BLE connection is not established between the electronic device and the external electronic device as an identifying result in operation 1713, the processor may establish the BLE connection with the external electronic device via a communication module (e.g., a communication module 190 in FIG. 1 or FIG. 2A, or a communication module in FIG. 7) in operation 1715. In an embodiment, the BLE connection established between the electronic device and the external electronic device in operation 1715 may be the BLE LL connection.

If the BLE connection is established between the electronic device and the external electronic device as the identifying result in operation 1713, the processor may identify whether the external electronic device supports a BLE HADM technology in operation 1717. In an embodiment, the processor may identify whether the external electronic device supports the BLE HADM technology based on various schemes. For example, the processor may identify whether the external electronic device supports the BLE HADM technology based on capability information of the external electronic device received from the external electronic device. As a result of identifying in operation 1717, if the external electronic device does not support the BLE HADM technology, the processor may establish a UWB connection with the external electronic device and perform a digital key-related process via the communication module in operation 1727. In an embodiment, the digital key-related process may include an RKE process. As the result of identifying in operation 1717, if the external electronic device supports the BLE HADM technology, the processor may exchange, via the communication module, capability information and parameters related to the BLE HADM process with the external electronic device in operation 1719. An operation in which the electronic device exchanges the capability information and parameters related to the BLE HADM process with the external electronic device may be implemented similarly to that described in FIGS. 14A and 14B, and a detailed description thereof will be omitted herein.

In operation 1721, the processor may perform the BLE HADM process with the external electronic device via the communication module. When the BLE HADM process is completed, in operation 1723, the processor may identify whether a distance between the electronic device and the external electronic device is longer than a reference distance (e.g., 10 m) at which an RKE action is performed. In an embodiment, the reference distance may be a distance between the electronic device and the external electronic device at which a BLE connection needs to be established to perform the RKE action between the electronic device and the external electronic device in the digital key system. For example, the reference distance may be a distance which is a reference for performing the RKE action, so the reference distance may be a distance which is a reference for establishing the BLE connection for the RKE action.

As a result of identifying in operation 1723, if the distance between the electronic device and the external electronic device is longer than the reference distance, the processor may output a warning message via a display module (e.g., a display module 160 in FIG. 1) in operation 1725. Operation 1725 may be omitted if necessary, and in this case, if the distance between the electronic device and the external electronic device is longer than the reference distance as the result of identifying in operation 1723, the processor may terminate operation thereof without performing any further operation. As the result of identifying in operation 1723, if the distance between the electronic device and the external electronic device is not longer than the reference distance, the processor may perform the digital key-related process in operation 1725. In an embodiment, the digital key-related process may include the RKE process.

In FIG. 17, the operating process of the electronic device has been described using the RKE process as an example of the digital key-related process, however, the operating process of the electronic device described in FIG. 17 may be applied to other wireless communication systems as well as the digital key system. For example, the operating process of the electronic device as described in FIG. 17 may be applied to any wireless communication system as long as it is a wireless communication system in which a BLE connection may be established between an electronic device and an external electronic device, a BLE HADM process may be performed between the electronic device and the external electronic device through the established BLE connection, and a location-based service may be performed between the electronic device and the external electronic device based on a distance between the electronic device and the external electronic device according to the BLE HADM process. As such, the operating process of the electronic device described in FIG. 17 may be applied to various wireless communication systems, and thus, in operation 1723, at least one of various processes which are based on the BLE HADM process between the electronic device and the external electronic device as well as the digital key-related process may be performed. In an embodiment, the at least one of the various processes which are based on the BLE HADM process between the electronic device and the external electronic device may be the location-based process.

As described in FIG. 17, an embodiment of the disclosure may enable to measure a distance between an electronic device and an external electronic device based on a BLE HADM process, and to perform an RKE process based on the measured distance between the electronic device and the external electronic device in a digital key system.

Figure 18:
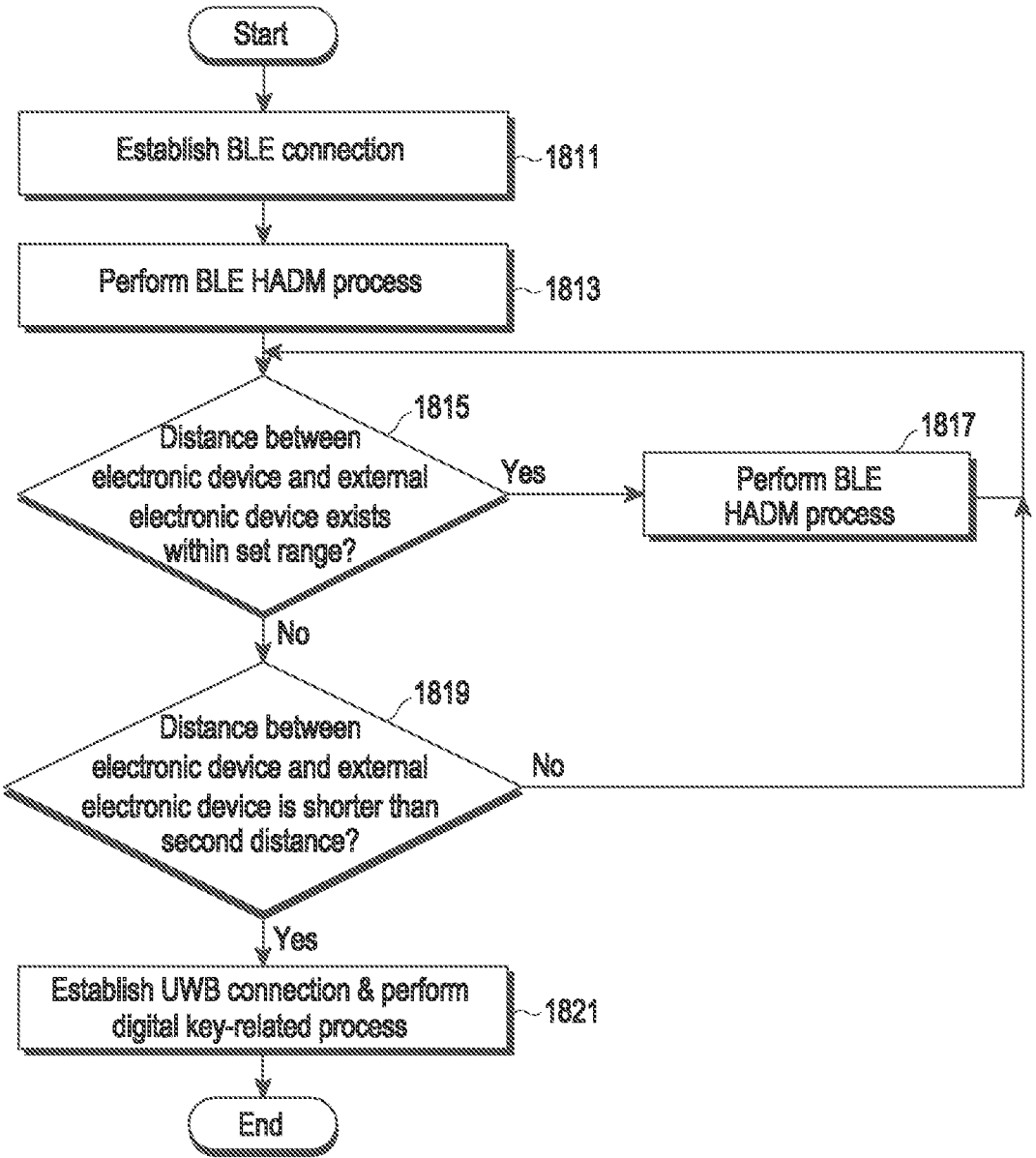
FIG. 18 is a flowchart schematically illustrating another example of an operating process of an electronic device in a digital key system according to an embodiment.

FIG. 18 is a flowchart schematically illustrating another example of an operating process of an electronic device in a digital key system according to an embodiment.

Referring to FIG. 18, in operation 1811, a processor (e.g., a processor 120 in FIG. 1, FIG. 2, or FIG. 7) of an electronic device (e.g., an electronic device 101 in FIG. 1, FIG. 2, or FIG. 7) may establish a BLE connection with an external electronic device (e.g., a vehicle 300 in FIG. 3) through a communication module (e.g., a communication module 190 in FIG. 1 or FIG. 2, or a communication module in FIG. 7). In an embodiment, the BLE connection established between the electronic device and the external electronic device in operation 1811 may be a BLE LL connection.

In operation 1813, the processor may perform a BLE HADM process with the external electronic device via the communication module. In an embodiment, the BLE HADM process performed in operation 1813 may be a BLE HADM process which is based on RTT ranging.

When the BLE HADM process is completed, in operation 1815, the processor may identify whether a distance between the electronic device and the external electronic device exists in a set range which is shorter than or equal to a first distance (e.g., 6 m) and longer than or equal to a second distance (e.g., 3 m) based on a result of the BLE HADM process. In an embodiment, the first distance may be a distance between the electronic device and the external electronic device at which a BLE L2CAP CoC connection needs to be established between the electronic device and the external electronic device in a digital key system. For example, the first distance may be a distance which is a reference for performing a passive entry process, and thus may be a distance which is a reference for establishing a BLE L2CAP CoC connection for the passive entry process. In an embodiment, the second distance may be a distance between the electronic device and the external electronic device at which a UWB connection needs to be established between the electronic device and the external electronic device in the digital key system.

As a result of identifying in operation 1815, if the distance between the electronic device and the external electronic device exists within the set range, the processor may perform a BLE HADM process with the external electronic device via the communication module in operation 1817. In an embodiment, the BLE HADM process performed in operation 1817 may be a BLE HADM process which is based on phase ranging. In an embodiment, when the BLE HADM process is completed in operation 1817, the processor may establish a BLE L2CAP CoC connection between the electronic device and the external electronic device, and thus a BLE LL connection established between the electronic device and the external electronic device may be changed to the BLE L2CAP CoC connection.

As the result of identifying in operation 1815, if the distance between the electronic device and the external electronic device does not exist within the set range, the processor may identify whether the distance between the electronic device and the external electronic device is shorter than the second distance in operation 1819. For example, the electronic device may identify whether the distance between the electronic device and the external electronic device is shorter than the second distance based on a result of performing the BLE HADM process with the external electronic device. If the distance between the electronic device and the external electronic device is shorter than the second distance, the processor may perform a digital key-related process after establishing the UWB connection between the electronic device and the external electronic device in operation 1821. As such, as the UWB connection is established between the electronic device and the external electronic device, the connection between the electronic device and the external electronic device may be changed from the BLE L2CAP CoC connection to the UWB connection.

In FIG. 18, a case (e.g., operation 1821) has been described that the processor performs the digital key-related process after establishing the UWB connection between the electronic device and the external electronic device if the distance between the electronic device and the external electronic device is shorter than the second distance, and contrary to this, the processor may measure a distance between the electronic device and the external electronic device based on the UWB technology without separately establishing the UWB connection between the electronic device and the external electronic device if the distance between the electronic device and the external electronic device is shorter than the second distance, and perform the digital key-related process based on the distance between the electronic device and the external electronic device which is measured based on the UWB technology.

In FIG. 18, the operating process of the electronic device in the digital key system has been described, however, the operating process of the electronic device described in FIG. 18 may be applied to other wireless communication systems as well as the digital key system. For example, the operating process of the electronic device as described in FIG. 18 may be applied to any wireless communication system as long as it is a wireless communication system in which a BLE connection may be established between an electronic device and an external electronic device, a BLE HADM process (e.g., a BLE HADM process which is based on RTT ranging and/or a BLE HADM process which is based on phase ranging) may be performed between the electronic device and the external electronic device through the established BLE connection, and a UWB connection may be established between the electronic device and the external electronic device based on a distance between the electronic device and the external electronic device according to the BLE HADM process. As such, the operating process of the electronic device described in FIG. 18 may be applied to various wireless communication systems, and thus, in operation 1821, at least one of various processes related to a UWB connection which are based on the BLE HADM process between the electronic device and the external electronic device after the UWB connection is established as well as the digital key-related process may be performed. In an embodiment, the at least one of the various processes related to the UWB connection which are based on the BLE HADM process between the electronic device and the external electronic device may be the location-based process.

As described in FIG. 18, an embodiment of the disclosure may enable to measure a distance between an electronic device and an external electronic device based on a BLE HADM process, and to perform an RKE process based on the measured distance between the electronic device and the external electronic device in a digital key system.

FIG. 19 is a signal flow diagram schematically illustrating an example of a procedure for establishing a UWB connection between an electronic device and an external electronic device in a wireless communication system according to an embodiment.

Referring to FIG. 19, in operation 1911, an electronic device 101 (e.g., an electronic device 101 in FIG. 1, FIG. 2, or FIG. 7) may establish a BLE connection with an external electronic device 1900. In an embodiment, the external electronic device 1900 may be an electronic device capable of performing a process based on a distance between the electronic device 101 and the external electronic device 1900. Hereinafter, for convenience of description, a process which is based on the distance between the electronic device 101 and the external electronic device 1900 will be referred to as a "distance-based process". In an embodiment, the distance-based process between the electronic device 101 and the external electronic device 1900 may be a process using a BLE connection and a UWB connection, and there is no limit to the distance-based process between the electronic device 101 and the external electronic device 1900. In an embodiment, the BLE connection established between the electronic device 101 and the external electronic device 1900 in operation 1911 may be a BLE LL connection.

In operation 1913, the electronic device 101 may identify whether the external electronic device 1900 supports a BLE HADM technology. In an embodiment, the electronic device 101 may identify whether the external electronic device 1900 supports the BLE HADM technology based on various schemes. For example, the electronic device 101 may identify whether the external electronic device 1900 supports the BLE HADM technology based on capability information of the external electronic device 1900 received from the external electronic device 1900.

As a result of identifying, if the external electronic device 1900 does not support the BLE HADM technology, the electronic device 101 may establish a UWB connection with the external electronic device 1900 and perform the distance-based process in operation 1929.

As a result of identifying in operation 1913, if the external electronic device 1900 supports the BLE HADM technology, the electronic device 101 may exchange capability information and parameters related to the BLE HADM process with the external electronic device 1900 in operation 1915. An operation in which the electronic device 101 exchanges the capabilities and the parameters related to the BLE HADM process with the external electronic device 1900 may be implemented similarly to that described in FIGS. 14A and 14B, and a detailed description thereof will be omitted.

In operation 1917, the electronic device 101 may perform the BLE HADM process with the external electronic device 1900. In an embodiment, the BLE HADM process performed in operation 1917 may be a BLE HADM process which is based on RTT ranging.

When the BLE HADM process is completed, in operation 1919, the electronic device 101 may identify whether the distance between the electronic device 101 and the external electronic device 1900 is longer than a first distance based on a result of the BLE HADM process. In an embodiment, the first distance may be a distance between the electronic device 101 and the external electronic device 1900 at which a BLE L2CAP CoC connection needs to be established between the electronic device 101 and the external electronic device 1900 in a wireless communication system.

As a result of identifying in operation 1919, if the distance between the electronic device 101 and the external electronic device 1900 is longer than the first distance, the electronic device 101 may perform a BLE RSSI ranging operation in operation 1921.

As the result of identifying in operation 1919, if the distance between the electronic device 101 and the external electronic device 1900 is not longer than the first distance, the electronic device 101 may identify whether the distance between the electronic device 101 and the external electronic device 1900 exists within a set range which is longer than or equal to a second distance and is not longer than the first distance in operation 1923. In an embodiment, the second distance may be a distance between the electronic device 101 and the external electronic device 1900 at which a UWB connection needs to be established between the electronic device 101 and the external electronic device 1900 in the wireless communication system.

As a result of identifying in operation 1923, if the distance between the electronic device 101 and the external electronic device 1900 exists within the set range, the electronic device 101 may perform a BLE HADM process with the external electronic device 1900 in operation 1925. In an embodiment, the BLE HADM process performed in operation 1925 may be a BLE HADM process which is based on phase ranging. In an embodiment, in operation 1925, the processor may establish a BLE L2CAP CoC connection between the electronic device 101 and the external electronic device 1900 when the BLE HADM process is completed, so the BLE LL connection established between the electronic device 101 and the external electronic device 1900 may be changed to the BLE L2CAP CoC connection.

As the result of identifying in operation 1923, if the distance between the electronic device 101 and the external electronic device 1900 does not exist within the set range, the electronic device 101 may identify whether the distance between the electronic device 101 and the external electronic device 1900 is shorter than the second distance in operation 1927. For example, the electronic device 101 may identify whether the distance between the electronic device 101 and the external electronic device 1900 is shorter than the second distance based on a result of performing the BLE HADM process with the external electronic device 1900. If the distance between the electronic device 101 and the external electronic device 1900 is not shorter than the second distance, the electronic device 101 may perform a BLE HADM process with the external electronic device 1900. If the distance between the electronic device 101 and the external electronic device 1900 is shorter than the second distance, the electronic device 101 may establish a UWB connection between the electronic device 101 and the external electronic device 1900 and then perform a distance-based process (e.g., a process related to a location-based services) in operation 1929. As such, as the UWB connection is established between the electronic device 101 and the external electronic device 1900, the connection between the electronic device 101 and the external electronic device 1900 may be changed from the BLE L2CAP CoC connection to the UWB connection. In FIG. 19, a case (e.g., operation 1929) has been described that the processor performs the digital key-related process after establishing the UWB connection between the electronic device and the external electronic device if the distance between the electronic device and the external electronic device is shorter than the second distance, and contrary to this, the processor may measure a distance between the electronic device and the external electronic device based on the UWB technology without separately establishing the UWB connection between the electronic device and the external electronic device if the distance between the electronic device and the external electronic device is shorter than the second distance, and perform the process related to the location-based service based on the distance between the electronic device and the external electronic device which is measured based on the UWB technology.

As such, in status in which the UWB connection is established between the electronic device 101 and the external electronic device 1900, the electronic device 101 may identify that a set condition is satisfied in operation 1931. In an embodiment, the set condition may be a condition in which the distance between the electronic device 101 and the external electronic device 1900 is longer than or equal to the second distance. Upon identifying that the distance between the electronic device 101 and the external electronic device 1900 is longer than or equal to the second distance, the electronic device 101 may release the UWB connection established with the external electronic device 1900 in operation 1933. In FIG. 19, a case has been described that a condition in which the distance between the electronic device 101 and the external electronic device 1900 is longer than the distance at which the UWB connection needs to be established is designated as the set condition, however, a condition on which the UWB connection between the electronic device 101 and the external electronic device 1900 is released may be variously designated.

As described in FIG. 19, in an embodiment of the disclosure, the distance between the electronic device and the external electronic device is measured based on the BLE HADM process, and the UWB connection is established only at a point at which the UWB connection needs to be established based on the measured distance between the electronic device and the external electronic device in the wireless communication system, thereby reducing current consumption of both the electronic device and the external electronic device due to use of the UWB scheme.

In an embodiment of the disclosure, instead of establishing a UWB connection immediately after an electronic device and an external electronic device establish a BLE connection in a wireless communication system, the UWB connection may be established only if a distance between the electronic device and the external electronic device approaches a reference distance at which the UWB connection needs to be established based on a BLE HADM process. Accordingly, it is possible to reduce current consumption of the electronic device and the external electronic device by reducing use of a UWB scheme which consumes a very large current compared to a BLE scheme, while increasing positioning accuracy for the electronic device and the external electronic device.

In an embodiment of the disclosure, a scheme for enabling a UWB connection to be used based on a distance between an electronic device and an external electronic device will be described for reducing (e.g., minimizing) time that the UWB connection is used in a wireless communication system.

However, unlike this, a condition under which the UWB connection is used may be implemented in various forms. For example, because the UWB scheme is a short-range wireless communication scheme with improved security compared to the BLE scheme, even if the distance between the electronic device and the external electronic device meets a condition under which the UWB connection is used, if a security level set for a process in which the UWB connection will be used is a relatively low security level, a BLE connection, not the UWB connection may be maintained as it is.

For another example, even if the distance between the electronic device and the external electronic device meets the condition under which the UWB connection is used, if a moving speed of the electronic device or the external electronic device is slower than a set speed, the UWB connection may not need to be maintained, and in this case, the UWB connection may be released.

In an embodiment, a distance between an electronic device and an external electronic device may be periodically measured while a UWB connection is established between the electronic device and the external electronic device, and the UWB connection may be released if the distance between the electronic device and the external electronic device is longer than or equal to a distance at which the UWB connection needs to be established between the electronic device and the external electronic device. According to an embodiment, if the UWB connection is released, the electronic device and the external electronic device may measure the distance between the electronic device and the external electronic device based on a BLE scheme in a BLE connection.

According to an embodiment, an operating method of an electronic device (e.g., an electronic device in FIG. 1, FIG. 2, or FIG. 7) may comprise establishing a first Bluetooth low energy (BLE) connection with an external electronic device (e.g., a vehicle 300 in FIG. 3 or an external electronic device 1900 in FIG. 19).

According to an embodiment, the operating method may further comprise measuring a distance between the external electronic device (e.g., the vehicle 300 in FIG. 3 or the external electronic device 1900 in FIG. 19) and the electronic device (e.g., the electronic device in FIG. 1, FIG. 2, or FIG. 7) based on a first distance measurement scheme which is based on a BLE technology in the first BLE connection.

According to an embodiment, the operating method may further comprise identifying whether the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the first distance measurement scheme exists within a set range which is shorter than or equal to a first distance and longer than or equal to a second distance.

According to an embodiment, the operating method may further comprise, if the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the first distance measurement scheme exists within the set range, measuring a distance between the external electronic device (e.g., the vehicle 300 in FIG. 3 or the external electronic device 1900 in FIG. 19) and the electronic device (e.g., the electronic device in FIG. 1, FIG. 2, or FIG. 7) based on a second distance measurement scheme which is based on the BLE technology in the first BLE connection.

According to an embodiment, the operating method may further comprise establishing a second BLE connection with the external electronic device (e.g., the vehicle 300 in FIG. 3 or the external electronic device 1900 in FIG. 19).

According to an embodiment, the operating method may further comprise, if the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the second distance measurement scheme is shorter than the second distance, measuring a distance between the electronic device (e.g., the electronic device in FIG. 1, FIG. 2, or FIG. 7) and the external electronic device (e.g., the vehicle 300 in FIG. 3 or the external electronic device 1900 in FIG. 19) based on a ultra wide band (UWB) technology.

According to an embodiment, the first distance may be a distance at which the establishment of the second BLE connection between the electronic device (e.g., the electronic device in FIG. 1, FIG. 2, or FIG. 7) and the external electronic device (e.g., the vehicle 300 in FIG. 3 or the external electronic device 1900 in FIG. 19) is triggered.

According to an embodiment, the second distance may be a distance at which establishment of a UWB connection between the electronic device (e.g., the electronic device in FIG. 1, FIG. 2, or FIG. 7) and the external electronic device (e.g., the vehicle 300 in FIG. 3 or the external electronic device 1900 in FIG. 19) is triggered.

According to an embodiment, the operating method may further comprise exchanging, with the external electronic device (e.g., the vehicle 300 in FIG. 3 or the external electronic device 1900 in FIG. 19), capability information or at least one parameter related to at least one of the first distance measurement scheme or the second distance measurement scheme.

According to an embodiment, the first distance measurement scheme may be a high accuracy distance measurement (HADM) scheme which is based on round trip time (RTT) measurement between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the second distance measurement scheme may be an HADM scheme which is based on phase measurement between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the operating method may further comprise, if the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the second distance measurement scheme is shorter than the second distance, establishing a UWB connection.

According to an embodiment, the distance between the external electronic device (e.g., the vehicle 300 in FIG. 3 or the external electronic device 1900 in FIG. 19) and the electronic device (e.g., the electronic device in FIG. 1, FIG. 2, or FIG. 7) may be measured based on the UWB technology in the set UWB connection.

According to an embodiment, the operating method may further comprise performing a location-based service-related process with the external electronic device (e.g., the vehicle 300 in FIG. 3 or the external electronic device 1900 in FIG. 19) in the UWB connection.

According to an embodiment, the location-based service-related process may be a process related to the distance between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the operating method may further comprise, upon identifying that a set condition is satisfied while the UWB connection is being established, releasing the UWB connection with the external electronic device (e.g., the vehicle 300 in FIG. 3 or the external electronic device 1900 in FIG. 19).

According to an embodiment, the operating method may further comprise, while the UWB connection is being established, if the distance between the electronic device (e.g., the electronic device in FIG. 1, FIG. 2, or FIG. 7) and the external electronic device (e.g., the vehicle 300 in FIG. 3 or the external electronic device 1900 in FIG. 19) measured based on the second distance measurement scheme is longer than or equal to the second distance, releasing the UWB connection with the external electronic device (e.g., the vehicle 300 in FIG. 3 or the external electronic device 1900 in FIG. 19).

According to an embodiment, the operating method may further comprise, upon identifying that a set condition is satisfied while the distance between the electronic device (e.g., the electronic device in FIG. 1, FIG. 2, or FIG. 7) and the external electronic device (e.g., the vehicle 300 in FIG. 3 or the external electronic device 1900 in FIG. 19) is being measured based on the UWB technology, measuring the distance between the electronic device (e.g., the electronic device in FIG. 1, FIG. 2, or FIG. 7) and the external electronic device (e.g., the vehicle 300 in FIG. 3 or the external electronic device 1900 in FIG. 19) based on the first distance measurement scheme or the second distance measurement scheme.

According to an embodiment, the operating method may further comprise, if the distance between the external electronic device (e.g., the vehicle 300 in FIG. 3 or the external electronic device 1900 in FIG. 19) and the electronic device (e.g., the electronic device in FIG. 1, FIG. 2, or FIG. 7) measured based on the second distance measurement scheme is longer than or equal to the second distance while the distance between the electronic device (e.g., the electronic device in FIG. 1, FIG. 2, or FIG. 7) and the external electronic device (e.g., the vehicle 300 in FIG. 3 or the external electronic device 1900 in FIG. 19) is being measured based on the UWB technology, measuring the distance between the electronic device (e.g., the electronic device in FIG. 1, FIG. 2, or FIG. 7) and the external electronic device (e.g., the vehicle 300 in FIG. 3 or the external electronic device 1900 in FIG. 19) based on the first distance measurement scheme or the second distance measurement scheme.

According to an embodiment, the first BLE connection may be a BLE link layer (LL) connection, and the second BLE connection may be a BLE logical link control and adaptation protocol (L2CAP) connection-oriented channel (CoC) connection.

According to an embodiment, an operating method of an electronic device (e.g., an electronic device in FIG. 1, FIG. 2, or FIG. 7) may comprise establishing a Bluetooth low energy (BLE) connection with an external electronic device (e.g., a vehicle 300 in FIG. 3 or an external electronic device 1900 in FIG. 19).

According to an embodiment, the operating method may further comprise identifying an input for requesting to perform a location-based service-related action for the external electronic device (e.g., the vehicle 300 in FIG. 3 or the external electronic device 1900 in FIG. 19).

According to an embodiment, the operating method may further comprise measuring a distance between the external electronic device (e.g., the vehicle 300 in FIG. 3 or the external electronic device 1900 in FIG. 19) and the electronic device (e.g., the electronic device in FIG. 1, FIG. 2, or FIG. 7) based on a high accuracy distance measurement (HADM) scheme which is based on a BLE technology in the BLE connection.

According to an embodiment, the operating method may further comprise identifying whether the measured distance between the external electronic device (e.g., the vehicle 300 in FIG. 3 or the external electronic device 1900 in FIG. 19) and the electronic device (e.g., the electronic device in FIG. 1, FIG. 2, or FIG. 7) is longer than a set distance for the location-based service-related action.

According to an embodiment, the operating method may further comprise, if the measured distance between the external electronic device (e.g., the vehicle 300 in FIG. 3 or the external electronic device 1900 in FIG. 19) and the electronic device (e.g., the electronic device in FIG. 1, FIG. 2, or FIG. 7) is shorter than or equal to the set distance, performing the location-based service-related action with the external electronic device (e.g., the vehicle 300 in FIG. 3 or the external electronic device 1900 in FIG. 19) in the BLE connection.

According to an embodiment, the operating method may further comprise, if the measured distance between the external electronic device (e.g., the vehicle 300 in FIG. 3 or the external electronic device 1900 in FIG. 19) and the electronic device (e.g., the electronic device in FIG. 1, FIG. 2, or FIG. 7) is longer than the set distance, displaying a warning message.

According to an embodiment, the location-based service-related action may be a digital key-related action.

According to an embodiment, the digital key-related action may be a button-type wireless key (remote keyless entry (RKE)) action related to a digital key shared between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the operating method may further comprise, exchanging, with the external electronic device (e.g., the vehicle 300 in FIG. 3 or the external electronic device 1900 in FIG. 19), at least one of capability information or at least one parameter related to the HADM scheme.

According to an embodiment, the HADM scheme may be based on at least one of round trip time (RTT) measurement between the electronic device (e.g., the electronic device in FIG. 1, FIG. 2, or FIG. 7) and the external electronic device (e.g., the vehicle 300 in FIG. 3 or the external electronic device 1900 in FIG. 19) or phase measurement between the electronic device (e.g., the electronic device in FIG. 1, FIG. 2, or FIG. 7) and the external electronic device (e.g., the vehicle 300 in FIG. 3 or the external electronic device 1900 in FIG. 19).

According to an embodiment, the BLE connection may be at least one of a BLE link layer (LL) connection or a BLE logical link control and adaptation protocol (L2CAP) connection-oriented channel (CoC) connection.

What is claimed is:

1. An electronic device, comprising:
communication circuitry;
at least one processor operatively connected with the communication circuitry; and
memory storing instructions, wherein the instructions, when executed by the at least one processor individually or collectively, cause the electronic device to:
establish, via the communication circuitry, a first Bluetooth low energy (BLE) connection with an external electronic device,
after a BLE pairing procedure between the electronic device and the external electronic device is completed, measure, via the communication circuitry, a distance between the external electronic device and the electronic device based on a round trip time (RTT) ranging in the first BLE connection,
identify whether the distance measured based on the RTT ranging is within a set range which is shorter than or equal to a first value and longer than or equal to a second value,
based on a determination that the distance measured based on the RTT ranging is within the set range, measure a distance between the external electronic device and the electronic device based on a phase ranging in the first BLE connection,
based on a determination that the distance measured based on the RTT ranging is shorter than a third value, perform a transaction process to verify an immobilizer token which is a confidential data element shared between the electronic device and the external electronic device,
based on a determination that the distance measured based on the phase ranging is shorter than the second value, perform a ultra wide band (UWB) ranging secret key (URSK) derivation flow, and
after the URSK derivation flow is completed, measure, via the communication circuitry, a distance between the electronic device and the external electronic device based on a URSK derived by the URSK derivation flow.

2. The electronic device of claim 1, wherein the instructions, when executed by the at least one processor individually or collectively, cause the electronic device to,
based on a determination that the distance measured based on the RTT ranging is within the set range, establish a second BLE connection with the external electronic device via the communication circuitry, wherein the first value is a distance at which establishment of the second BLE connection between the electronic device and the external electronic device is triggered, and wherein the second BLE connection includes a logical link control and adaptation protocol (L2CAP) connection-oriented channel (CoC) connection.

3. The electronic device of claim 1, wherein the second value is a distance at which establishment of a UWB connection between the electronic device and the external electronic device is triggered.

4. The electronic device of claim 3, wherein the instructions, when executed by the at least one processor individually or collectively, cause the electronic device to:

perform, via the communication circuitry, a location-based service-related process with the external electronic device in the UWB connection, and wherein the location-based service-related process is a digital key-related process related to the distance between the electronic device and the external electronic device.

5. The electronic device of claim 1, wherein the instructions, when executed by the at least one processor individually or collectively, cause the electronic device to:

exchange, with the external electronic device via the communication circuitry, at least one of capability information or at least one parameter related to at least one of the RTT ranging or the phase ranging.

6. The electronic device of claim 1, wherein the instructions, when executed by the at least one processor individually or collectively, cause the electronic device to:

upon identifying that a set condition is satisfied while the distance between the electronic device and the external electronic device is being measured based on the UWB technology using a URSK derived by the URSK derivation flow, measure the distance between the electronic device and the external electronic device based on at least one of the RTT ranging or the phase ranging.

7. The electronic device of claim 1, wherein the instructions, when executed by the at least one processor individually or collectively, cause the electronic device to:

based on a determination that the distance measured based on the phase ranging is longer than or equal to the second value while the distance between the electronic device and the external electronic device is being measured based on the UWB technology using a URSK derived by the URSK derivation flow, release a UWB connection established with the external electronic device, and measure the distance between the electronic device and the external electronic device based on at least one of the RTT ranging or the phase ranging.

8. The electronic device of claim 1, wherein the instructions, when executed by the at least one processor individually or collectively, cause the electronic device to:

identify an input for requesting to perform a location-based service-related action for the external electronic device, identify whether the measured distance between the external electronic device and the electronic device is longer than a third value for the location-based service-related action, and based on a determination that the measured distance between the external electronic device and the electronic device is shorter than or equal to the third value, perform, via the communication circuitry, the location-based service-related action with the external electronic device in the first BLE connection.

9. The electronic device of claim 8, wherein the instructions, when executed by the at least one processor individually or collectively, cause the electronic device to:

based on a determination that the measured distance between the external electronic device and the electronic device is longer than the third value, display a warning message via a display of the electronic device.

10. The electronic device of claim 8, wherein the instructions, when executed by the at least one processor individually or collectively, cause the electronic device to:

exchange, with the external electronic device via the communication circuitry, at least one of capability information or at least one parameter related to the RTT ranging and the phase ranging.

11. The electronic device of claim 1, wherein the instructions, when executed by the at least one processor individually or collectively, cause the electronic device to:

based on identifying that the external electronic device supports the RTT ranging and the phase ranging which are based on a BLE technology in the first BLE connection, measure the RTT ranging, and/or based on a determination that the distance measured based on the RTT ranging is longer than the first value, measure a distance between the external electronic device and the electronic device based on a BLE received signal strength indicator, RSSI, ranging.

12. An operating method of an electronic device, the operating method comprising:

establishing a first Bluetooth low energy (BLE) connection with an external electronic device;

after a BLE pairing procedure between the electronic device and the external electronic device is completed, measuring a distance between the external electronic device and the electronic device based on a round trip time (RTT) ranging in the first BLE connection;

based on a determination that the distance measured based on the RTT ranging is shorter than a third value, performing a transaction process to verify an immobilizer token which is a confidential data element shared between the electronic device and the external electronic device;

identifying whether the distance measured based on the RTT ranging is within a set range which is shorter than or equal to a first value and longer than or equal to a second value;

based on a determination that the distance measured based on the RTT ranging is within the set range, measuring a distance between the external electronic device and the electronic device based on a phase ranging in the first BLE connection;

based on a determination that the distance measured based on the phase ranging is shorter than the second value, performing a ultra wide band (UWB) ranging secret key (URSK) derivation flow; and after the URSK derivation flow is completed, measuring a distance between the electronic device and the external electronic device based on a URSK derived by the URSK derivation flow using ultra wide band (UWB) technology.

13. The operating method of claim 12, further comprising:

based on a determination that the distance measured based on the RTT ranging is within the set range, establishing a second BLE connection with the external electronic device, wherein the first value is a distance at which establishment of the second BLE connection between the electronic device and the external electronic device is triggered, and wherein the second BLE connection includes a logical link control and adaptation protocol (L2CAP) connection-oriented channel (CoC) connection.

14. The operating method of claim 12, wherein the second value is a distance at which establishment of a UWB connection between the electronic device and the external electronic device is triggered.

15. The operating method of claim 12, further comprising:

exchanging, with the external electronic device, at least one of capability information or at least one parameter related to at least one of the RTT ranging or the phase ranging.

16. The operating method of claim 12, further comprising:

based on a determination that the distance based on the phase ranging is shorter than the second value, establishing a UWB connection, wherein the distance between the electronic device and the external electronic device is measured based on the UWB technology using a URSK derived by the URSK derivation flow in the established UWB connection.

17. The operating method of claim 16, further comprising:

performing a location-based service-related process with the external electronic device in the UWB connection, wherein the location-based service-related process is a digital key-related process related to the distance between the electronic device and the external electronic device measured using a URSK derived by the URSK derivation flow.

18. The operating method of claim 12, further comprising:

upon identifying that a set condition is satisfied while the distance between the electronic device and the external electronic device is being measured based on the UWB technology using a URSK derived by the URSK derivation flow, measuring the distance between the electronic device and the external electronic device based on at least one of the RTT ranging or the phase ranging.

19. The operating method of claim 12, further comprising:

based on identifying that the external electronic device supports the RTT ranging and the phase ranging which are based on a BLE technology in the first BLE connection, measuring the RTT ranging, and/or based on a determination that the distance measured based on the RTT ranging is longer than the first value, measuring a distance between the external electronic device and the electronic device based on a BLE received signal strength indicator, RSSI, ranging.

\* \* \* \* \*